(12) United States Patent
Chen et al.

(10) Patent No.: US 11,480,757 B2
(45) Date of Patent: Oct. 25, 2022

(54) IMAGING OPTICAL SYSTEM, IMAGING APPARATUS AND ELECTRONIC DEVICE

(71) Applicant: LARGAN PRECISION CO., LTD., Taichung (TW)

(72) Inventors: Kuan-Ming Chen, Taichung (TW); Kuan-Ting Yeh, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 463 days.

(21) Appl. No.: 16/752,838

(22) Filed: Jan. 27, 2020

(65) Prior Publication Data

US 2021/0103124 A1    Apr. 8, 2021

(30) Foreign Application Priority Data

Oct. 3, 2019    (TW) ................. 108135787

(51) Int. Cl.

| | | |
|---|---|---|
| *G02B 9/16* | (2006.01) | |
| *G02B 26/08* | (2006.01) | |
| *G02B 13/18* | (2006.01) | |
| G02B 27/00 | (2006.01) | |
| G02B 9/14 | (2006.01) | |
| G02B 9/12 | (2006.01) | |

(Continued)

(52) U.S. Cl.
CPC .............. *G02B 9/16* (2013.01); *G02B 13/18* (2013.01); *G02B 26/0816* (2013.01); *G02B 5/005* (2013.01); *G02B 9/12* (2013.01); *G02B 9/14* (2013.01); *G02B 9/18* (2013.01); *G02B 9/20* (2013.01); *G02B 9/22* (2013.01); *G02B 13/0035* (2013.01); *G02B 27/0025* (2013.01)

(58) Field of Classification Search
CPC ...... G02B 9/16; G02B 13/18; G02B 26/0816; G02B 5/005; G02B 9/18; G02B 9/20; G02B 9/22; G02B 9/14; G02B 9/12; G02B 13/0035; G02B 27/0025
USPC ......................... 359/716, 739, 740, 784–792
See application file for complete search history.

(56) References Cited

U.S. PATENT DOCUMENTS

| | | |
|---|---|---|
| 576,896 A | 2/1897 | Zeiss |
| 1,616,751 A | 2/1927 | Konig |

(Continued)

FOREIGN PATENT DOCUMENTS

| | | |
|---|---|---|
| CN | 103777315 B | 5/2016 |
| CN | 107505687 A | 12/2017 |

(Continued)

*Primary Examiner* — Evelyn A Lester
(74) *Attorney, Agent, or Firm* — Locke Lord LLP; Tim Tingkang Xia, Esq.

(57) ABSTRACT

An imaging optical system includes three lens elements. The three lens elements, in order from an object side to an image side, are a first lens element having an object-side surface facing the object side and an image-side surface facing the image side, a second lens element having an object-side surface facing the object side and an image-side surface facing the image side, and a third lens element having an object-side surface facing the object side and an image-side surface facing the image side. The third lens element has positive refractive power, the imaging optical system has a total of three lens elements, and there are air gaps between paraxial regions of the first lens element, the second lens element and the third lens element.

27 Claims, 35 Drawing Sheets

(51) Int. Cl.
*G02B 13/00* (2006.01)
*G02B 5/00* (2006.01)
*G02B 9/22* (2006.01)
*G02B 9/20* (2006.01)
*G02B 9/18* (2006.01)

(56) References Cited

U.S. PATENT DOCUMENTS

| | | | |
|---|---|---|---|
| 2,350,112 A | 5/1944 | Houghton | |
| 2,417,942 A | 3/1947 | Miles | |
| 2,487,873 A | 11/1949 | Herzberger et al. | |
| 2,500,017 A | 3/1950 | Altman | |
| 2,503,751 A * | 4/1950 | Litten | G02B 13/00 359/789 |
| 2,663,222 A | 12/1953 | Rosin et al. | |
| 2,767,613 A | 10/1956 | Conradi et al. | |
| 2,768,555 A | 10/1956 | Knutti | |
| 2,785,602 A | 3/1957 | Kohler | |
| 2,962,930 A * | 12/1960 | Johnson | G02B 13/00 359/785 |
| 3,062,100 A | 11/1962 | Ludewig et al. | |
| 3,249,009 A | 5/1966 | Lescher et al. | |
| 3,438,696 A * | 4/1969 | Ruben | G03B 17/14 359/789 |
| 3,449,041 A * | 6/1969 | Jager | G02B 13/00 359/789 |
| 3,536,379 A | 10/1970 | Knetsch | |
| 4,109,995 A * | 8/1978 | Betensky | G02B 9/16 359/716 |
| 4,190,324 A | 2/1980 | Arai | |
| 4,522,471 A | 6/1985 | Nishioka | |
| 4,702,569 A | 10/1987 | Mercado | |
| 4,704,008 A | 11/1987 | Mercado | |
| 4,761,064 A | 8/1988 | Mercado | |
| 4,762,404 A | 8/1988 | Mercado | |
| 4,765,727 A | 8/1988 | Mercado | |
| 4,790,637 A | 12/1988 | Mercado et al. | |
| 4,999,005 A | 3/1991 | Cooper | |
| 5,020,889 A | 6/1991 | Mercado et al. | |
| 5,204,780 A * | 4/1993 | Sakamoto | G02B 13/18 359/689 |
| 5,204,782 A | 4/1993 | Mercado et al. | |
| 5,210,646 A | 5/1993 | Mercado et al. | |
| 5,991,096 A | 11/1999 | Estelle | |
| 6,624,953 B2 * | 9/2003 | Noda | G02B 13/24 359/716 |
| 7,916,401 B2 * | 3/2011 | Chen | G02B 13/0035 359/716 |
| 8,558,939 B2 * | 10/2013 | Matsui | G02B 13/0035 359/716 |
| 10,031,317 B2 * | 7/2018 | Hsueh | G02B 13/0035 |
| 10,386,603 B2 * | 8/2019 | Hsueh | G02B 13/0035 |
| 10,422,931 B2 * | 9/2019 | Hsieh | G02B 3/14 |
| 10,585,262 B2 * | 3/2020 | Hsueh | G02B 13/0035 |
| 11,163,136 B2 * | 11/2021 | Hsueh | G02B 13/0035 |
| 2010/0321798 A1 * | 12/2010 | Chen | G02B 13/0035 359/784 |
| 2012/0206639 A1 * | 8/2012 | Matsui | G02B 13/0035 359/716 |
| 2013/0301144 A1 * | 11/2013 | Tsai | G02B 13/0035 359/716 |
| 2013/0301145 A1 * | 11/2013 | Tsai | G02B 13/18 359/716 |
| 2014/0184877 A1 * | 7/2014 | Ahn | G02B 9/12 359/716 |
| 2016/0227082 A1 * | 8/2016 | Hsueh | G02B 13/0035 |
| 2017/0010438 A1 * | 1/2017 | Sun | G02B 9/16 |
| 2018/0321469 A1 * | 11/2018 | Hsueh | G02B 13/0035 |
| 2019/0324230 A1 * | 10/2019 | Hsueh | G02B 13/0035 |
| 2020/0158992 A1 * | 5/2020 | Hsueh | G02B 13/0035 |
| 2020/0333561 A1 | 10/2020 | Liu et al. | |
| 2021/0349287 A1 * | 11/2021 | Yeh | G02B 13/0065 |
| 2022/0019057 A1 * | 1/2022 | Hsueh | G02B 13/0035 |

FOREIGN PATENT DOCUMENTS

| | | |
|---|---|---|
| CN | 110554479 A | 12/2019 |
| CN | 210323553 U | 4/2020 |
| JP | S4923910 B | 6/1974 |
| JP | S516108 Y | 2/1976 |
| JP | S57073713 A | 5/1982 |
| JP | S57073714 A | 5/1982 |
| JP | S59164021 U | 11/1984 |
| JP | S61156013 A | 7/1986 |
| JP | H01257909 A | 10/1989 |
| JP | H01261613 A | 10/1989 |
| JP | H03084510 A | 4/1991 |
| JP | H03091708 A | 4/1991 |
| JP | H06201991 A | 7/1994 |
| JP | H06300988 A | 10/1994 |
| JP | H07261077 A | 10/1995 |
| JP | H08-201686 A | 8/1996 |
| JP | H11002760 A | 1/1999 |
| JP | 2001305425 A | 10/2001 |
| WO | 2020258269 A | 12/2020 |

* cited by examiner

IMAGING OPTICAL SYSTEM, IMAGING APPARATUS AND ELECTRONIC DEVICE

RELATED APPLICATIONS

This application claims priority to Taiwan Application Serial Number 108135787, filed on Oct. 3, 2019, which is incorporated by reference herein in its entirety.

BACKGROUND

Technical Field

The present disclosure relates to an imaging optical system and an imaging apparatus, and more particularly, to an imaging optical system and an imaging apparatus applicable to electronic devices.

Description of Related Art

With the advancement of semiconductor process technology, performances of image sensors have been improved, and the pixels have been reduced to an even smaller size. Therefore, imaging optical systems with high image quality have become an indispensable part of modern electronic devices.

With the rapid development of technology, applications of electronic devices equipped with imaging optical system increase significantly, and the requirements for optical lens assemblies are more diverse. It is difficult for conventional imaging optical systems to balance among the requirements such as image quality, sensitivity, aperture size, volume or viewing angle. Therefore, there is a need for providing an imaging optical system to satisfy the aforementioned requirements.

SUMMARY

According to one aspect of the present disclosure, an imaging optical system, includes three lens elements. The three lens elements, in order from an object side to an image side, are a first lens element, a second lens element and a third lens element. The first lens element has an object-side surface toward the object side and an image-side surface toward the image side. The second lens element has an object-side surface toward the object side and an image-side surface toward the image side. The third lens element has an object-side surface toward the object side and an image-side surface toward the image side.

The third lens element has positive refractive power, and the imaging optical system has a total of three lens elements. There are air gaps between paraxial regions of the first lens element, the second lens element and the third lens element. A central thickness of the first lens element is CT1, a central thickness of the second lens element is CT2, a central thickness of the third lens element is CT3, an axial distance between the first lens element and the second lens element is T12, an axial distance between the second lens element and the third lens element is T23, an axial distance between the object-side surface of the first lens element and the image-side surface of the third lens element is TD, a maximum image height of the imaging optical system is ImgH, a focal length of the imaging optical system is f and the following conditions are satisfied:

$1.5 < (CT1+CT2+CT3)/(T12+T23) < 8.0;$ $1.0 < TD/ImgH;$ and $3.6 < f/TD < 10.$

According to another aspect of the present disclosure, an imaging optical system includes three lens elements. The three lens elements, in order from an object side to an image side, are a first lens element, a second lens element and a third lens element. The first lens element has an object-side surface toward the object side and an image-side surface toward the image side. The second lens element has an object-side surface toward the object side and an image-side surface toward the image side. The third lens element has an object-side surface toward the object side and an image-side surface toward the image side The third lens element has positive refractive power, and the imaging optical system has a total of three lens elements. A central thickness of the first lens element is CT1, a central thickness of the second lens element is CT2, a central thickness of the third lens element is CT3, an axial distance between the first lens element and the second lens element is T12, an axial distance between the second lens element and the third lens element is T23, an axial distance between the object-side surface of the first lens element and the image-side surface of the third lens element is TD, a maximum image height of the imaging optical system is ImgH, a focal length of the imaging optical system is f, an Abbe number of the first lens element is V1, an Abbe number of the second lens element is V2, an Abbe number of the third lens element is V3, and the following conditions are satisfied:

$1.2 < (CT1+CT2+CT3)/(T12+T23);$ $1.6 < TD/ImgH < 4.5;$ $3.6 < f/TD < 25;$ and $40.0 < V1+V2+V3 < 140.0.$ According to another aspect of the present disclosure, an imaging optical system includes three lens elements. The three lens elements, in order from an object side to an image side, are a first lens element, a second lens element, and a third lens element. The first lens element has an object-side surface toward the object side and an image-side surface toward the image side. The second lens element has an object-side surface toward the object side and an image-side surface toward the image side. The third lens element has an object-side surface toward the object side and an image-side surface toward the image side.

The second lens element has negative refractive power, and the imaging optical system has a total of three lens elements. A central thickness of the first lens element is CT1, a central thickness of the second lens element is CT2, a central thickness of the third lens element is CT3, an axial distance between the first lens element and the second lens element is T12, an axial distance between the second lens element and the third lens element is T23, an axial distance between the object-side surface of the first lens element and the image-side surface of the third lens element is TD, a maximum image height of the imaging optical system is ImgH, a focal length of the imaging optical system is f, an Abbe number of the first lens element is V1, an Abbe number of the second lens element is V2, an Abbe number of the third lens element is V3, a minimum among Abbe numbers of the first lens element, the second lens element and the third lens element is V min, and the following conditions are satisfied:

$1.2<(CT1+CT2+CT3)/(T12+T23)<11$;

$1.0<TD/ImgH<4.5$;

$3.6<f/TD<45$;

$40.0<V1+V2+V3<140.0$; and $10.0<V\min<30.0$.

According to another aspect of the present disclosure, an imaging apparatus includes the aforementioned imaging optical system and an image sensor disposed on an image surface of the imaging optical system.

According to another aspect of the present disclosure, an electronic device includes the aforementioned imaging apparatus.

DETAILED DESCRIPTION

Figure 1A:
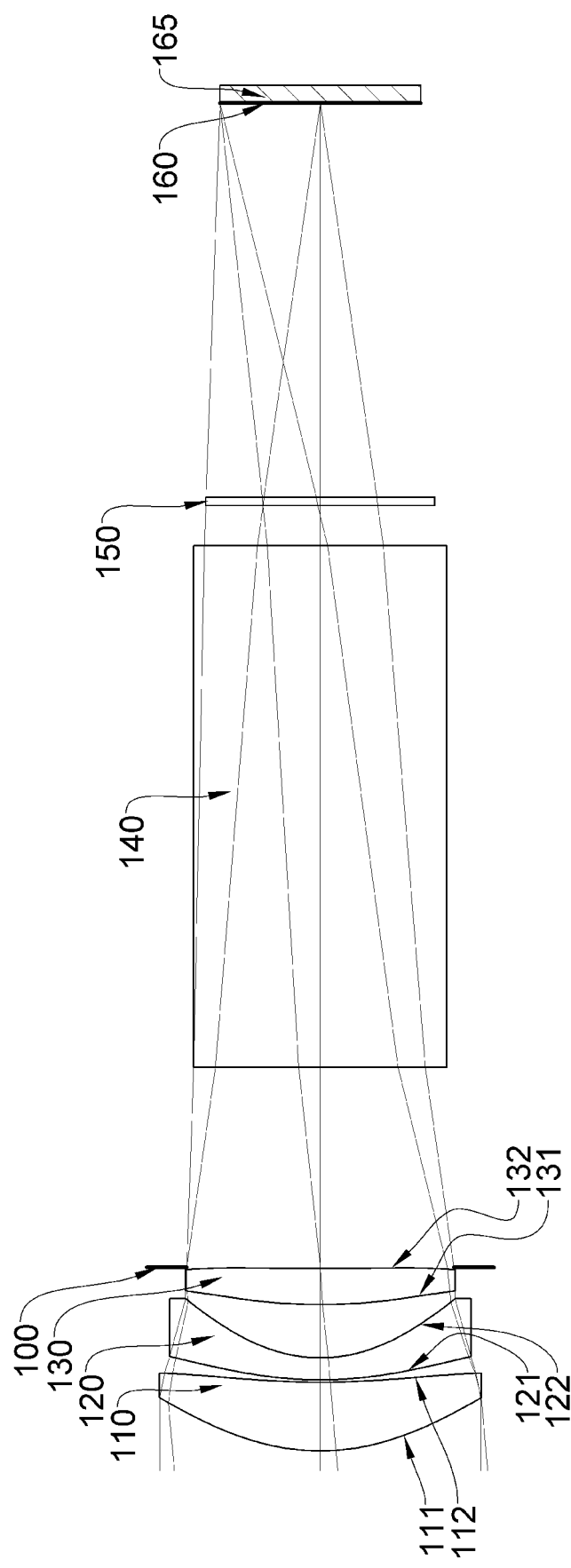
FIG. 1A is a schematic view of an imaging apparatus according to the 1st embodiment of the present disclosure.

The present disclosure provides an imaging optical system including three lens elements. The three lens elements, in order from an object side to an image side, are a first lens element, a second lens element, and a third lens element.

The first lens element has an object-side surface toward the object side and an image-side surface toward the image side. The first lens element may have positive refractive power so as to favorably reduce the size. The first lens element may have the object-side surface being convex in a paraxial region thereof so as to adjust the refractive power of the first lens element.

The second lens element has an object-side surface toward the object side and an image-side surface toward the image side. The second lens element may have negative refractive power so as to balance the aberrations due to the reduced size. The second lens element may have the object-side surface being convex in a paraxial region thereof so as to favorably adjust the travelling direction of the light for reducing the outer diameter of the lens element. The second lens element may have the image-side surface being concave in a paraxial region thereof so as to favorably correct aberrations such as astigmatisms.

The third lens element has an object-side surface toward the object side and an image-side surface toward the image side. The third lens element may have positive refractive power so as to favorably adjust the back focus on a proper length.

The imaging optical system has a total of three lens elements so as to reach a balance between the size and the imaging quality. There may be air gaps between paraxial regions of the first lens element, the second lens element and the third lens element so as to increase variances of surfaces of the lens elements and distances between the lens elements for enhancing the imaging quality.

At least one lens element of the first lens element, the second lens element and the third lens element may have both the object-side surface and the image-side surface thereof being aspheric so as to increase variances of surfaces of the lens elements for reducing the size and enhancing the imaging quality. Each of at least two lens elements of the first lens element, the second lens element and the third lens element may have both the object-side surface and the image-side surface thereof being aspheric.

At least one lens element of the first lens element, the second lens element and the third lens element may have at least one inflection point on at least one of the object-side surface and the image-side surface thereof so as to further increase variances of surfaces of the lens elements for reducing the size and enhancing the imaging quality.

At least one lens element of the first lens element, the second lens element and the third lens element may be made of plastic material so as to favorably correct aberrations, reduce weight and increase the mass production capability. At least two lens element of the first lens element, the second lens element and the third lens element may be made of plastic material. The second lens element may be made of plastic material so as to favorably work with the other lens element for reducing effects of temperature on imaging and expand the range of applications.

At least one lens element of the first lens element and the third lens element may be made of glass material so as to favorably reduce effects of temperature on imaging. The third lens element may be made of glass material so as to favorably reduce sensitivities for improving the yield rate.

A central thickness of the first lens element is CT1, a central thickness of the second lens element is CT2, a central thickness of the third lens element is CT3, an axial distance between the first lens element and the second lens element is T12, and an axial distance between the second lens element and the third lens element is T23. When the imaging optical system satisfies the following condition: $1.2<(CT1+CT2+CT3)/(T12+T23)$, the configuration of the lens elements can be adjusted so as to favorably correct aberrations. Moreover, the following condition can be satisfied: $1.5<(CT1+CT2+CT3)/(T12+T23)$. Moreover, the following condition can be satisfied: $2.0<(CT1+CT2+CT3)/(T12+T23)$. When the imaging optical system satisfies the following condition: $(CT1+CT2+CT3)/(T12+T23)<11$, the configuration of the lens elements can be adjusted so as to favorably reduce the size. Moreover, the following condition can be satisfied: $(CT1+CT2+CT3)/(T12+T23)<8.0$. Moreover, the following condition can be satisfied: $(CT1+CT2+CT3)/(T12+T23)<5.0$. Moreover, the following condition can be satisfied: $(CT1+CT2+CT3)/(T12+T23)<4.0$. Moreover, the following condition can be satisfied: $(CT1+CT2+CT3)/(T12+T23)<3.3$.

An axial distance between the object-side surface of the first lens element and the image-side surface of the third lens element is TD, and a maximum image height of the imaging optical system is ImgH (that is a half of a diagonal length of an effective imaging region on an image sensor). When the imaging optical system satisfies the following condition: $1.0<TD/ImgH$, balances can be obtained between the size of the imaging optical system and the area of an image surface and a telephoto structure can be favorably formed. Moreover, the following condition can be satisfied: $1.3<TD/ImgH$. Moreover, the following condition can be satisfied: $1.6<TD/ImgH$. When the imaging optical system satisfies the following condition: $TD/ImgH<6.0$, balances can be obtained between the size of the imaging optical system and the area of the image surface so as to reduce the size and avoid poor imaging qualities. Moreover, the following condition can be satisfied: $TD/ImgH<4.5$. Moreover, the following condition can be satisfied: $TD/ImgH<3.5$. Moreover, the following condition can be satisfied: $TD/ImgH<2.8$.

The axial distance between the object-side surface of the first lens element and the image-side surface of the third lens element is TD, and a focal length of the imaging optical system is f. When the imaging optical system satisfies the following condition: $3.6<f/TD$, it is favorable for forming a telephoto structure and reducing the size. Moreover, the following condition can be satisfied: $4.0<f/TD$. Moreover, the following condition can be satisfied: $4.4<f/TD$. Moreover, the following condition can be satisfied: $4.8<f/TD$. When the imaging optical system satisfies the following condition: $f/TD<45$, the angle of view can be avoided from being too small. Moreover, the following condition can be satisfied: $f/TD<35$. Moreover, the following condition can be satisfied: $f/TD<25$. Moreover, the following condition can be satisfied: $f/TD<15$. Moreover, the following condition can be satisfied: $f/TD<10$. Moreover, the following condition can be satisfied: $f/TD<7.0$.

An Abbe number of the first lens element is V1, an Abbe number of the second lens element is V2, and an Abbe number of the third lens element is V3. When the imaging optical system satisfies the following condition: $40.0<V1+V2+V3<140.0$, materials of the lens elements can be matched to each other so as to favorably correct aberrations such as chromatic aberrations. Moreover, the following condition can be satisfied: $50.0<V1+V2+V3<130.0$.

A minimum among Abbe numbers of the first lens element, the second lens element and the third lens element is V min. When the imaging optical system satisfies the following condition: $10.0<V\,min<30.0$, the configuration of materials of the lens elements can be adjusted so as to correct aberrations and reduce color shifts. Moreover, the following condition can be satisfied: $14.0<V\,min\leq28.3$.

The axial distance between the first lens element and the second lens element is T12, and the axial distance between the second lens element and the third lens element is T23. When the imaging optical system satisfies the following condition: $2.00<T23/T12<200$, the configuration of the lens elements can be adjusted so as to favorably reduce the size and correct aberrations. Moreover, the following condition can be satisfied: 6.00<T23/T12<100.

The focal length of the imaging optical system is f, and the maximum image height of the imaging optical system is ImgH. When the imaging optical system satisfies the following condition: 8.0<f/ImgH<15, it is favorable for obtaining balances between angles of view, focal lengths and the size of the image surface. Moreover, the following condition can be satisfied: 9.5<f/ImgH<13.

A composite focal length of the first lens element and the second lens element is f12, and a focal length of the third lens element is f3. When the imaging optical system satisfies the following condition: f12/f3<0, the configuration of refractive power of the lens elements can be adjusted so as to favorably reduce sensitivities and effects of temperature on imaging. Moreover, the following condition can be satisfied: −25<f12/f3<−2.0. Moreover, the following condition can be satisfied: −20<f12/f3<−2.5.

The Abbe number of the second lens element is V2. When the imaging optical system satisfies the following condition: 10.0<V2<30.0, the configuration of materials of the lens elements can be adjusted so as to correct chromatic aberrations. Moreover, the following condition can be satisfied: 14.0<V2≤28.3.

The axial distance between the object-side surface of the first lens element and the image-side surface of the third lens element is TD, and an entrance pupil diameter of the imaging optical system is EPD. When the imaging optical system satisfies the following condition: 0.20<TD/EPD<1.0, balances can be obtained between the size of the imaging optical system and the aperture size. Moreover, the following condition can be satisfied: 0.40<TD/EPD<0.80. Moreover, the following condition can be satisfied: 0.50<TD/EPD<0.70.

A minimum among ratios of an abbe number to a refractive index of each the first lens element, second lens element and the third lens element is (V/N)min (that is the minimum among the ratio of the Abbe number V1 to the refractive index N1 of the first lens element (V1/N1), the ratio of the Abbe number V2 to the refractive index N2 of the second lens element (V2/N2), and the ratio of the Abbe number V3 to the refractive index N3 of the third lens element (V3/N3)). When the imaging optical system satisfies the following condition: 8.0<(V/N)min<18.0, the configuration of materials of the lens elements can be adjusted so as to favorably reduce the size and correct aberrations.

The central thickness of the second lens element is CT2, the central thickness of the third lens element is CT3, and the axial distance between the second lens element and the third lens element is T23. When the imaging optical system satisfies the following condition: 0.50<(CT2+CT3)/T23<10, the second lens element and the third lens element can be matched to each other so as to favorably reduce sensitivities. Moreover, the following condition can be satisfied: 0.80<(CT2+CT3)/T23<7.0.

The focal length of the imaging optical system is f, a focal length of the first lens element is f1, a focal length of the second lens element is f2, and the focal length of the third lens element is f3. When the imaging optical system satisfies the following condition: 3.0<|f/f1|+|f/f2|+|f/f3|<8.0, it is favorable for forming a telephoto structure and reducing sensitivity of each lens element.

A maximum vertical distance between any point on an effective optical region of the object-side surface of the first lens element and the optical axis is Y11, and the axial distance between the object-side surface of the first lens element and the image-side surface of the third lens element is TD. When the imaging optical system satisfies the following condition: 0.65<Y11/TD<1.0, it is favorable for reducing angles of view.

A maximum vertical distance between any point on an effective optical region of the image-side surface of the third lens element and the optical axis is Y32, and the axial distance between the object-side surface of the first lens element and the image-side surface of the third lens element is TD. When the imaging optical system satisfies the following condition: 0.60<Y32/TD<1.0, it is favorable for adjusting the configuration of sizes of the lens elements.

The maximum vertical distance between any point on the effective optical region of the object-side surface of the first lens element and the optical axis is Y11, and the maximum vertical distance between any point on the effective optical region of the image-side surface of the third lens element and the optical axis is Y32. When the imaging optical system satisfies the following condition: 0.70<Y11/Y32<1.4, it is favorable for reducing the size and forming a telephoto structure.

An axial distance between the image-side surface of the third lens element and the image surface is BL, the axial distance between the object-side surface of the first lens element and the image-side surface of the third lens element is TD. When the imaging optical system satisfies the following condition: 4.0<BL/TD<7.5, the configuration of the lens elements and the back focal length can be adjusted so as to favorably adjust the configuration of the size and the angle of view. Moreover, the following condition can be satisfied: 4.6<BL/TD<6.8.

An f-number of the imaging optical system is Fno. When the imaging optical system satisfies the following condition: 2.0<Fno<5.5, balances can be obtained between illuminances and the depth of field and angles of view can be favorably adjusted. Moreover, the following condition can be satisfied: 2.5<Fno<4.5. Moreover, the following condition can be satisfied: 3.0<Fno<3.8.

The axial distance between the first lens element and the second lens element is T12, the axial distance between the second lens element and the third lens element is T23, and the central thickness of the second lens element is CT2. When the imaging optical system satisfies the following condition: 0.70<(T12+T23)/CT2<3.0, the lens elements can be matched to each other so as to correct aberrations.

A half of the maximal field of view is HFOV. When the imaging optical system satisfies the following condition: 0 degree<HFOV<10.0 degrees, the imaging lens system can be configured to have suitable angles of view for applications. Moreover, the following condition can be satisfied: 3.2 degrees<HFOV<7.0 degrees. Moreover, the following condition can be satisfied: 4.0 degrees<HFOV<6.0 degrees.

The focal length of the imaging optical system is f, and the focal length of the first lens element is f1. When the imaging optical system satisfies the following condition: 0.25<f/f1<5.0, the first lens element can be configured to have a refractive power of suitable strength for reducing the size. Moreover, the following condition can be satisfied: 0.50<f/f1<2.5.

The focal length of the imaging optical system is f, and the focal length of the second lens element is f2. When the imaging optical system satisfies the following condition: −4.5<f/f2<−0.80, it is favorable for adjusting angles of view and reducing effects of temperature on imaging. Moreover, the following condition can be satisfied: −3.0<f/f2<−1.0.

The focal length of the imaging optical system is f, and the focal length of the third lens element is f3. When the imaging optical system satisfies the following condition: 0.40<f/f3<2.5, the back focal length can be adjusted and effects of temperature on imaging can be reduced. Moreover, the following condition can be satisfied: 1.0<f/f3≤2.0.

A curvature radius of the object-side surface of the first lens element is R1, and a curvature radius of the image-side surface of the first lens element is R2. When the imaging optical system satisfies the following condition: (R1−R2)/(R1+R2)<0, the shape of the first lens element can be adjusted so as to favorably reduce the size.

A curvature radius of the object-side surface of the second lens element is R3, and a curvature radius of the image-side surface of the second lens element is R4, When the imaging optical system satisfies the following condition: 0<(R3−R4)/(R3+R4), the shape of the second lens element can be adjusted so as to correct aberrations.

According to the imaging optical system of the present disclosure, the imaging optical system may include at least one object-side reflective component at the object side of the first lens element, or at least one image-side reflective component at the image side of the third lens element. Moreover, the reflective component may be a prism or a mirror but not limited thereto. Moreover, the at least one image-side reflective component may include at least two reflective surfaces. It is favorable for reducing structural limitations and improving flexibility in space configurations for an even wider range of applications. Moreover, the at least one image-side reflective component may include at least one prism so as to favorably reduce the difficulty in assembling.

A total of axial thickness of all prisms of the image-side reflective component is ΣCTP, the axial distance between the object-side surface of the first lens element and the image-side surface of the third lens element is TD. When the imaging optical system satisfies the following condition: 1.5<ΣCTP/TD<4.0, the configuration of the lens elements and the prism can be adjusted so as to favorably adjust the configuration of the size and form a telephoto structure. Moreover, the following condition can be satisfied: 2.0<ΣCTP/TD<3.5.

At least one lens element may have an effective optical region thereof being a non-circular shape so as to reduce the size of the lens element for various applications. Moreover, at least two lens elements may have effective optical regions thereof being non-circular shapes. Moreover, the three lens elements may all have effective optical regions thereof being non-circular shapes. The other components such as barrels, shading components, aperture stops may have openings thereof being non-circular shapes so as to favorably reduce the size.

The non-circular shape may include at least one arc portion and at least one straight portion. The non-circular shape composed of the arc portion and the straight portion can reduce the difficulty in manufacturing the non-circular shape of the lens element. Moreover, the non-circular shape may include at least two arc portions and at least two straight portions which may be parallel to each other so as to further reduce the difficulty in manufacturing the non-circular shape of the lens element and favorably improve the yield rate of assembling.

A distance between the straight portions and the optical axis is D, a radius of the arc portions is Y. When the imaging optical system satisfies the following condition: 1.1<Y/D<2.0, the ratio of the arc portion to the straight portion can be adjusted so as to maintain imaging qualities while reducing the size of the lens element. Moreover, the following condition can be satisfied: 1.3<Y/D<1.8.

At least two adjacent lens elements may have fitting structures outside effective optical regions thereof such that the assembling of the lens elements can be even stabilized so as to increase the yield rate. Moreover, the first lens element and the second lens element may have fitting structures outside the effective optical regions thereof.

An angle between an extension line at a fitting position of the fitting structures and the optical axis is θ. When the imaging optical system satisfies the following condition: 10.0 degrees<|θ|<60.0 degrees, the assembling process of the lens elements can be further stabilized by suitable fitting angles. Moreover, the following condition can be satisfied: 15.0 degrees<|θ|<35.0 degrees.

An intersection of the extension line at the fitting position of the fitting structures and the optical axis locates in the image side of the fitting position such that the assembling process can be made smoother.

The present disclosure further provides an imaging apparatus, including the aforementioned imaging optical system and an image sensor disposed on the image surface of the imaging optical system.

The imaging apparatus may have an autofocus function so as to increase the range of applications. When the autofocus function is applied, the at least one image-side reflective component can move with respect to the image sensor during the autofocus process so as to enhance the autofocus function, and reduce traveling distances required for autofocus especially for telephoto imaging apparatuses. The imaging apparatus may have an optical image stabilization function such that the ranges of applications can be increased. The at least one object-side reflective component can be driven by a driving device and tilted such that the image tilt can be instantly compensated so as to achieve the optical image stabilization function.

The present disclosure further provides an electronic device, including the aforementioned imaging apparatus.

Figure 14A:
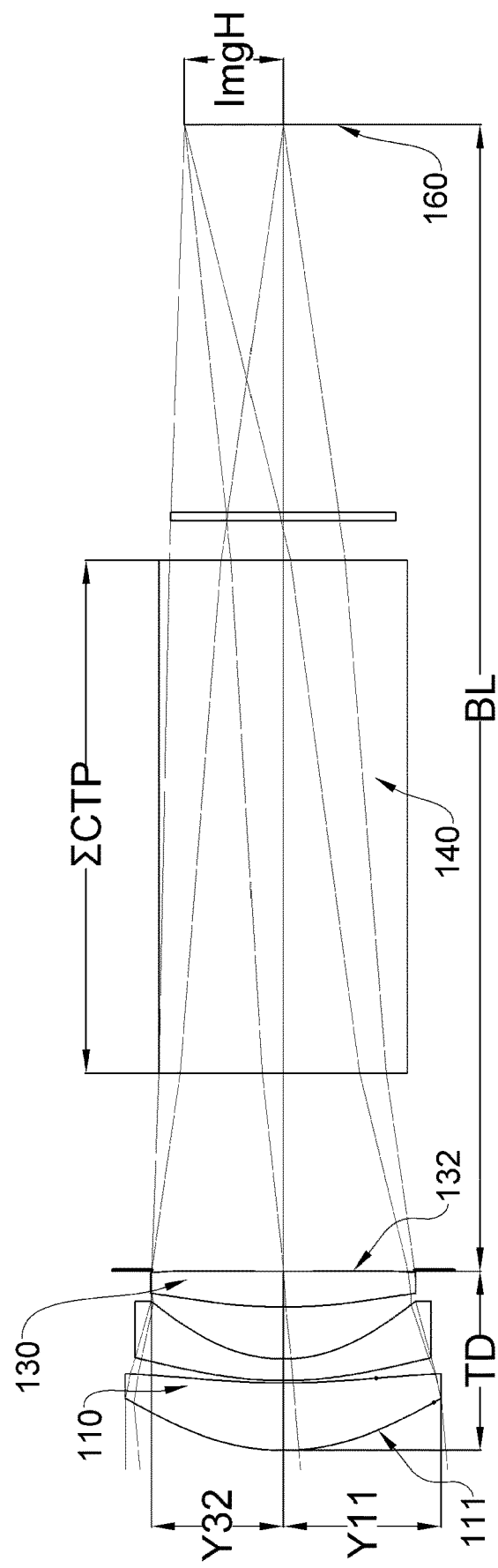
FIG. 14A is a schematic view showing the parameters Y11, Y32, ΣCTP, TD, BL and ImgH according to the 1st embodiment of the present disclosure as an example.

Please refer to FIG. 14A, which is a schematic view showing the parameters Y11, Y32, ΣCTP, TD, BL and ImgH according to the 1st embodiment of the present disclosure as an example. As shown, the maximum vertical distance between any point on the effective optical region of the object-side surface 111 of the first lens element 110 and the optical axis is Y11. The maximum vertical distance between any point on the effective optical region of the image-side surface 132 of the third lens element 130 and the optical axis is Y32. In the 1st embodiment of the present disclosure, all deflections of the optical path inside the image-side reflective component are equivalently simulated by the prism 140 for simplifications. The total of axial thicknesses of all prisms of the image-side reflective component (that is the thickness of the prism 140) is ΣCTP. The axial distance between the object-side surface 111 of the first lens element 110 and the image-side surface 132 of the third lens element 130 is TD. The axial distance between the image-side surface 132 of the third lens element 130 and the image surface 160 is BL. The maximum image height of the imaging optical system is ImgH.

Figure 14B:
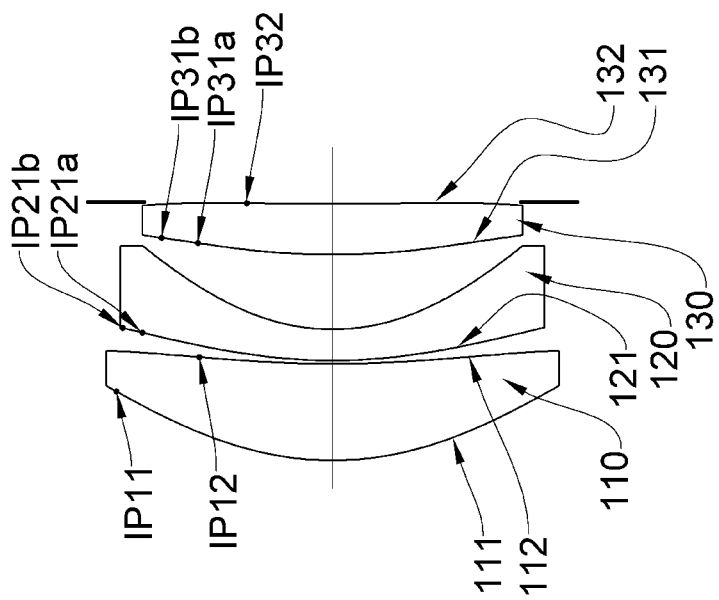
FIG. 14B is a schematic view showing inflection points according to the 1st embodiment of the present disclosure as an example.

Please refer to FIG. 14B, which is a schematic view showing the inflection points according to the 1st embodiment of the present disclosure as an example. As shown, the first lens element 110 has an inflection point IP11 on the object-side surface 111 thereof and an inflection point IP12 on the image-side surface 112 thereof. The second lens element 120 has two inflection points IP21a, IP21b on the object-side surface 121 thereof. The third lens element 130 has two inflection points IP31a, IP31b on the object-side surface 131 and an inflection point IP32 on the image-side surface 132 thereof.

Figure 15A:
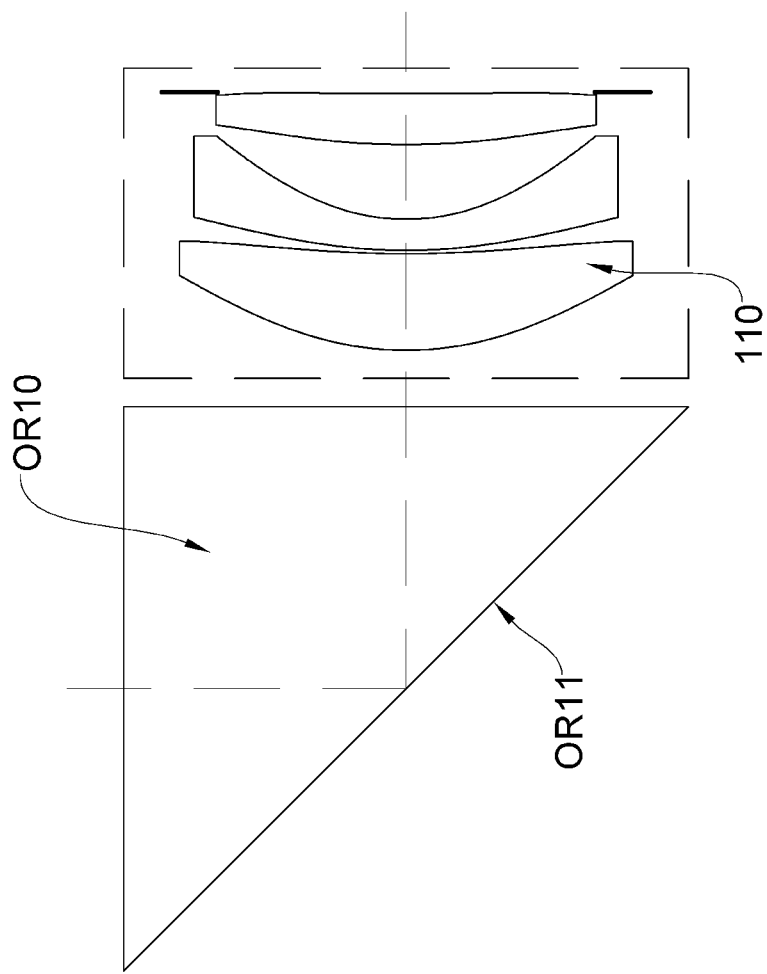
FIG. 15A is a schematic view of an imaging optical system including an object-side reflective component according to the 1st embodiment of the present disclosure as an example.

Please refer to FIG. 15A, which is a schematic view of an imaging optical system including an object-side reflective component according to the 1st embodiment of the present disclosure as an example. As shown, there is an object-side reflective component OR10 disposed at the object side of the first lens element 110. The object-side reflective component OR10 is a prism which includes a reflective surface OR11 therein.

Figure 15B:
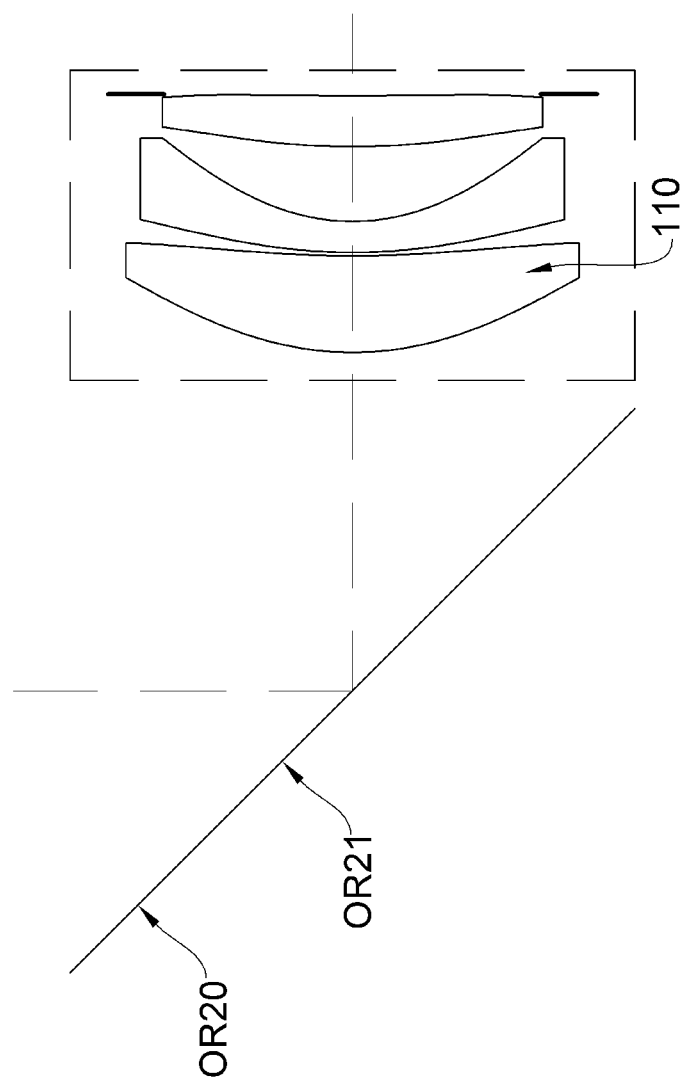
FIG. 15B is a schematic view of an imaging optical system including another object-side reflective component according to the 1st embodiment of the present disclosure as an example.

Please refer to FIG. 15B, which is a schematic view of an imaging optical system including another object-side reflective component according to the 1st embodiment of the present disclosure as an example. As shown, there is an object-side reflective component OR20 disposed at the object side of the first lens element 110. The object-side reflective component OR20 is a mirror which includes a reflective surface OR21 therein.

Figure 15C:
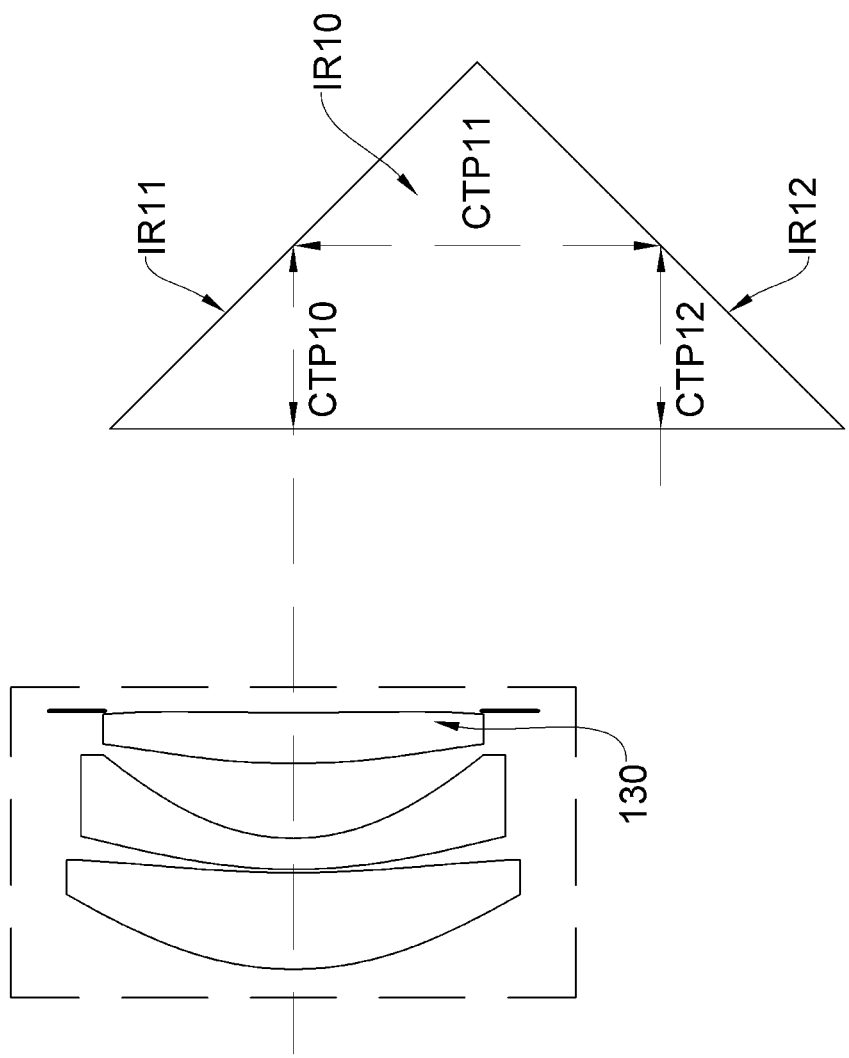
FIG. 15C is a schematic view of an imaging optical system including an image-side reflective component according to the 1st embodiment of the present disclosure as an example.

Please refer to FIG. 15C, which is a schematic view of an imaging optical system including an image-side reflective component according to the 1st embodiment of the present disclosure as an example. As shown, there is an image-side reflective component IR10 disposed at the image side of the third lens element 130. The image-side reflective component IR10 is a prism which includes two reflective surfaces IR11, IR12 therein. As shown, since the image-side reflective component IR10 includes two reflective surfaces IR11, IR12, deflections of the optical path occur. If the deflected optical path is equivalently mapped, it will become the same as the simulated result shown in the 1st embodiment. For example, a total of axial thicknesses of the prism of the image-side reflective component IR10 is ΣCTP (that is, the length of the optical axis inside the image-side reflective component IR10 is CTP10+CTP11+CTP12), which is equivalent to the axial thickness of the prism 140 according to the 1st embodiment.

Figure 15D:
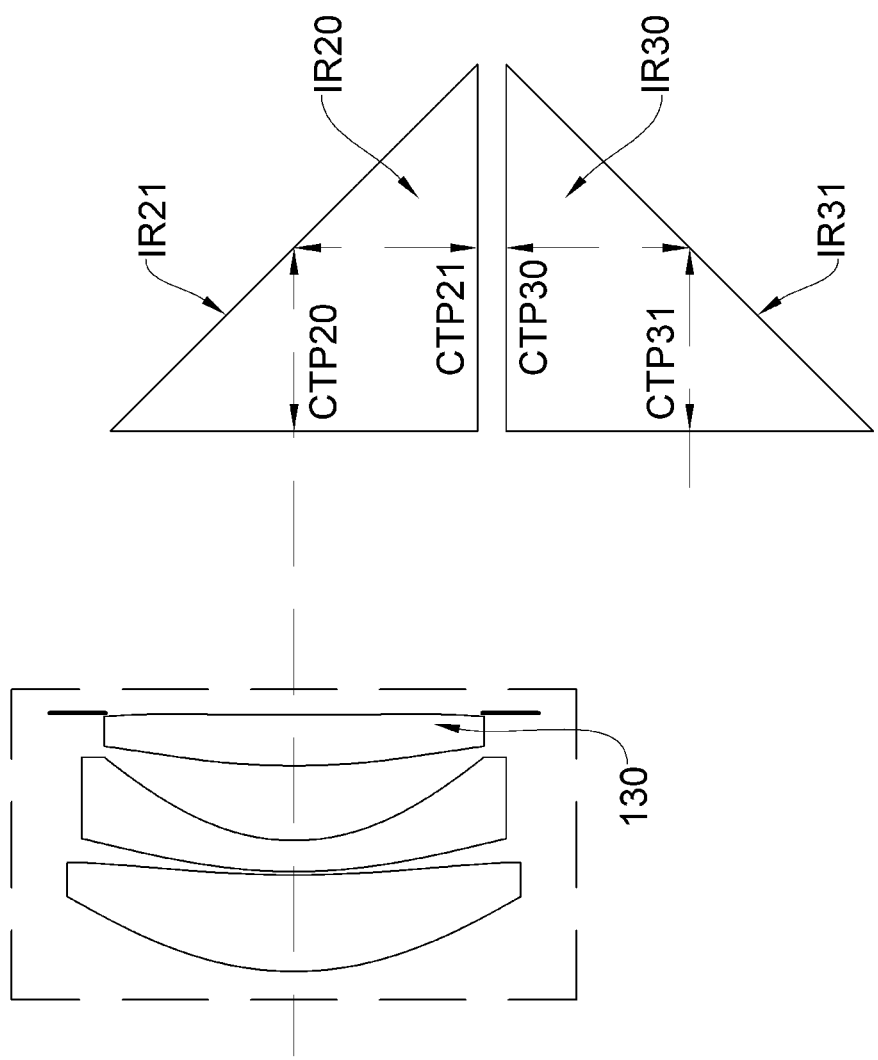
FIG. 15D is a schematic view of an imaging optical system including two image-side reflective components according to the 1st embodiment of the present disclosure as an example.

Please refer to FIG. 15D, which is a schematic view of an imaging optical system including two image-side reflective components according to the 1st embodiment of the present disclosure as an example. As shown, there are two image-side reflective components IR20, IR30 disposed at the image side of the third lens element 130. The image-side reflective components IR20, IR30 are both prisms and include reflective surfaces IR21, IR31 therein, respectively. As shown, since the image-side reflective components IR20, IR30 include the reflective surfaces IR21, IR31, deflections of the optical path occur. If the deflected optical path is equivalently mapped, it will become as the simulated result shown in the 1st embodiment. For example, a total of axial thicknesses of the prism of the image-side reflective components IR20, IR30 is ΣCTP (that is, the length of the optical axis inside the image-side reflective components IR20, IR30 is CTP20+CTP21+CTP30+CTP31), which is equivalent to the axial thickness of the prism 140 according to the 1st embodiment.

Figure 15E:
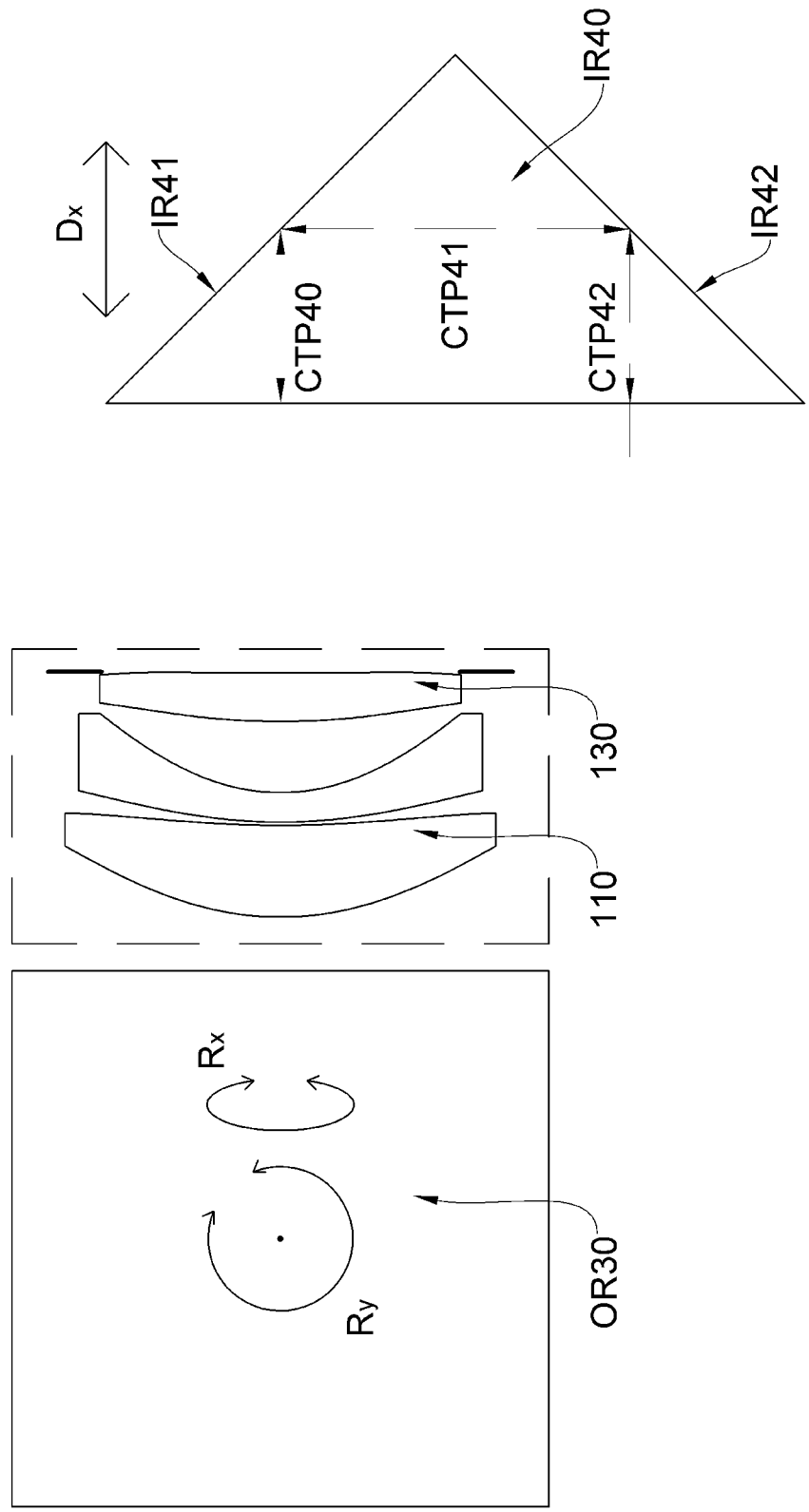
FIG. 15E is a schematic top view of an imaging optical system including an object-side reflective component and an image-side reflective component according to the 1st embodiment of the present disclosure as an example.
Figure 15F:
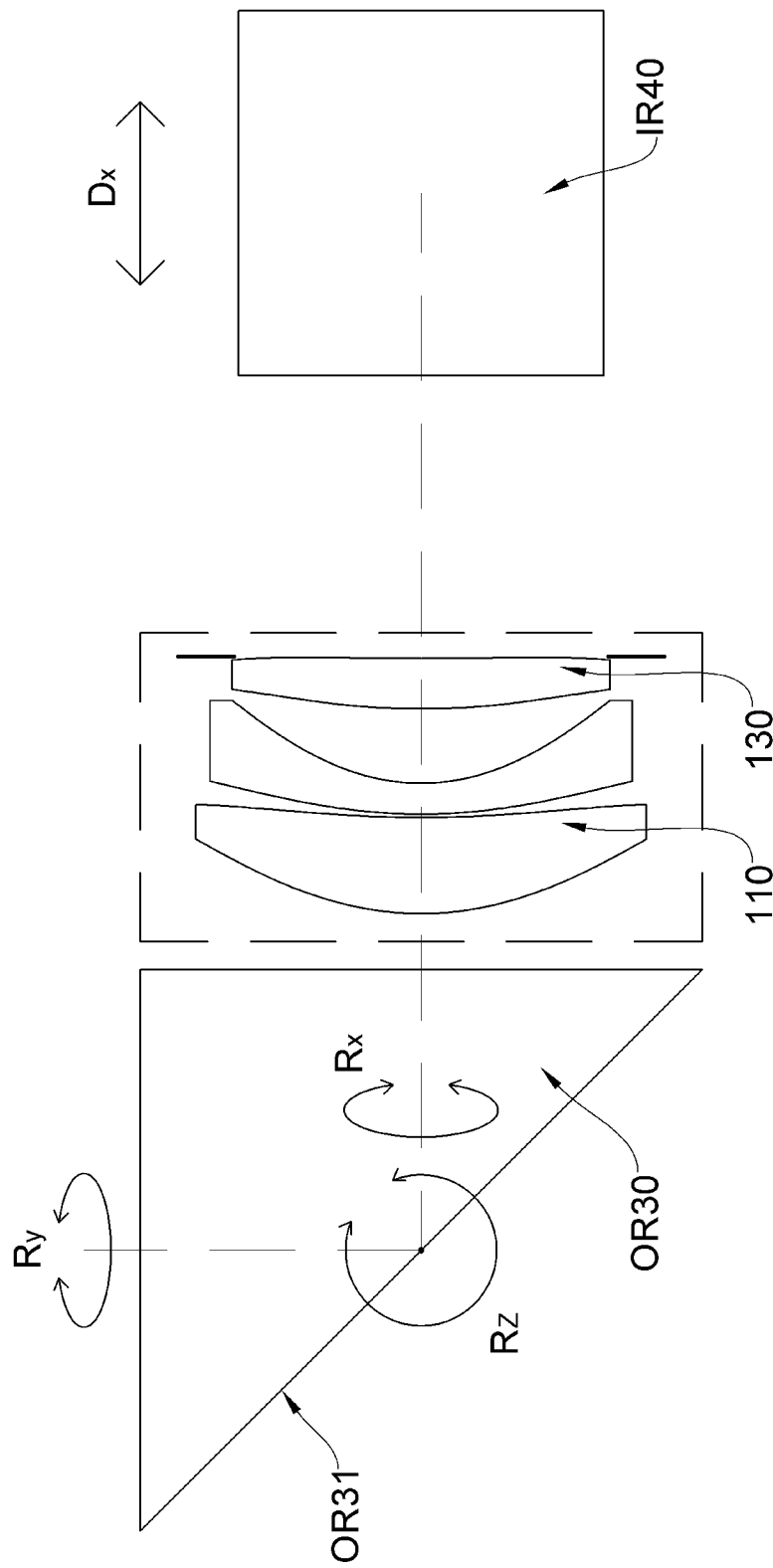
FIG. 15F is a schematic side view of the imaging optical system including the object-side reflective component and the image-side reflective component according to the 1st embodiment of the present disclosure as an example.

Please refer to FIG. 15E, which is a schematic top view of an imaging optical system including an object-side reflective component and an image-side reflective component according to the 1st embodiment of the present disclosure as an example, and FIG. 15F, which is a schematic side view of the imaging optical system including the object-side reflective component and the image-side reflective component according to the 1st embodiment of the present disclosure as an example. As shown, there is one optical side reflective component OR30 disposed at the object side of the first lens element 110. The object side reflective component OR30 is a prism which includes a reflective surface OR31 therein. There is one image-side reflective component IR40 at the image side of the third lens element 130. The image-side reflective component IR40 is a prism which includes two reflective surfaces IR41, IR42 therein. As shown, since the object-side reflective component OR30 includes the reflective surface OR31 and the image-side reflective components IR41, IR42 include the reflective surfaces IR41, IR42, deflections of the optical path occur. If the deflected optical path is equivalently mapped, it will become the same as the simulated result of the 1st embodiment. As shown, the reflective surface OR31 of the object-side reflective component OR30 can be driven by a driving device and tilted. The reflective surface OR31 can rotate around three axes (Rx, Ry and Rz) to achieve an optical image stabilization function while the image-side reflective component IR40 can move (Dx) to achieve an autofocus function. For example, a total of axial thicknesses of the prism of the image-side reflective components IR40 is ΣCTP (that is, the length of the optical axis inside the image-side reflective components IR40 is CTP40+CTP41+CTP42), which is equivalent to the axial thickness of the prism 140 according to the 1st embodiment.

Figure 16A:
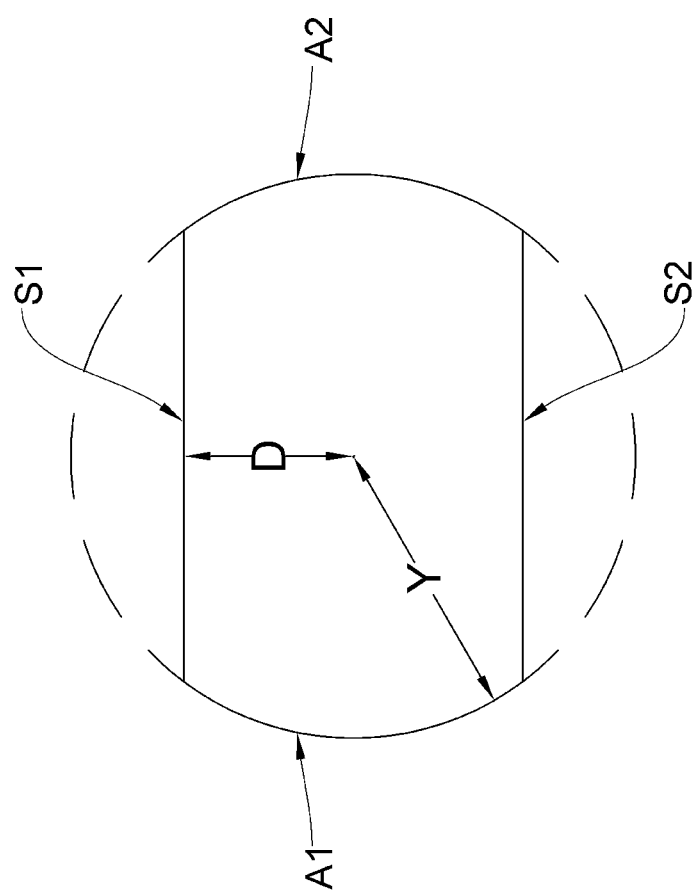
FIG. 16A is a schematic view showing a lens element of the imaging optical system having an effective optical region thereof being a non-circular shape according to the present disclosure.

Please refer to FIG. 16A, which is a schematic view showing a lens element of the imaging optical system having an effective optical region thereof being a non-circular shape according to the present disclosure. As shown, each of the first lens element, the second lens element and the third lens element of the imaging optical system has effective optical regions of the object-side surface and the image-side surface thereof being a non-circular shape, which includes two arc portions A1, A2 and two straight portions S1, S2. The two straight portions S1, S2 can be parallel to each other (Only one surface of a lens element is shown as an example. All surfaces of all lens elements of the imaging optical system according to the present disclosure may have similar configurations or combinations). A distance between the straight portions S1, S2 and the optical axis is D. A radius of the arc portions A1, A2 is Y.

Figure 16B:
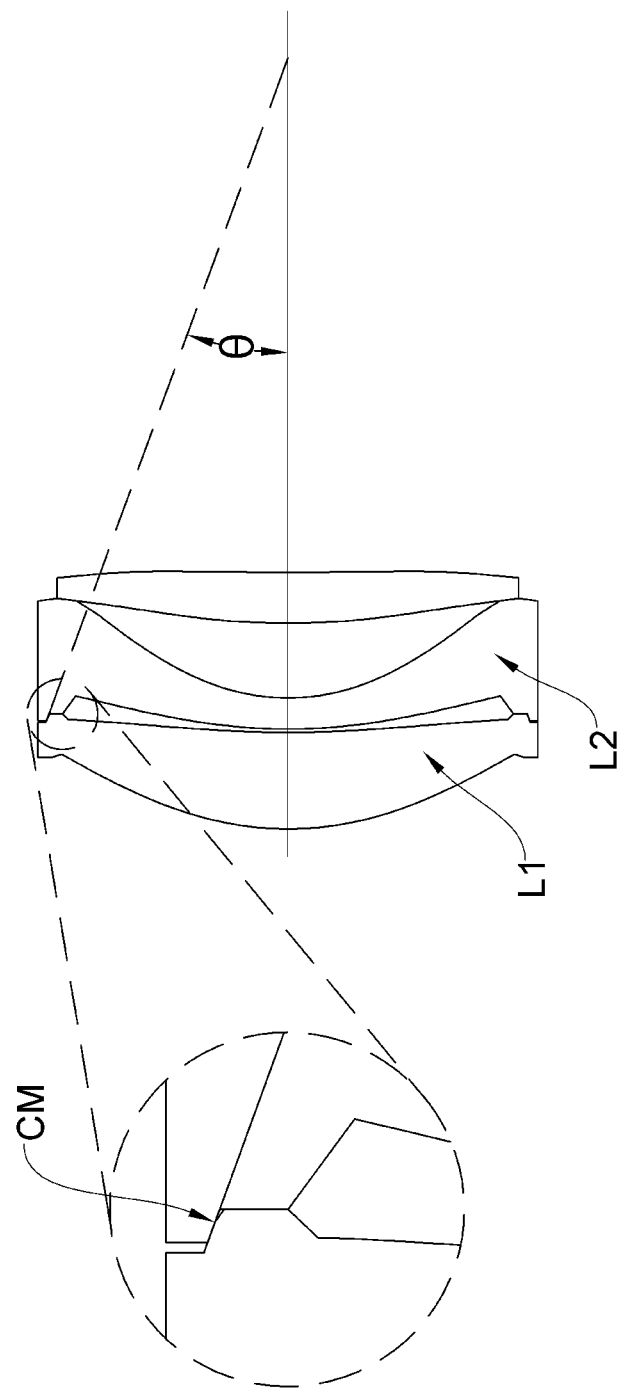
FIG. 16B is a schematic view showing fitting structures of the imaging optical system according to the present disclosure.

Please refer to FIG. 16B, which is a schematic view showing the fitting structures of the imaging optical system according to the present disclosure. As shown, the first lens element L1 and the second lens element L2 have fitting structures outside effective optical regions thereof. An angle between an extension line at a fitting position CM of the fitting structures and the optical axis is θ. An intersection of the extension line at the fitting position CM and the optical axis locates in the image side of the fitting position CM. The first lens element L1 and the second lens element L2 shown herewith are merely exemplary, any two adjacent lens elements of the imaging optical system of the present disclosure may all have fitting structures outside effective optical regions thereof.

Each of the aforementioned features of the imaging optical system can be utilized in numerous combinations, so as to achieve the corresponding effects.

According to the imaging optical system of the present disclosure, the object side and the image side is defined along the optical axis. The parameters such as ΣCTP, which is the total of all axial thicknesses of the prism of the image-side reflective component, and BL, which is the axial distance between the image-side surface of the third lens element and the image surface, are calculated along the optical axis when the optical axis is deflected. The inflection points are transition points on the lens surfaces where the curvature radius thereof changes between positive and negative at the transition points.

According to the imaging optical system of the present disclosure, the lens elements thereof can be made of glass or plastic material. When the lens elements are made of glass material, the distribution of the refractive power of the lens system may be more flexible to design and reduce the effect of external environmental temperature on imaging. Technologies such as grinding or molding can be used for producing glass lens elements. When the lens elements are made of plastic material, the manufacturing cost can be effectively reduced. Furthermore, surfaces of each lens element can be arranged to be spherical or aspheric (ASP). The spherical surfaces can reduce the difficulties in manufacturing while the aspheric surfaces can have more control variables for eliminating aberrations and to further decrease the required quantity of lens elements, the total track length of the imaging optical system can be effectively reduced. Process such as plastic injection molding or molded glass lens can be used for making the aspheric surfaces.

According to the imaging optical system of the present disclosure, if a surface of a lens element is aspheric, it means that the surface has an aspheric shape throughout its optical effective area, or a portion(s) thereof.

According to the imaging optical system of the present disclosure, additives may be selectively added to the material of any one (or more) lens element to change the transmittance of said lens element in a particular wavelength range of light, so as to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the lens elements. Thus, additives can prevent the interference caused to the image by light in a particular wavelength range. In addition, additives may be evenly mixed in the plastic material for manufacturing lens elements with an injection molding process.

According to the imaging optical system of the present disclosure, the imaging optical system can include at least one stop, such as an aperture stop, a glare stop or a field stop, so as to favorably reduce the amount of stray light and thereby improving the image quality.

According to the imaging optical system of the present disclosure, an aperture stop can be configured as a front stop or a middle stop. The front stop disposed between an imaged object and the first lens element can provide a longer distance between an exit pupil of the imaging optical system and the image surface so that the generated telecentric effect can improve the image-sensing efficiency of an image sensor, such as a CCD or CMOS sensor. The middle stop disposed between the first lens element and the image surface is favorable for enlarging the field of view of the imaging optical system, thereby providing the imaging optical system with the advantage of a wide-angle lens.

An aperture control unit may be disposed in the imaging optical system of the present disclosure. The aperture control unit may be a mechanical part or optical moderation part, in which the size and shape of the aperture may be controlled by electricity or electronic signals. The mechanical part may include moving parts such as blades, shielding sheets, etc. The optical moderation part may include shielding materials such as filters, electrochromic materials, liquid crystal layers, etc. The aperture control unit can control the amount of incoming light and exposure time so as to further improve the image quality. Meanwhile, the aperture control unit may represent the aperture in the present disclosure that can adjust the image properties such as depth of field or exposure speed by changing the f-number of the imaging optical system.

According to the imaging optical system of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the imaging optical system of the present disclosure, the image surface of the imaging optical system, based on the corresponding image sensor, can be a plane or a curved surface with an arbitrary curvature, especially a curved surface being concave facing towards the object side. Meanwhile, the imaging optical system of the present disclosure may optionally include one or more image correction components (such as a field flattener) between the image surface and the lens element closest to the image surface for the purpose of image corrections (such as field curvature correction). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. Preferably, an image correction component may be a thin plano-concave component having a surface being concave toward the object side and be arranged near the image surface.

According to the above description of the present disclosure, the following specific embodiments are provided for further explanation.

1st Embodiment

Figure 1B:
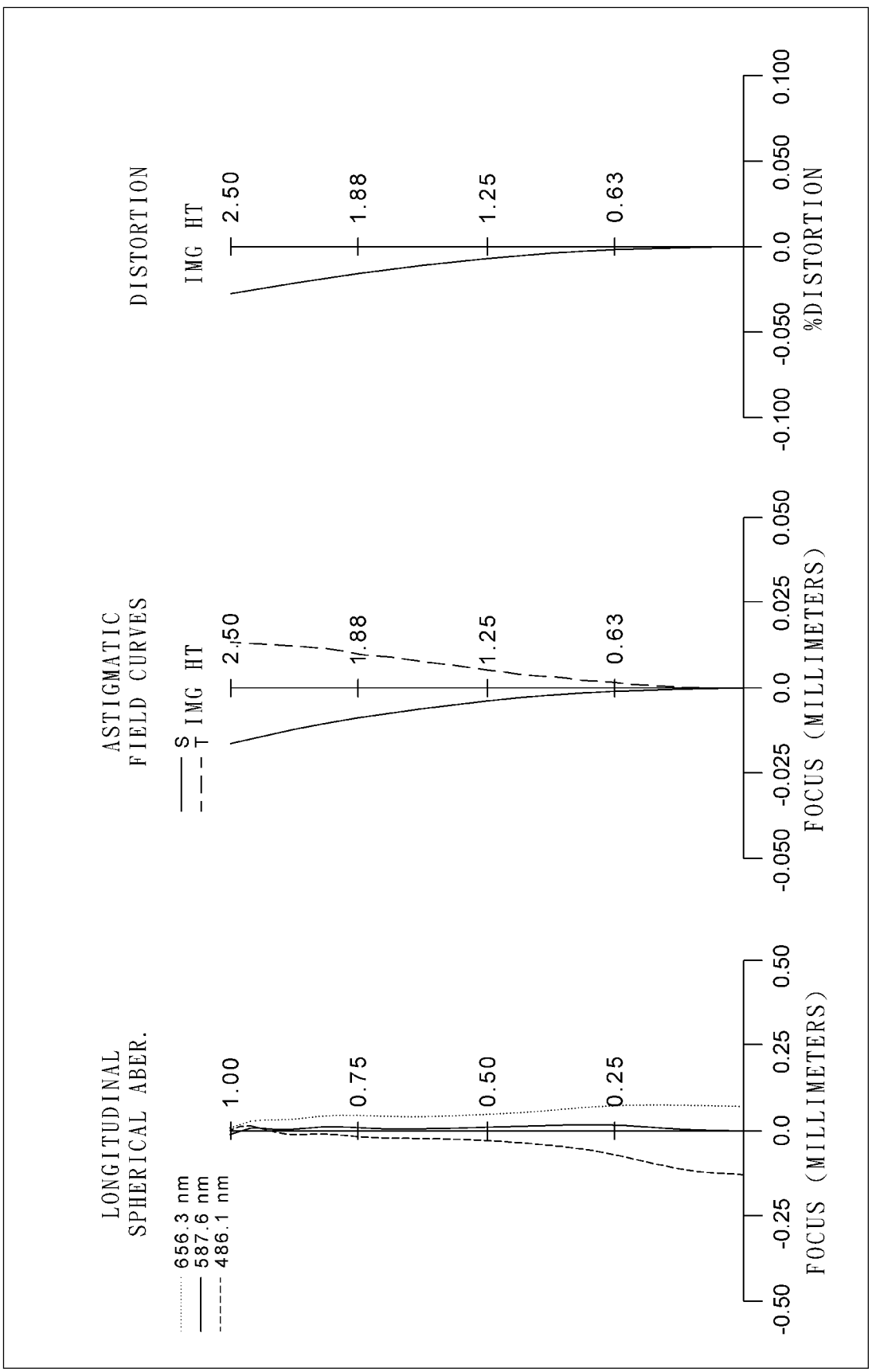
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an imaging optical system (not otherwise herein labeled) of the present disclosure and an image sensor 165. The imaging optical system includes, in order from an object side to an image side, a first lens element 110, a second lens element 120, a third lens element 130, an aperture stop 100, a prism 140, a filter 150, and an image surface 160. There is no additional lens element inserted between the first lens element 110 and the third lens element 130 and there are air gaps between paraxial regions of the first lens element 110, the second lens element 120 and the third lens element 130.

The first lens element 110 with positive refractive power has an object-side surface 111 being convex in the paraxial region thereof, and an image-side surface 112 being concave in the paraxial region thereof. Both the object-side surface 111 and the image-side surface 112 are aspheric. There are one inflection point on the object-side surface 111 and one inflection point on the image-side surface 112. The first lens element 110 is made of plastic material.

The second lens element 120 with negative refractive power has an object-side surface 121 being convex in the paraxial region thereof, and an image-side surface 122 being concave in the paraxial region thereof. Both the object-side surface 121 and the image-side surface 122 are aspheric. There are two inflection points on the object-side surface 121. The second lens element 120 is made of plastic material.

The third lens element 130 with positive refractive power has an object-side surface 131 being convex in the paraxial region thereof, and an image-side surface 132 being concave in the paraxial region thereof. Both the object-side surface 131 and the image-side surface 132 are aspheric. There are two inflection points on the object-side surface 131 and one inflection point on the image-side surface 132. The third lens element 130 is made of glass material.

The prism 140 is disposed between the third lens element 130 and the filter 150. The prism 140 is made of glass material. The filter 150 is disposed between the prism 140 and the image surface 160. The filter 150 is made of glass material and will not affect the focal length of the imaging optical system. The image sensor 165 is disposed on the image surface 160 of the imaging optical system.

The detailed optical data of the 1st embodiment are shown in TABLE 1, wherein the units of the curvature radius, the thickness and the focal length are expressed in mm, f is a focal length of the imaging optical system, Fno is an f-number of the imaging optical system, HFOV is a half of the maximal field of view, and surfaces #0 to #12 refer to the surfaces in order from the object side to the image side. The aspheric surface data are shown in TABLE 2, wherein k is the conic coefficient in the equation of the aspheric surface profiles, and A4-A16 refer to the 4th to 16th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 28.23 mm, Fno = 3.53, HFOV = 5.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.541 | ASP | 1.709 | Plastic | 1.584 | 28.2 | 13.69 |
| 2 | | 15.975 | ASP | 0.060 | | | | |
| 3 | Lens 2 | 8.887 | ASP | 0.553 | Plastic | 1.650 | 21.5 | −10.37 |
| 4 | | 3.741 | ASP | 1.326 | | | | |
| 5 | Lens 3 | 14.695 | ASP | 0.900 | Glass | 1.810 | 40.9 | 19.59 |
| 6 | | 193.424 | ASP | 0.030 | | | | |
| 7 | Ape. Stop | Plano | | 5.000 | | | | |
| 8 | Prism | Plano | | 13.007 | Glass | 1.772 | 49.6 | — |
| 9 | | Plano | | 1.000 | | | | |
| 10 | Filter | Plano | | 0.210 | Glass | 1.517 | 64.2 | — |
| 11 | | Plano | | 9.835 | | | | |
| 12 | Image Surface | Plano | | — | | | | |

Remark: Reference wavelength is d-line 587.6 nm.
* The effective radius of Surface 1 is 4.010 mm.

TABLE 2

Aspheric Coefficient

| Surface # | 1 | 2 | 3 | 4 | 5 | 6 |
|---|---|---|---|---|---|---|
| k = | −1.0627E+00 | −2.0057E+01 | 7.8560E−02 | −4.0977E−02 | −1.2780E+00 | −9.9000E+01 |
| A4 = | −1.3161E−04 | −4.5068E−03 | −4.1303E−03 | −2.4875E−04 | 1.7967E−03 | 1.0398E−03 |
| A6 = | 1.5293E−07 | 1.4360E−03 | 1.0869E−03 | −2.8403E−04 | −1.1273E−04 | −1.5121E−04 |
| A8 = | −4.8187E−06 | −2.5597E−04 | −1.9981E−04 | −1.0592E−04 | −9.5972E−05 | −4.5258E−05 |
| A10 = | 4.6481E−07 | 2.5490E−05 | 2.0669E−05 | 2.9615E−05 | 2.1512E−05 | 1.1965E−05 |
| A12 = | −3.0004E−08 | −1.4345E−06 | −1.1879E−06 | −3.5437E−06 | −2.1464E−06 | −1.2727E−06 |
| A14 = | 1.5948E−09 | 4.2849E−08 | 3.4707E−08 | 2.0393E−07 | 1.0941E−07 | 6.8595E−08 |
| A16 = | −4.1036E−11 | −5.3363E−10 | −3.8851E−10 | −4.8103E−09 | −2.2889E−09 | −1.5191E−09 |

The equation of the aspheric surface profiles is expressed as follows:

$$X(Y) = (Y^2/R)/\left(1 + sqrt(1-(1+k)*(Y/R)^2)\right) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, the focal length of the imaging optical system is f, the f-number of the imaging optical system is Fno, and the half of the maximal field of view of the imaging optical system is HFOV. These parameters have the following values: f=28.23 mm; Fno=3.53; and HFOV=5.1 degrees.

In the 1st embodiment, a minimum among ratios of an abbe number to a refractive index of each the first lens element 110, second lens element 120 and the third lens element 130 is (V/N)min, and it satisfies the condition: (V/N)min=13.01. (That is the ratio of an Abbe number V2 to a refractive index N2 of the second lens element 120)

In the 1st embodiment, the Abbe number of the second lens element 120 is V2, and it satisfies the condition: V2=21.5.

In the 1st embodiment, an Abbe number of the first lens element is V1, the Abbe number of the second lens element is V2, an Abbe number of the third lens element is V3, and they satisfy the condition: V1+V2+V3=90.6.

In the 1st embodiment, a minimum among Abbe numbers of the first lens element 110, the second lens element 120 and the third lens element 130 is V min, and it satisfies the condition: V min=21.5. (That is the Abbe number V2 of the second lens element 120 and it satisfies the condition: V2=21.5)

In the 1st embodiment, a central thickness of the first lens element 110 is CT1, a central thickness of the second lens element 120 is CT2, a central thickness of the third lens element 130 is CT3, an axial distance between the first lens element 110 and the second lens element 120 is T12, an axial distance between the second lens element 120 and the third lens element 130 is T23, and they satisfy the condition: (CT1+CT2+CT3)/(T12+T23)=2.28. In the 1st embodiment, an axial distance between two adjacent lens elements means an axial distance between two adjacent surfaces of the two adjacent lens elements.

In the 1st embodiment, a total of axial thickness of prism 140 is ΣCTP, an axial distance between the object-side surface 111 of the first lens element 110 and the image-side surface 132 of the third lens element 130 is TD, and they satisfy the condition: ΣCTP/TD=2.86.

In the 1st embodiment, an axial distance between the image-side surface 132 of the third lens element 130 and the image surface 160 is BL, the axial distance between the object-side surface 111 of the first lens element 110 and the image-side surface 132 of the third lens element 130 is TD, and they satisfy the condition: BL/TD=6.39.

In the 1st embodiment, the central thickness of the second lens element 120 is CT2, the central thickness of the third lens element 130 is CT3, the axial distance between the second lens element 120 and the third lens element 130 is T23, and they satisfy the condition: (CT2+CT3)/T23=1.10.

In the 1st embodiment, the axial distance between the first lens element 110 and the second lens element 120 is T12, the axial distance between the second lens element 120 and the third lens element 130 is T23, and they satisfy the condition: T23/T12=22.10.

In the 1st embodiment, the axial distance between the object-side surface 111 of the first lens element 110 and the image-side surface 132 of the third lens element 130 is TD, an entrance pupil diameter of the imaging optical system is EPD, and they satisfy the condition: TD/EPD=0.57.

In the 1st embodiment, the axial distance between the object-side surface 111 of the first lens element 110 and the image-side surface 132 of the third lens element 130 is TD, a maximum image height of the imaging optical system is ImgH, and they satisfy the condition: TD/ImgH=1.82.

In the 1st embodiment, a curvature radius of the object-side surface 111 of the first lens element 110 is R1, a curvature radius of the image-side surface 112 of the first lens element 110 is R2, and they satisfy the condition: (R1−R2)/(R1+R2)=−0.48.

In the 1st embodiment, a curvature radius of the object-side surface 121 of the second lens element 120 is R3, a curvature radius of the image-side surface 122 of the second lens element 120 is R4, and they satisfy the condition: (R3−R4)/(R3+R4)=0.41.

In the 1st embodiment, the focal length of the imaging optical system is f, a focal length of the first lens element 110 is f1, a focal length of the second lens element 120 is f2, a focal length of the third lens element 130 is f3, and they satisfy the condition: |f/f1|+|f/f2|+|f/f3|=6.22.

In the 1st embodiment, the focal length of the imaging optical system is f, the focal length of the first lens element 110 is f1, and they satisfy the condition: f/f1=2.06.

In the 1st embodiment, the focal length of the imaging optical system is f, the focal length of the second lens element 120 is f2, and they satisfy the condition: f/f2=−2.72.

In the 1st embodiment, the focal length of the imaging optical system is f, the focal length of the third lens element 130 is f3, and they satisfy the condition: f/f3=1.44.

In the 1st embodiment, the focal length of the imaging optical system is f, the maximum image height of the imaging optical system is ImgH, and they satisfy the condition: f/ImgH=11.28.

In the 1st embodiment, the focal length of the imaging optical system is f, the axial distance between the object-side surface 111 of the first lens element 110 and the image-side surface 132 of the third lens element 130 is TD, and they satisfy the condition: f/TD=6.21.

In the 1st embodiment, a composite focal length of the first lens element 110 and the second lens element 120 is f12, a focal length of the third lens element 130 is f3, and they satisfy the condition: f12/f3=−6.59.

In the 1st embodiment, a maximum vertical distance between any point on an effective optical region of the object-side surface 111 of the first lens element 110 and an optical axis is Y11, the axial distance between the object-side surface 111 of the first lens element 110 and the image-side surface 132 of the third lens element 130 is TD, and they satisfy the condition: Y11/TD=0.88.

In the 1st embodiment, the maximum vertical distance between any point in the effective optical region of the object-side surface 111 of the first lens element 110 and the optical axis is Y11, a maximum vertical distance between any point on an effective optical region of the image-side surface 132 of the third lens element 130 and the optical axis is Y32, and they satisfy the condition: Y11/Y32=1.20.

In the 1st embodiment, the maximum vertical distance between any point in the effective optical region of the image-side surface 132 of the third lens element 130 and the optical axis is Y32, the axial distance between the object-side surface 111 of the first lens element 110 and the image-side surface 132 of the third lens element 130 is TD, and they satisfy the condition: Y32/TD=0.73.

2nd Embodiment

Figure 2A:
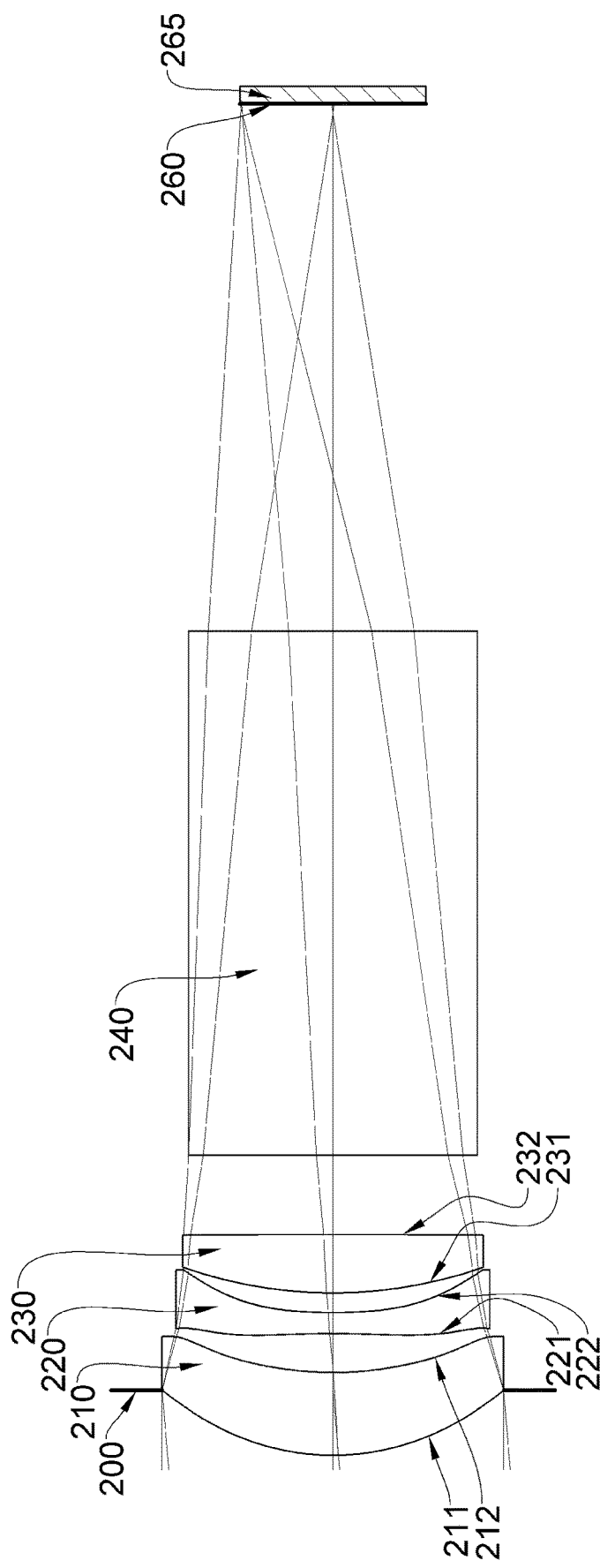
FIG. 2A is a schematic view of an imaging apparatus according to the 2nd embodiment of the present disclosure.
Figure 2B:
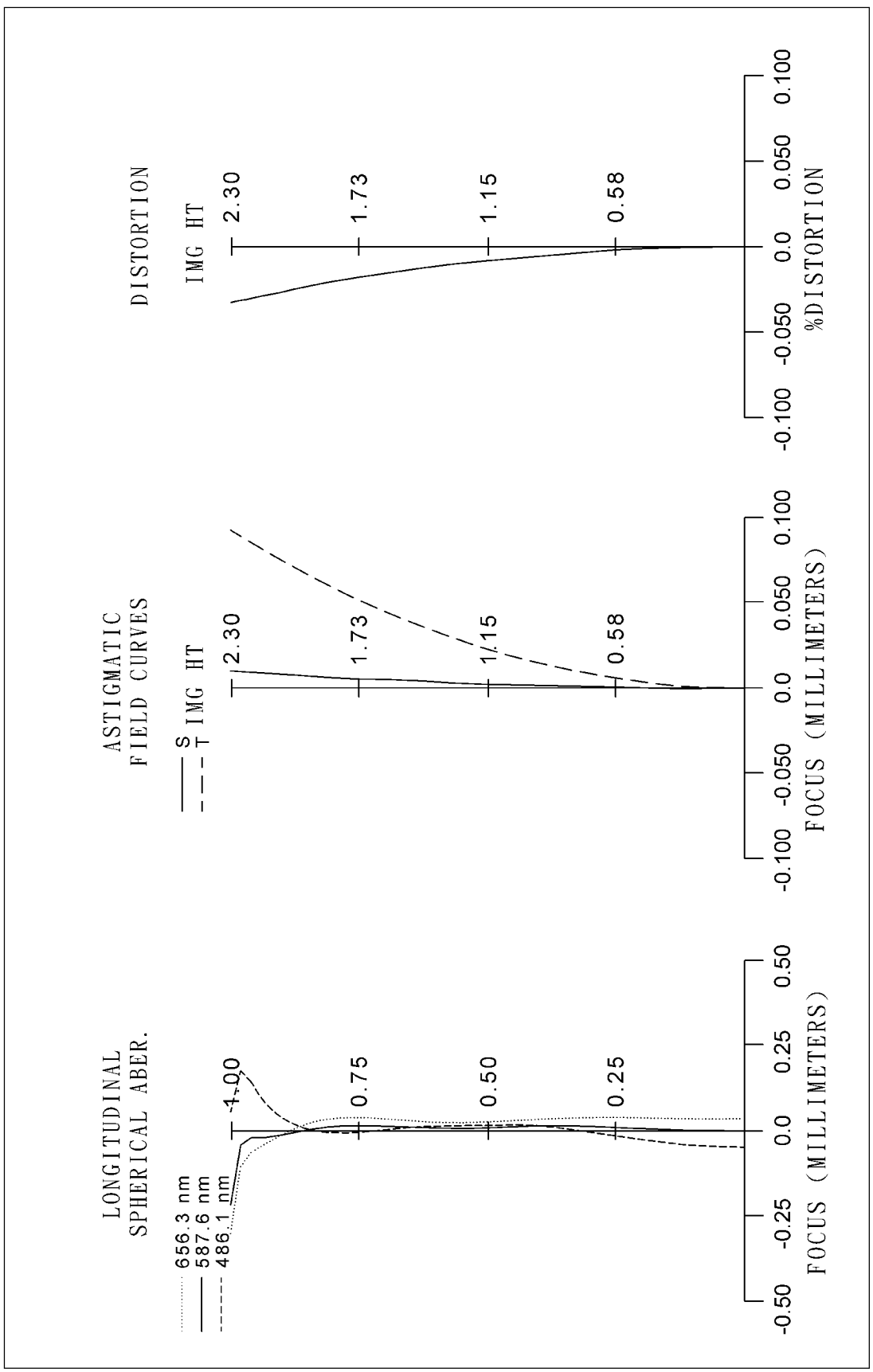
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an imaging optical system (not otherwise herein labeled) of the present disclosure and an image sensor 265. The imaging optical system includes, in order from an object side to an image side, an aperture stop 200, a first lens element 210, a second lens element 220, a third lens element 230, a prism 240, and an image surface 260. There is no additional lens element inserted between the first lens element 210 and the third lens element 230 and there are air gaps between paraxial regions of the first lens element 210, the second lens element 220 and the third lens element 230.

The first lens element 210 with positive refractive power has an object-side surface 211 being convex in the paraxial region thereof, and an image-side surface 212 being concave in the paraxial region thereof. Both the object-side surface 211 and the image-side surface 212 are aspheric. There is one inflection point on the image-side surface 212. The first lens element 210 is made of plastic material.

The second lens element 220 with negative refractive power has an object-side surface 221 being concave in the paraxial region thereof, and an image-side surface 222 being concave in the paraxial region thereof. Both the object-side surface 221 and the image-side surface 222 are aspheric. There are two inflection points on the object-side surface 221. The second lens element 220 is made of plastic material.

The third lens element 230 with positive refractive power has an object-side surface 231 being convex in the paraxial region thereof, and an image-side surface 232 being convex in the paraxial region thereof. Both the object-side surface 231 and the image-side surface 232 are spherical. The third lens element 230 is made of glass material.

The prism 240 is disposed between the third lens element 230 and the image surface 260. The prism 240 is made of glass material. The image sensor 265 is disposed on the image surface 260 of the imaging optical system.

The detailed optical data of the 2nd embodiment are shown in TABLE 3, and the aspheric surface data are shown in TABLE 4.

TABLE 3

(2nd Embodiment)
f = 28.02 mm, Fno = 3.26, HFOV = 4.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.630 | | | | |
| 2 | Lens 1 | 6.003 | ASP | 2.080 | Plastic | 1.565 | 41.9 | 32.56 |
| 3 | | 7.795 | ASP | 0.982 | | | | |
| 4 | Lens 2 | −23.292 | ASP | 0.534 | Plastic | 1.596 | 27.0 | −14.98 |
| 5 | | 14.593 | ASP | 0.493 | | | | |
| 6 | Lens 3 | 11.435 | SPH | 1.465 | Glass | 1.804 | 46.5 | 14.02 |
| 7 | | −757.877 | SPH | 2.000 | | | | |
| 8 | Prism | Plano | | 13.210 | Glass | 1.676 | 53.5 | — |
| 9 | | Plano | | 13.278 | | | | |
| 10 | Image Surface | Plano | | — | | | | |

Remark: Reference wavelength is d-line 587.6 nm.

TABLE 4

Aspheric Coefficient

| Surface # | 2 | 3 | 4 | 5 |
|---|---|---|---|---|
| k= | −2.1316E−01 | 0.0000E+00 | −9.9000E+01 | 1.0769E+01 |
| A4= | −7.0712E−04 | −2.8167E−03 | 2.0900E−03 | 4.6887E−03 |
| A6= | 6.3779E−05 | 3.1113E−04 | 5.8569E−05 | −1.8663E−04 |
| A8= | −2.3011E−06 | −8.3675E−06 | −2.8622E−07 | 6.3691E−07 |
| A10= | | 5.9202E−07 | −3.8378E−07 | −4.9581E−08 |
| A12= | | −9.5055E−08 | | |
| A14= | | 3.4903E−09 | | |
| A16= | | −3.2404E−11 | | |
| A18= | | −3.4366E−13 | | |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in table below.

| 2nd Embodiment | | | |
|---|---|---|---|
| f [mm] | 28.02 | TD/ImgH | 2.41 |
| Fno | 3.26 | (R1 − R2)/(R1 + R2) | −0.13 |
| HFOV [deg.] | 4.7 | (R3 − R4)/(R3 + R4) | 4.36 |
| (V/N)min | 16.90 | \|f/f1\| + \|f/f2\| + \|f/f3\| | 4.73 |
| V2 | 27.0 | f/f1 | 0.86 |
| V1 + V2 + V3 | 115.4 | f/f2 | −1.87 |
| Vmin | 27.0 | f/f3 | 2.00 |
| (CT1 + CT2 + CT3)/(T12 + T23) | 2.77 | f/ImgH | 12.16 |
| ECTP/TD | 2.38 | f/TD | 5.05 |
| ΣL/TD | 5.13 | f12/f3 | −2.82 |
| (CT2 + CT3)/T23 | 4.05 | Y11/TD | 0.77 |
| (T12 + T23)/CT2 | 2.76 | Y11/Y32 | 1.14 |
| T23/T12 | 0.50 | Y32/TD | 0.68 |
| TD/EPD | 0.65 | | |

3rd Embodiment

Figure 3A:
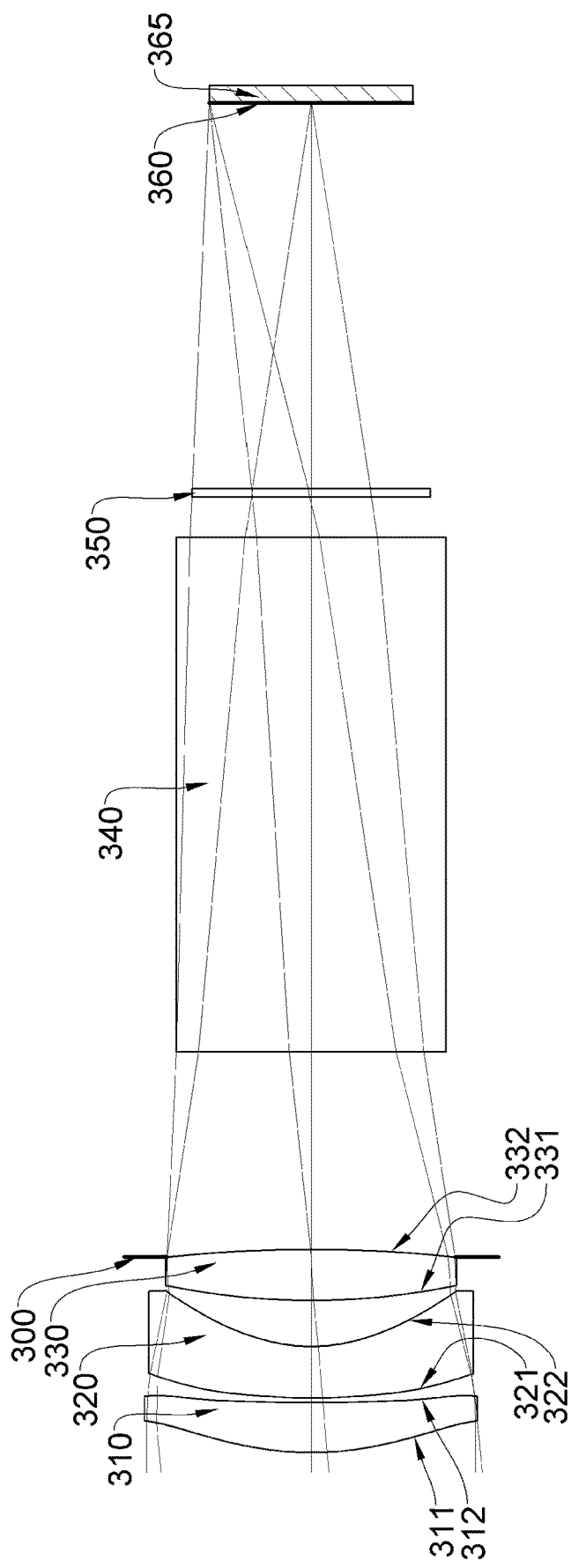
FIG. 3A is a schematic view of an imaging apparatus according to the 3rd embodiment of the present disclosure.
Figure 3B:
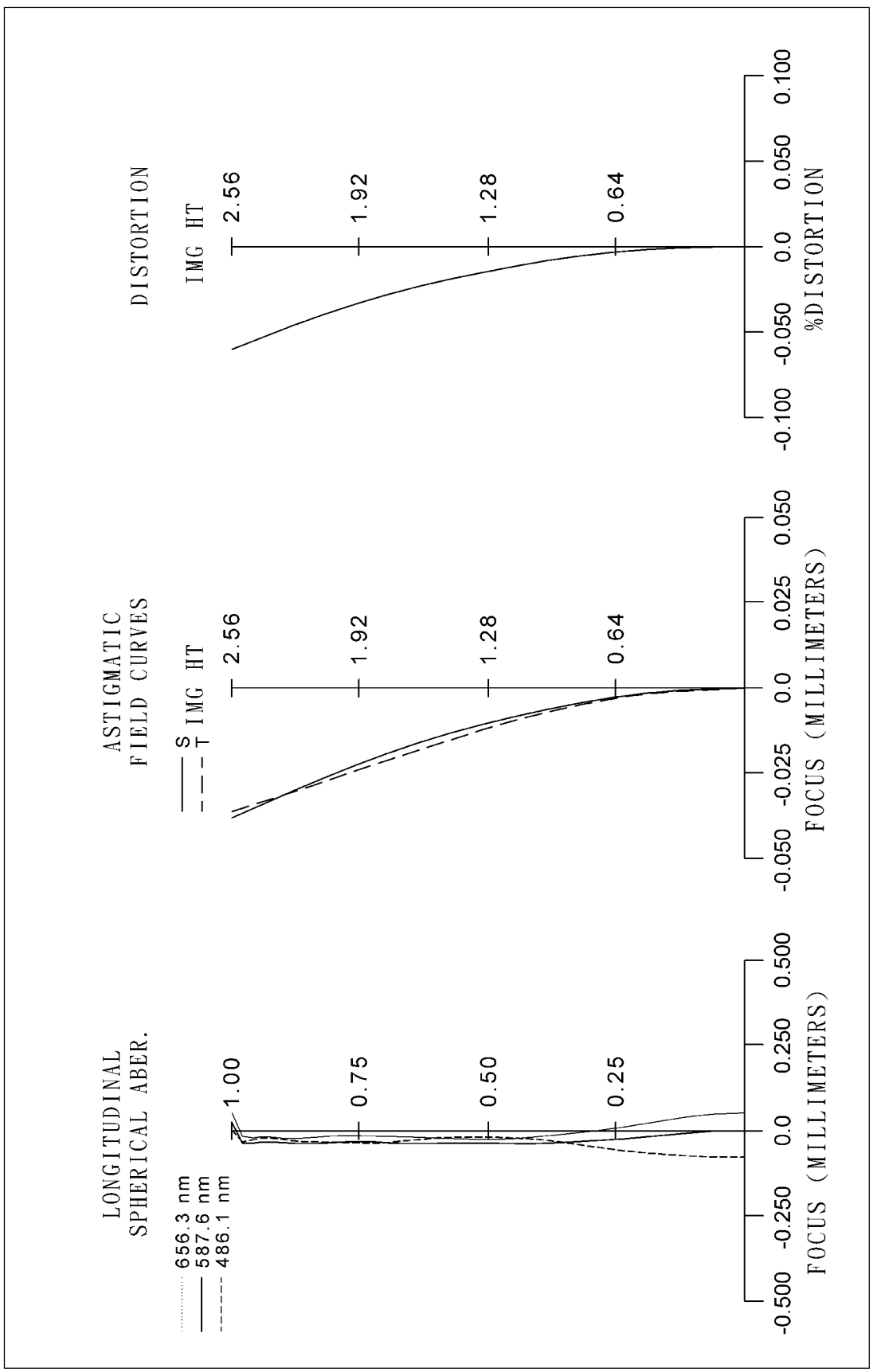
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an imaging optical system (not otherwise herein labeled) of the present disclosure and an image sensor 365. The imaging optical system includes, in order from an object side to an image side, a first lens element 310, a second lens element 320, a third lens element 330, an aperture stop 300, a prism 340, a filter 350, and an image surface 360. There is no additional lens element inserted between the first lens element 310 and the third lens element 330 and there are air gaps between paraxial regions of the first lens element 310, the second lens element 320 and the third lens element 330.

The first lens element 310 with positive refractive power has an object-side surface 311 being convex in the paraxial region thereof, and an image-side surface 312 being concave in the paraxial region thereof. Both the object-side surface 311 and the image-side surface 312 are aspheric. There are one inflection point on the object-side surface 311 and three inflection points on the image-side surface 312. The first lens element 310 is made of plastic material.

The second lens element 320 with negative refractive power has an object-side surface 321 being convex in the paraxial region thereof, and an image-side surface 322 being concave in the paraxial region thereof. Both the object-side surface 321 and the image-side surface 322 are aspheric. The second lens element 320 is made of plastic material.

The third lens element 330 with positive refractive power has an object-side surface 331 being convex in the paraxial region thereof, and an image-side surface 332 being convex in the paraxial region thereof. Both the object-side surface 331 and the image-side surface 332 are spherical. The third lens element 330 is made of glass material.

The prism 340 is disposed between the third lens element 330 and the filter 350. The prism 340 is made of glass material. The filter 350 is disposed between the prism 340 and the image surface 360. The filter 350 is made of glass material and will not affect the focal length of the imaging optical system. The image sensor 365 is disposed on the image surface 360 of the imaging optical system.

The detailed optical data of the 3rd embodiment are shown in TABLE 5, and the aspheric surface data are shown in TABLE 6.

TABLE 5

(3rd Embodiment)
f = 27.53 mm, Fno = 3.32, HFOV = 5.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.805 | ASP | 1.259 | Plastic | 1.623 | 25.7 | 18.43 |
| 2 | | 22.902 | ASP | 0.119 | | | | |
| 3 | Lens 2 | 11.177 | ASP | 1.312 | Plastic | 1.642 | 21.8 | −11.09 |
| 4 | | 4.150 | ASP | 1.157 | | | | |
| 5 | Lens 3 | 17.719 | SPH | 1.283 | Glass | 1.804 | 46.6 | 14.78 |
| 6 | | −34.929 | SPH | −0.189 | | | | |
| 7 | Ape. Stop | Plano | | 5.189 | | | | |
| 8 | Prism | Plano | | 13.007 | Glass | 1.676 | 51.4 | — |
| 9 | | Plano | | 1.000 | | | | |
| 10 | Filter | Plano | | 0.210 | Glass | 1.517 | 64.2 | — |
| 11 | | Plano | | 9.758 | | | | |
| 12 | Image Surface | Plano | | — | | | | |

Remark: Reference wavelength is d-line 587.6 nm.
* The effective radius of Surface 1 is 4.200 mm.

TABLE 6

Aspheric Coefficient

| Surface # | 1 | 2 | 3 | 4 |
|---|---|---|---|---|
| k= | −3.8718E−01 | 0.0000E+00 | 0.0000E+00 | 0.0000E+00 |
| A4= | −3.7950E−04 | −5.3294E−03 | −7.6402E−03 | −5.1541E−03 |
| A6= | −1.8712E−04 | 7.5432E−04 | 1.3065E−03 | 5.1336E−04 |
| A8= | 2.7000E−05 | −1.3298E−05 | −8.4048E−05 | −8.8447E−05 |
| A10= | −1.8557E−06 | −4.3561E−06 | 7.3212E−07 | 9.8197E−06 |
| A12= | 5.1445E−08 | 3.5966E−07 | 1.7727E−07 | −7.6982E−07 |
| A14= | −4.3754E−10 | −1.1594E−08 | −8.8439E−09 | 3.5066E−08 |
| A16= | | 1.4445E−10 | 1.3832E−10 | −7.3391E−10 |

In the 3rd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in table below.

| 3rd Embodiment | | | |
|---|---|---|---|
| f [mm] | 27.53 | TD/ImgH | 2.00 |
| Fno | 3.32 | (R1 − R2)/(R1 + R2) | −0.49 |
| HFOV [deg.] | 5.3 | (R3 − R4)/(R3 + R4) | 0.46 |
| (V/N)min | 13.26 | |f/f1| + |f/f2| + |f/f3| | 5.84 |
| V2 | 21.8 | f/f1 | 1.49 |
| V1 + V2 + V3 | 94.1 | f/f2 | −2.48 |
| Vmin | 21.8 | f/f3 | 1.86 |
| (CT1 + CT2 + CT3)/(T12 + T23) | 3.02 | f/ImgH | 10.75 |
| ECTP/TD | 2.54 | f/TD | 5.37 |
| ΣL/TD | 5.65 | f12/f3 | −2.93 |
| (CT2 + CT3)/T23 | 2.24 | Y11/TD | 0.82 |
| (T12 + T23)/CT2 | 0.97 | Y11/Y32 | 1.16 |
| T23/T12 | 9.72 | Y32/TD | 0.71 |
| TD/EPD | 0.62 | | |

4th Embodiment

Figure 4A:
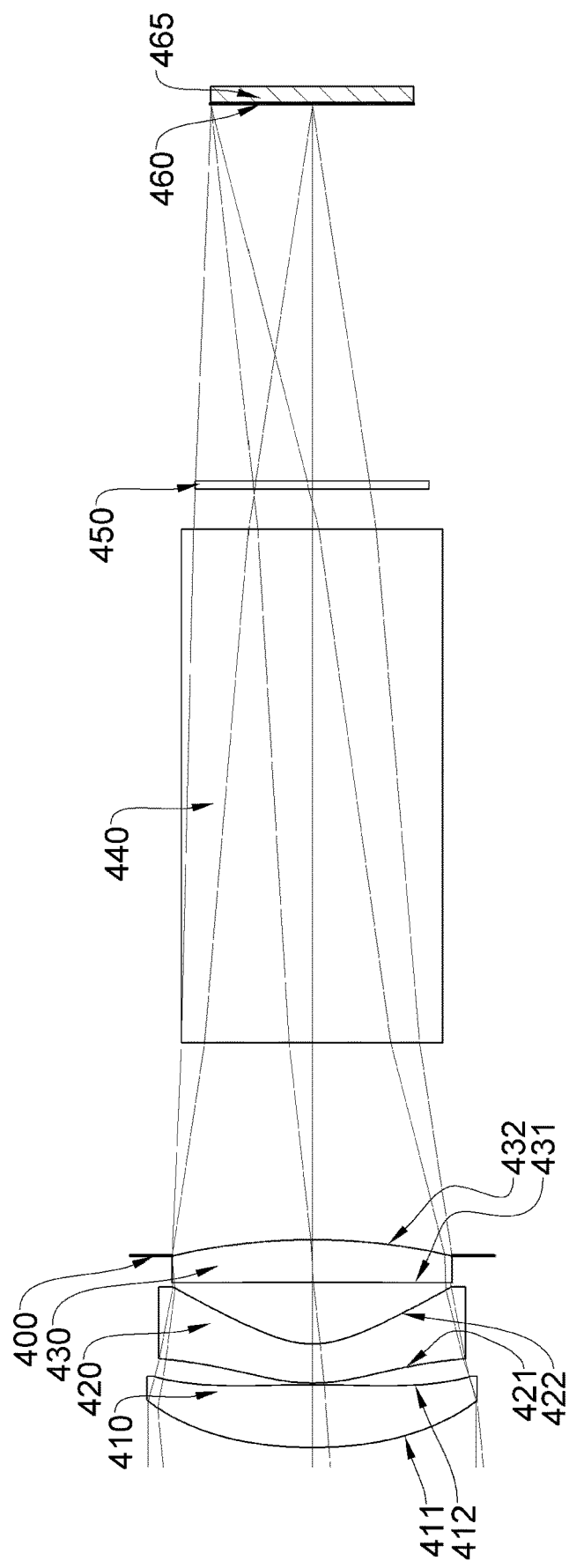
FIG. 4A is a schematic view of an imaging apparatus according to the 4th embodiment of the present disclosure.
Figure 4B:
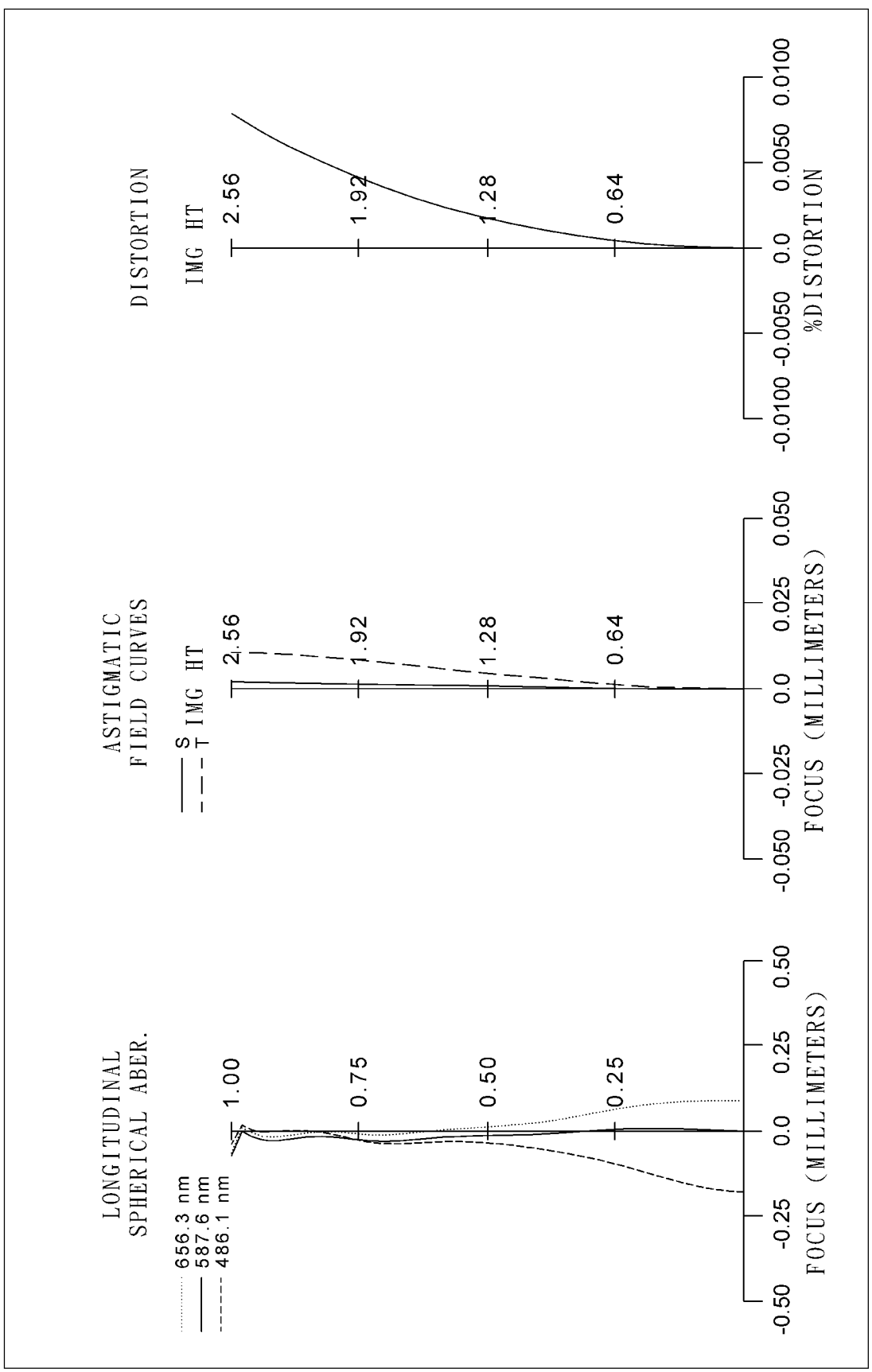
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an imaging optical system (not otherwise herein labeled) of the present disclosure and an image sensor 465. The imaging optical system includes, in order from an object side to an image side, a first lens element 410, a second lens element 420, a third lens element 430, an aperture stop 400, a prism 440, a filter 450, and an image surface 460. There is no additional lens element inserted between the first lens element 410 and the third lens element 430 and there are air gaps between paraxial regions of the first lens element 410, the second lens element 420 and the third lens element 430.

The first lens element 410 with positive refractive power has an object-side surface 411 being convex in the paraxial region thereof, and an image-side surface 412 being convex in the paraxial region thereof. Both the object-side surface 411 and the image-side surface 412 are aspheric. There is one inflection point on the image-side surface 412. The first lens element 410 is made of plastic material.

The second lens element 420 with negative refractive power has an object-side surface 421 being convex in the paraxial region thereof, and an image-side surface 422 being concave in the paraxial region thereof. Both the object-side surface 421 and the image-side surface 422 are aspheric. There is one inflection point on the object-side surface 421. The second lens element 420 is made of plastic material.

The third lens element 430 with positive refractive power has an object-side surface 431 being concave in the paraxial region thereof, and an image-side surface 432 being convex in the paraxial region thereof. Both the object-side surface 431 and the image-side surface 432 are spherical. The third lens element 430 is made of glass material.

The prism 440 is disposed between the third lens element 430 and the filter 450. The prism 440 is made of glass material. The filter 450 is located between the prism 440 and the image surface 460. The filter 450 is made of glass material and will not affect the focal length of the imaging optical system. The image sensor 465 is disposed on the image surface 460 of the imaging optical system.

The detailed optical data of the 4th embodiment are shown in TABLE 7, and the aspheric surface data are shown in TABLE 8.

TABLE 7

(4th Embodiment)
f = 27.76 mm Fno = 3.34, HFOV = 5.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.362 | ASP | 1.591 | Plastic | 1.566 | 37.4 | 13.52 |
| 2 | | −22.269 | ASP | 0.040 | | | | |
| 3 | Lens 2 | 4.328 | ASP | 1.001 | Plastic | 1.614 | 26.0 | −10.32 |
| 4 | | 2.345 | ASP | 1.564 | | | | |
| 5 | Lens 3 | −434.783 | SPH | 1.063 | Glass | 1.804 | 46.6 | 19.86 |
| 6 | | −15.421 | SPH | −0.411 | | | | |
| 7 | Ape. Stop | Plano | | 5.411 | | | | |
| 8 | Prism | Plano | | 13.007 | Glass | 1.772 | 49.6 | — |

TABLE 7-continued (4th Embodiment)
f = 27.76 mm Fno = 3.34, HFOV = 5.3 deg.

| Surface # | | Curvature Radius | Thickness | Material | Index | Abbe # | Focal Length |
|---|---|---|---|---|---|---|---|
| 9 | | Plano | 1.000 | | | | |
| 10 | Filter | Plano | 0.210 | Glass | 1.517 | 64.2 | — |
| 11 | | Plano | 9.561 | | | | |
| 12 | Image Surface | Plano | — | | | | |

Remark: Reference wavelength is d-line 587.6 nm.
* The effective radius of Surface 1 is 4.180 mm.

TABLE 8

Aspheric Coefficient

| Surface # | 1 | 2 | 3 | 4 |
|---|---|---|---|---|
| k= | 2.0017E+00 | 0.0000E+00 | 0.0000E+00 | −1.0000E+00 |
| A4= | 2.0339E−03 | 6.1213E−03 | −1.1716E−02 | −2.0518E−02 |
| A6= | −1.2045E−04 | −8.6629E−04 | 3.1492E−04 | 2.4736E−03 |
| A8= | −1.9495E−06 | 8.7635E−05 | 1.2313E−05 | −2.7246E−04 |
| A10= | 1.7240E−06 | −2.8844E−06 | 2.3541E−06 | 2.7648E−05 |
| A12= | −1.7902E−07 | −2.3725E−07 | −7.1850E−07 | −2.1828E−06 |
| A14= | 7.8405E−09 | 2.2096E−08 | 4.9870E−08 | 1.0406E−07 |
| A16= | −1.2366E−10 | −4.9257E−10 | −1.1492E−09 | −2.1139E−09 |

In the 4th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in table below.

| 4th Embodiment | | | |
|---|---|---|---|
| f [mm] | 27.76 | TD/ImgH | 2.05 |
| Fno | 3.34 | (R1 − R2)/(R1 + R2) | −3.08 |
| HFOV [deg.] | 5.3 | (R3 − R4)/(R3 + R4) | 0.30 |
| (V/N)min | 16.09 | |f/f1| + |f/f2| + |f/f3| | 6.14 |
| V2 | 26.0 | f/f1 | 2.05 |
| V1 + V2 + V3 | 110.0 | f/f2 | −2.69 |
| Vmin | 26.0 | f/f3 | 1.40 |
| (CT1 + CT2 + CT3)/(T12 + T23) | 2.28 | f/ImgH | 10.84 |
| ΣCTP/TD | 2.47 | f/TD | 5.28 |
| BL/TD | 5.47 | f12/f3 | −8.76 |
| (CT2 + CT3)/T23 | 1.32 | Y11/TD | 0.79 |
| (T12 + T23)/CT2 | 1.60 | Y11/Y32 | 1.18 |
| T23/T12 | 39.10 | Y32/TD | 0.67 |
| TD/EPD | 0.63 | | |

5th Embodiment

Figure 5A:
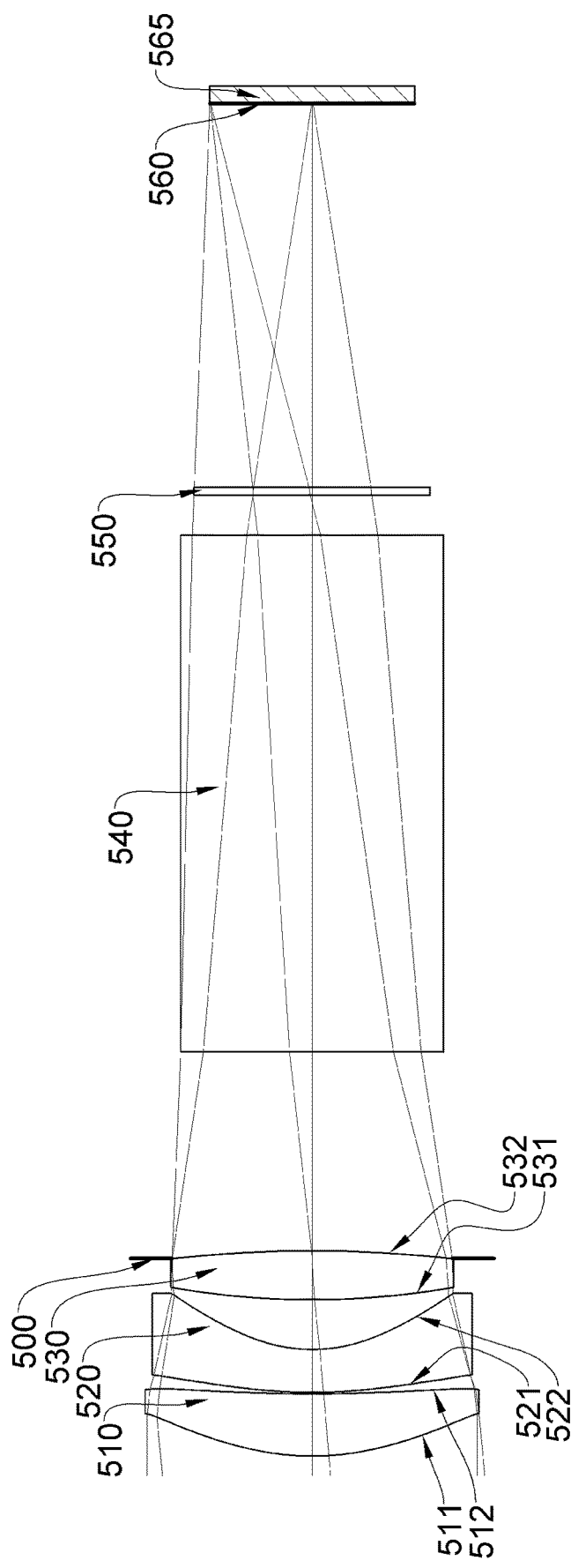
FIG. 5A is a schematic view of an imaging apparatus according to the 5th embodiment of the present disclosure.
Figure 5B:
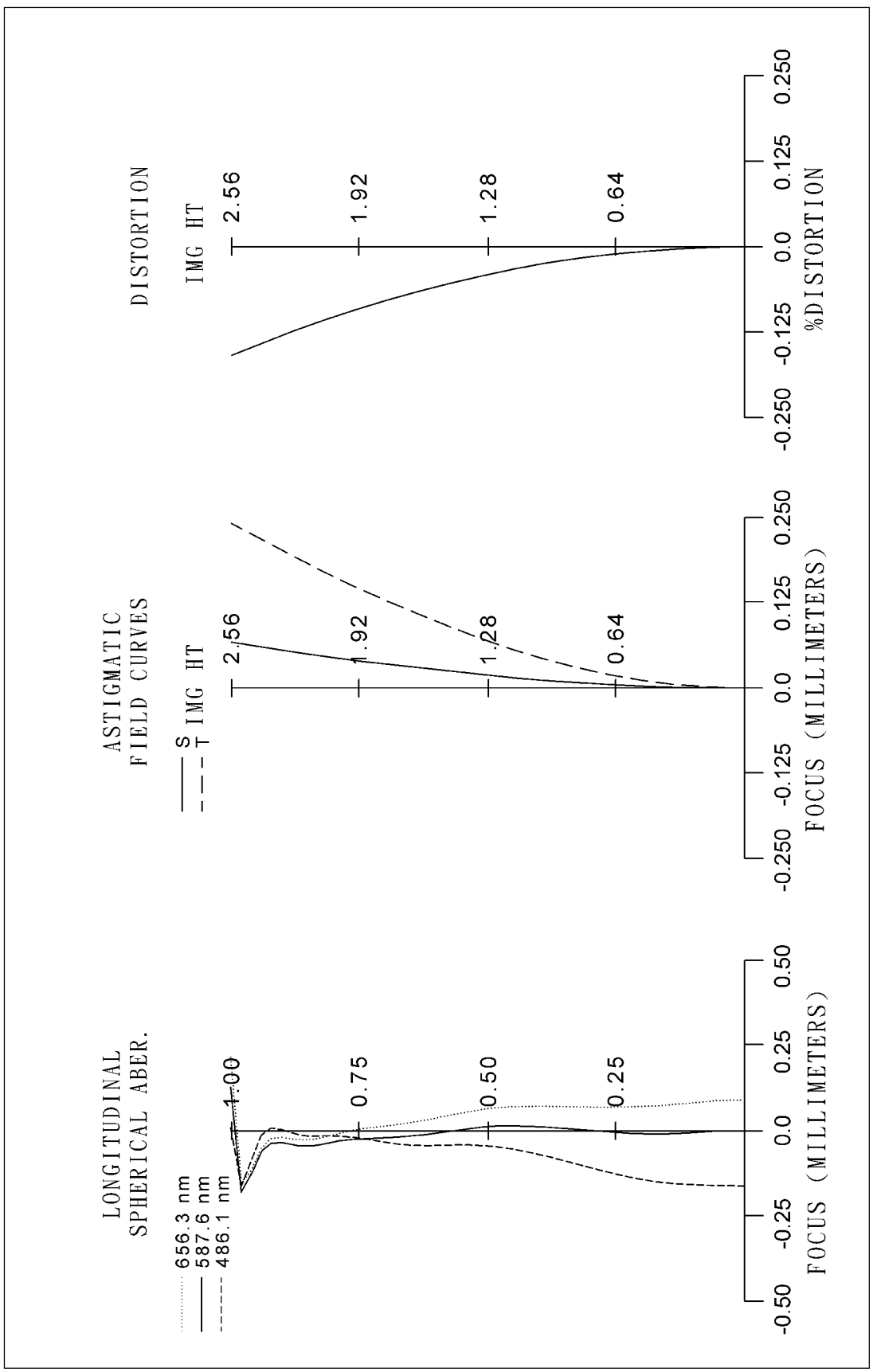
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an imaging optical system (not otherwise herein labeled) of the present disclosure and an image sensor 565. The imaging optical system includes, in order from an object side to an image side, a first lens element 510, a second lens element 520, a third lens element 530, an aperture stop 500, a prism 540, a filter 550, and an image surface 560. There is no additional lens element inserted between the first lens element 510 and the third lens element 530 and there are air gaps between paraxial regions of the first lens element 510, the second lens element 520 and the third lens element 530.

The first lens element 510 with positive refractive power has an object-side surface 511 being convex in the paraxial region thereof, and an image-side surface 512 being concave in the paraxial region thereof. Both the object-side surface 511 and the image-side surface 512 are aspheric. There are one inflection point on the object-side surface 511 and three inflection points on the image-side surface 512. The first lens element 510 is made of plastic material.

The second lens element 520 with negative refractive power has an object-side surface 521 being convex in the paraxial region thereof, and an image-side surface 522 being concave in the paraxial region thereof. Both the object-side surface 521 and the image-side surface 522 are aspheric. There are four inflection points on the object-side surface 521. The second lens element 520 is made of plastic material.

The third lens element 530 with positive refractive power has an object-side surface 531 being convex in the paraxial region thereof, and an image-side surface 532 being convex in the paraxial region thereof. Both the object-side surface 531 and the image-side surface 532 are spherical. The third lens element 530 is made of glass material.

The prism 540 is disposed between the third lens element 530 and the filter 550. The prism 540 is made of glass material. The filter 550 is disposed between the prism 540 and the image surface 560. The filter 550 is made of glass material and will not affect the focal length of the imaging optical system. The image sensor 565 is disposed on the image surface 560 of the imaging optical system.

The detailed optical data of the 5th embodiment are shown in TABLE 9, and the aspheric surface data are shown in TABLE 10.

TABLE 9

(5th Embodiment)
f = 27.75 mm, Fno = 3.34, HFOV = 5.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.460 | ASP | 1.561 | Plastic | 1.639 | 23.5 | 14.64 |
| 2 | | 18.943 | ASP | 0.040 | | | | |
| 3 | Lens 2 | 10.940 | ASP | 1.085 | Plastic | 1.660 | 20.4 | −9.67 |
| 4 | | 3.873 | ASP | 1.256 | | | | |
| 5 | Lens 3 | 20.492 | SPH | 1.226 | Glass | 1.804 | 46.6 | 15.89 |
| 6 | | −33.022 | SPH | −0.188 | | | | |
| 7 | Ape. Stop | Plano | | 5.188 | | | | |
| 8 | Prism | Plano | | 13.007 | Glass | 1.772 | 49.6 | — |
| 9 | | Plano | | 1.000 | | | | |
| 10 | Filter | Plano | | 0.210 | Glass | 1.517 | 64.2 | — |
| 11 | | Plano | | 9.647 | | | | |
| 12 | Image Surface | Plano | | — | | | | |

Remark: Reference wavelength is d-line 587.6 nm.
* The effective radius of Surface 1 is 4.200 mm.

TABLE 10

Aspheric Coefficient

| Surface # | 1 | 2 | 3 | 4 |
|---|---|---|---|---|
| k= | −7.1817E−01 | 0.0000E+00 | 0.0000E+00 | 0.0000E+00 |
| A4= | −1.7898E−03 | −7.0552E−03 | −4.1561E−03 | −1.2114E−03 |
| A6= | 8.4072E−05 | 1.3391E−03 | 5.9099E−04 | −7.7809E−04 |
| A8= | −3.6247E−07 | −1.0644E−04 | −1.1956E−05 | 7.2575E−05 |
| A10= | 4.2804E−07 | 2.6781E−09 | −9.1976E−06 | −7.0350E−07 |
| A12= | −1.0923E−07 | 5.1861E−07 | 1.1935E−06 | −6.3639E−07 |
| A14= | 7.2455E−09 | −2.9438E−08 | −5.8466E−08 | 5.8423E−08 |
| A16= | −1.5904E−10 | 5.1201E−10 | 1.0318E−09 | −1.8309E−09 |

In the 5th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in table below.

| 5th Embodiment | | | |
|---|---|---|---|
| f [mm] | 27.75 | TD/ImgH | 2.02 |
| Fno | 3.34 | (R1 − R2)/(R1 + R2) | −0.49 |
| HFOV [deg.] | 5.3 | (R3 − R4)/(R3 + R4) | 0.48 |
| (V/N)min | 12.29 | |f/f1| + |f/f2| + |f/f3| | 6.51 |
| V2 | 20.4 | f/f1 | 1.90 |
| V1 + V2 + V3 | 90.5 | f/f2 | −2.87 |
| Vmin | 20.4 | f/f3 | 1.75 |
| (CT1 + CT2 + CT3)/(T12 + T23) | 2.99 | f/ImgH | 10.84 |
| ΣCTP/TD | 2.52 | f/TD | 5.37 |
| BL/TD | 5.59 | f12/f3 | −3.61 |
| (CT2 + CT3)/T23 | 1.84 | Y11/TD | 0.81 |
| (T12 + T23)/CT2 | 1.19 | Y11/Y32 | 1.19 |
| T23/T12 | 31.40 | Y32/TD | 0.68 |
| TD/EPD | 0.62 | | |

6th Embodiment

Figure 6A:
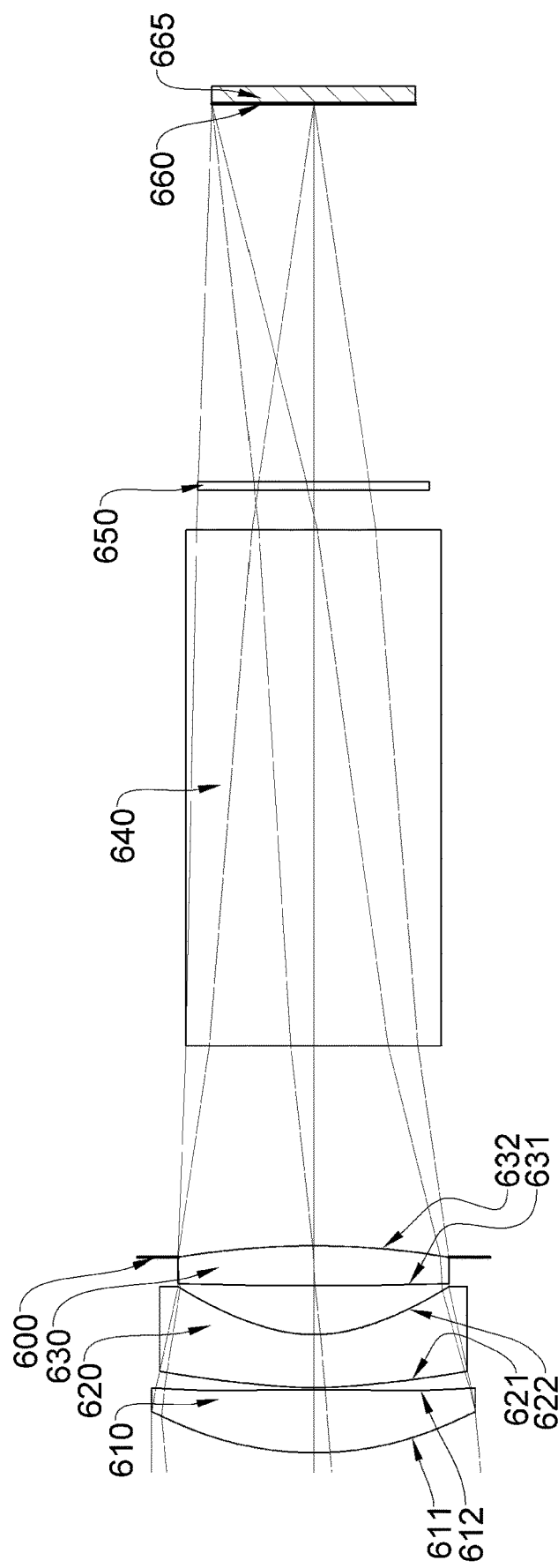
FIG. 6A is a schematic view of an imaging apparatus according to the 6th embodiment of the present disclosure.
Figure 6B:
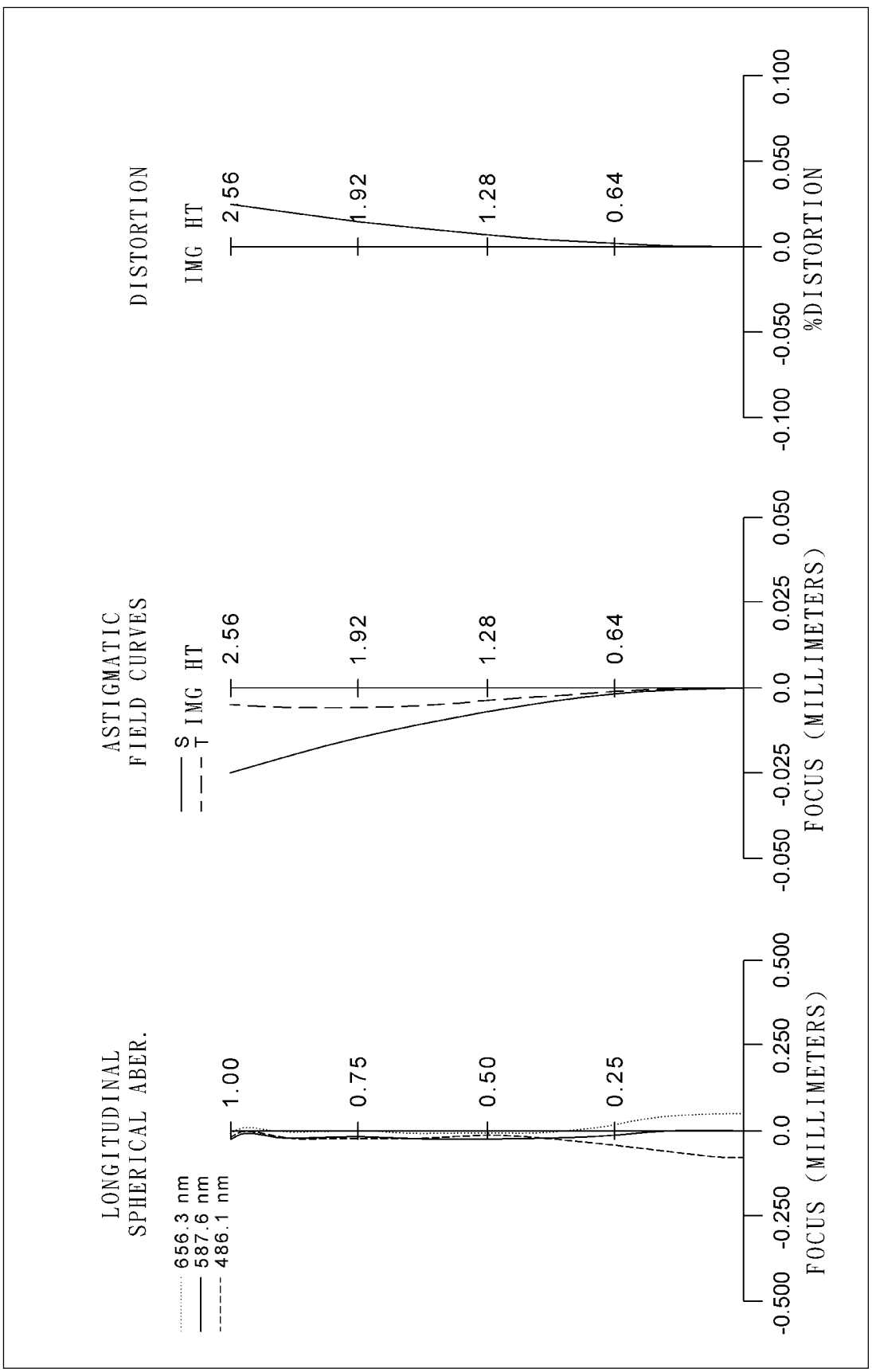
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an imaging optical system (not otherwise herein labeled) of the present disclosure and an image sensor 665. The imaging optical system includes, in order from an object side to an image side, a first lens element 610, a second lens element 620, a third lens element 630, an aperture stop 600, a prism 640, a filter 650, and an image surface 660. There is no additional lens element inserted between the first lens element 610 and the third lens element 630 and there are air gaps between paraxial regions of the first lens element 610, the second lens element 620 and the third lens element 630.

The first lens element 610 with positive refractive power has an object-side surface 611 being convex in the paraxial region thereof, and an image-side surface 612 being convex in the paraxial region thereof. Both the object-side surface 611 and the image-side surface 612 are aspheric. There are one inflection point on the object-side surface 611 and three inflection points on the image-side surface 612. The first lens element 610 is made of plastic material.

The second lens element 620 with negative refractive power has an object-side surface 621 being convex in the paraxial region thereof, and an image-side surface 622 being concave in the paraxial region thereof. Both the object-side surface 621 and the image-side surface 622 are aspheric. The second lens element 620 is made of plastic material.

The third lens element 630 with positive refractive power has an object-side surface 631 being convex in the paraxial region thereof, and an image-side surface 632 being convex in the paraxial region thereof. Both the object-side surface 631 and the image-side surface 632 are spherical. The third lens element 630 is made of glass material.

The prism 640 is disposed between the third lens element 630 and the filter 650. The prism 640 is made of glass material. The filter 650 is disposed between the prism 640 and the image surface 660. The filter 650 is made of glass material and will not affect the focal length of the imaging optical system. The image sensor 665 is disposed on the image surface 660 of the imaging optical system.

The detailed optical data of the 6th embodiment are shown in TABLE 11, and the aspheric surface data are shown in TABLE 12.

TABLE 11

(6th Embodiment)
f = 28.15 mm, Fno = 3.45, HFOV = 5.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.324 | ASP | 1.596 | Plastic | 1.566 | 37.4 | 14.11 |
| 2 | | −183.194 | ASP | 0.050 | | | | |
| 3 | Lens 2 | 9.342 | ASP | 1.341 | Plastic | 1.614 | 26.0 | −11.10 |
| 4 | | 3.724 | ASP | 1.239 | | | | |
| 5 | Lens 3 | 121.310 | SPH | 0.997 | Glass | 1.804 | 46.6 | 21.39 |
| 6 | | −19.961 | SPH | −0.293 | | | | |
| 7 | Ape. Stop | Plano | | 5.343 | | | | |
| 8 | Prism | Plano | | 13.007 | Glass | 1.772 | 49.6 | — |
| 9 | | Plano | | 1.000 | | | | |
| 10 | Filter | Plano | | 0.210 | Glass | 1.517 | 64.2 | — |
| 11 | | Plano | | 9.539 | | | | |
| 12 | Image Surface | Plano | | — | | | | |

Remark: Reference wavelength is d-line 587.6 nm.
* The effective radius of Surface 1 is 4.075 mm.

TABLE 12

Aspheric Coefficient

| Surface # | 1 | 2 | 3 | 4 |
|---|---|---|---|---|
| k= | −1.3564E−01 | 0.0000E+00 | 0.0000E+00 | −6.0035E−01 |
| A4= | 4.5994E−04 | −2.6639E−03 | −7.5803E−03 | −6.6997E−03 |
| A6= | −1.5359E−04 | 7.5882E−04 | 1.1295E−03 | 4.7724E−04 |
| A8= | 3.1068E−05 | −7.7410E−05 | −1.0125E−04 | −1.9961E−05 |
| A10= | −3.6329E−06 | 3.7470E−06 | 4.6834E−06 | −1.5069E−06 |
| A12= | 2.4551E−07 | −4.7394E−08 | −5.8517E−08 | 2.5552E−07 |
| A14= | −9.1047E−09 | −3.1200E−09 | −3.3361E−09 | −1.3376E−08 |
| A16= | 1.3982E−10 | 1.0018E−10 | 1.0550E−10 | 2.5309E−10 |

In the 6th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in table below.

| 6th Embodiment | | | |
|---|---|---|---|
| f [mm] | 28.15 | TD/ImgH | 2.04 |
| Fno | 3.45 | (R1 − R2)/(R1 + R2) | −1.10 |
| HFOV [deg.] | 5.2 | (R3 − R4)/(R3 + R4) | 0.43 |
| (V/N)min | 16.09 | |f/f1| + |f/f2| + |f/f3| | 5.85 |

-continued

| 6th Embodiment | | | |
|---|---|---|---|
| V2 | 26.0 | f/f1 | 2.00 |
| V1 + V2 + V3 | 110.0 | f/f2 | −2.54 |
| Vmin | 26.0 | f/f3 | 1.32 |
| (CT1 + CT2 + CT3)/(T12 + T23) | 3.05 | f/ImgH | 11.00 |
| ΣCTP/TD | 2.49 | f/TD | 5.39 |
| BL/TD | 5.52 | f12/f3 | −15.87 |
| (CT2 + CT3)/T23 | 1.89 | Y11/TD | 0.78 |
| (T12 + T23)/CT2 | 0.96 | Y11/Y32 | 1.19 |
| T23/T12 | 24.78 | Y32/TD | 0.65 |
| TD/EPD | 0.64 | | |

7th Embodiment

Figure 7A:
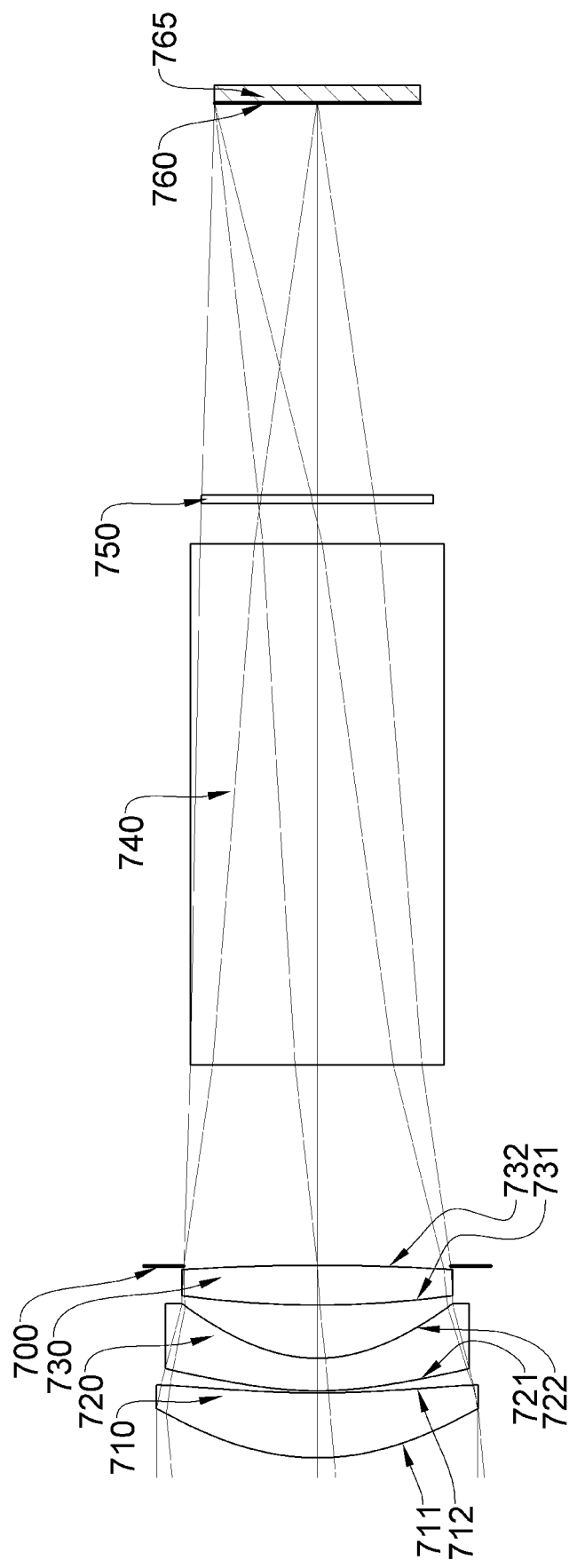
FIG. 7A is a schematic view of an imaging apparatus according to the 7th embodiment of the present disclosure.
Figure 7B:
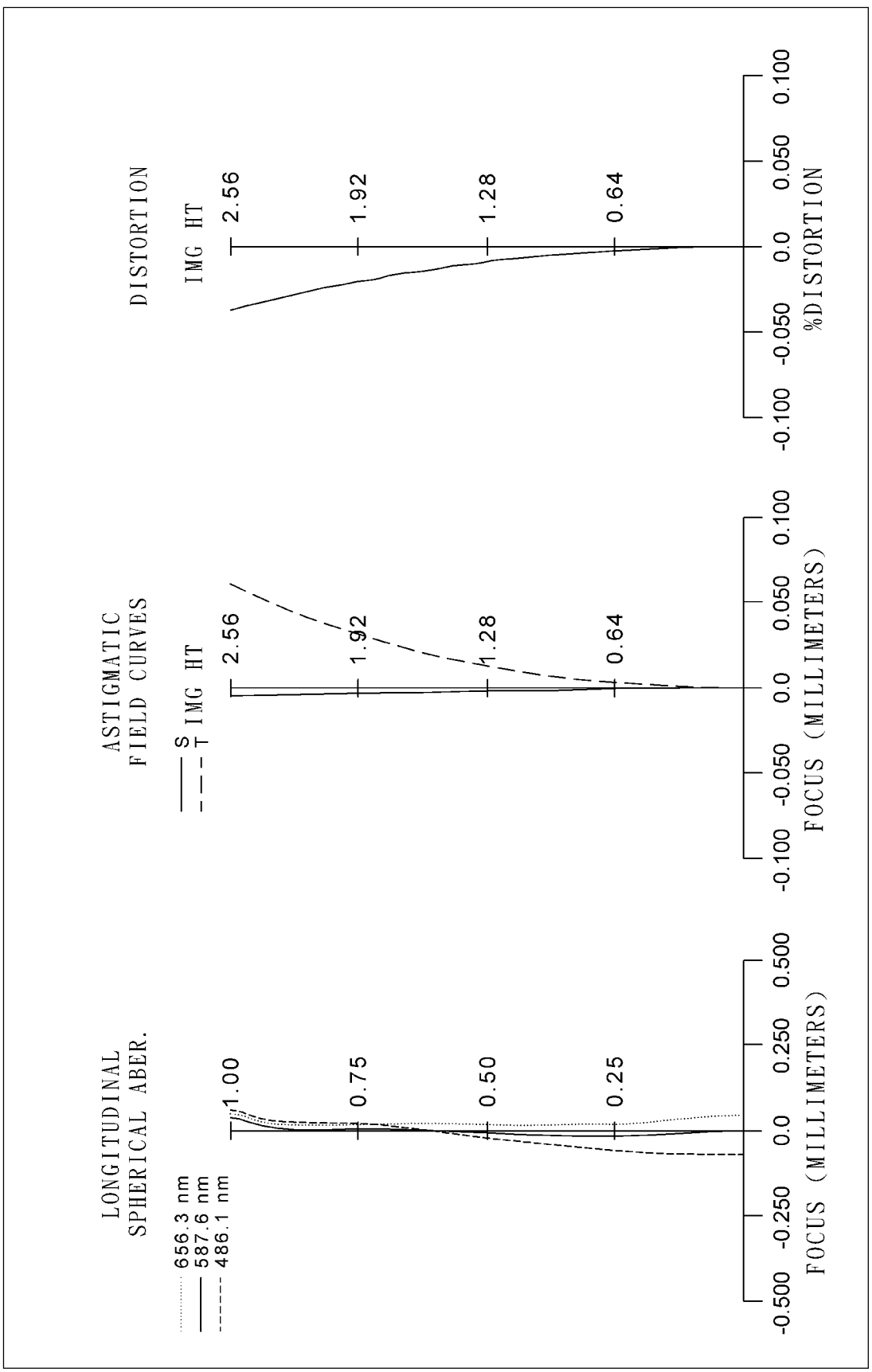
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes an imaging optical system (not otherwise herein labeled) of the present disclosure and an image sensor 765. The imaging optical system includes, in order from an object side to an image side, a first lens element 710, a second lens element 720, a third lens element 730, an aperture stop 700, a prism 740, a filter 750, and an image surface 760. There is no additional lens element inserted between the first lens element 710 and the third lens element 730 and there are air gaps between paraxial regions of the first lens element 710, the second lens element 720 and the third lens element 730.

The first lens element 710 with positive refractive power has an object-side surface 711 being convex in the paraxial region thereof, and an image-side surface 712 being concave in the paraxial region thereof. Both the object-side surface 711 and the image-side surface 712 are aspheric. There are one inflection point on the object-side surface 711 and one inflection point on the image-side surface 712. The first lens element 710 is made of plastic material.

The second lens element 720 with negative refractive power has an object-side surface 721 being convex in the paraxial region thereof, and an image-side surface 722 being concave in the paraxial region thereof. Both the object-side surface 721 and the image-side surface 722 are aspheric. The second lens element 720 is made of plastic material.

The third lens element 730 with positive refractive power has an object-side surface 731 being convex in the paraxial region thereof, and an image-side surface 732 being convex in the paraxial region thereof. Both the object-side surface 731 and the image-side surface 732 are spherical. The third lens element 730 is made of glass material.

The prism 740 is disposed between the third lens element 730 and the filter 750. The prism 740 is made of glass material. The filter 750 is disposed between the prism 740 and the image surface 760. The filter 750 is made of glass material and will not affect the focal length of the imaging optical system. The image sensor 765 is disposed on the image surface 760 of the imaging optical system.

The detailed optical data of the 7th embodiment are shown in TABLE 13, and the aspheric surface data are shown in TABLE 14.

TABLE 13

(7th Embodiment)
f = 28.22 mm, Fno = 3.53, HFOV = 5.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.994 | ASP | 1.616 | Plastic | 1.566 | 37.4 | 14.51 |
| 2 | | 20.007 | ASP | 0.055 | | | | |
| 3 | Lens 2 | 8.656 | ASP | 0.814 | Plastic | 1.614 | 26.0 | −11.47 |
| 4 | | 3.743 | ASP | 1.329 | | | | |
| 5 | Lens 3 | 24.681 | SPH | 0.989 | Glass | 1.804 | 46.6 | 21.36 |
| 6 | | −55.436 | SPH | −0.020 | | | | |
| 7 | Ape. Stop | Plano | | 5.020 | | | | |
| 8 | Prism | Plano | | 13.007 | Glass | 1.772 | 49.6 | — |
| 9 | | Plano | | 1.000 | | | | |
| 10 | Filter | Plano | | 0.210 | Glass | 1.517 | 64.2 | — |
| 11 | | Plano | | 9.786 | | | | |
| 12 | Image Surface | Plano | | — | | | | |

Remark: Reference wavelength is d-line 587.6 nm.
* The effective radius of Surface 1 is 4.010 mm.

TABLE 14

| Aspheric Coefficient | | | | |
|---|---|---|---|---|
| Surface # | 1 | 2 | 3 | 4 |
| k= | −1.0214E+00 | 0.0000E+00 | 0.0000E+00 | −5.2190E−01 |
| A4= | 1.1253E−05 | −3.1455E−03 | −5.3999E−03 | −3.7578E−03 |
| A6= | −1.5239E−04 | 8.8774E−04 | 1.5974E−03 | 7.8779E−04 |
| A8= | 2.6840E−05 | −1.8551E−04 | −3.5418E−04 | −2.3161E−04 |
| A10= | −2.5652E−06 | 2.2826E−05 | 4.4949E−05 | 3.6490E−05 |
| A12= | 1.4036E−07 | −1.5924E−06 | −3.2303E−06 | −3.2620E−06 |
| A14= | −4.1297E−09 | 5.8485E−08 | 1.2322E−07 | 1.5691E−07 |
| A16= | 4.5940E−11 | −8.8379E−10 | −1.9400E−09 | −3.1597E−09 |

In the 7th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in table below.

| 7th Embodiment | | | |
|---|---|---|---|
| f [mm] | 28.22 | TD/ImgH | 1.88 |
| Fno | 3.53 | (R1 − R2)/(R1 + R2) | −0.54 |
| HFOV [deg.] | 5.2 | (R3 − R4)/(R3 + R4) | 0.40 |
| (V/N)min | 16.09 | |f/f1| + |f/f2| + |f/f3| | 5.73 |
| V2 | 26.0 | f/f1 | 1.94 |
| V1 + V2 + V3 | 110.0 | f/f2 | −2.46 |
| Vmin | 26.0 | f/f3 | 1.32 |
| (CT1 + CT2 + CT3)/(T12 + T23) | 2.47 | f/ImgH | 11.02 |
| ΣCTP/TD | 2.71 | f/TD | 5.88 |
| BL/TD | 6.04 | f12/f3 | −12.41 |
| (CT2 + CT3)/T23 | 1.36 | Y11/TD | 0.83 |
| (T12 + T23)/CT2 | 1.70 | Y11/Y32 | 1.20 |
| T23/T12 | 24.16 | Y32/TD | 0.70 |
| TD/EPD | 0.60 | | |

8th Embodiment

Figure 8A:
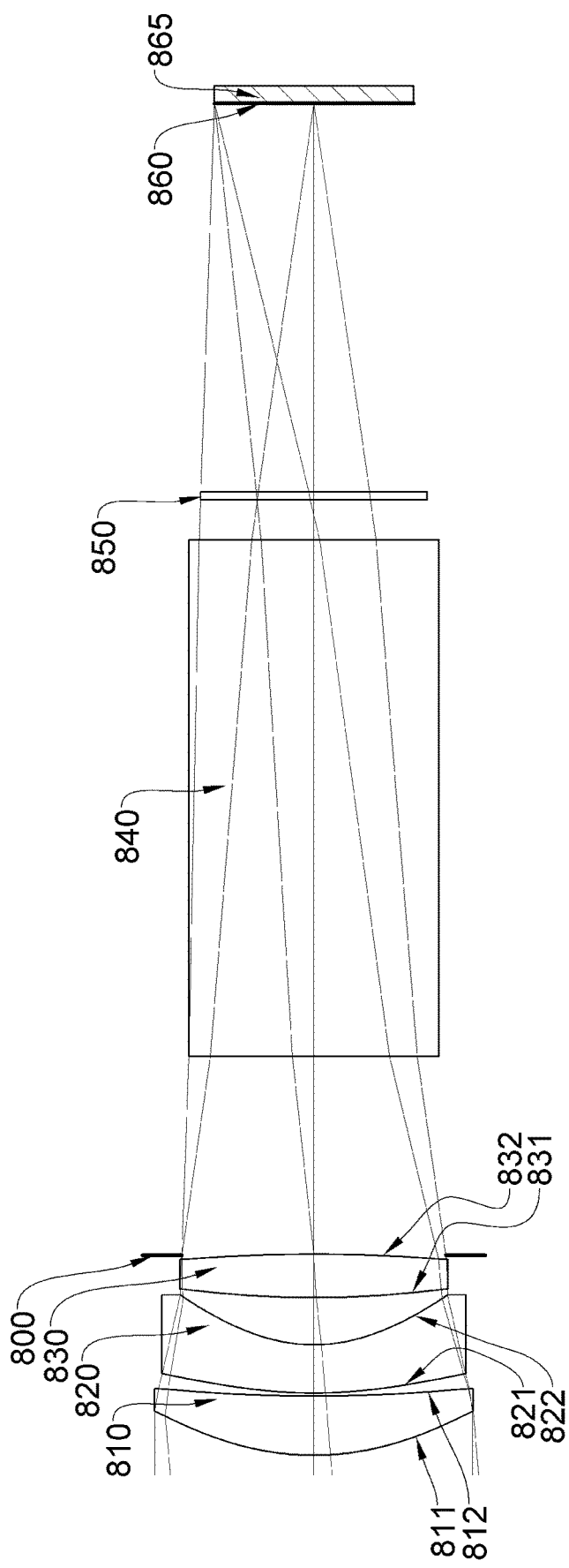
FIG. 8A is a schematic view of an imaging apparatus according to the 8th embodiment of the present disclosure.
Figure 8B:
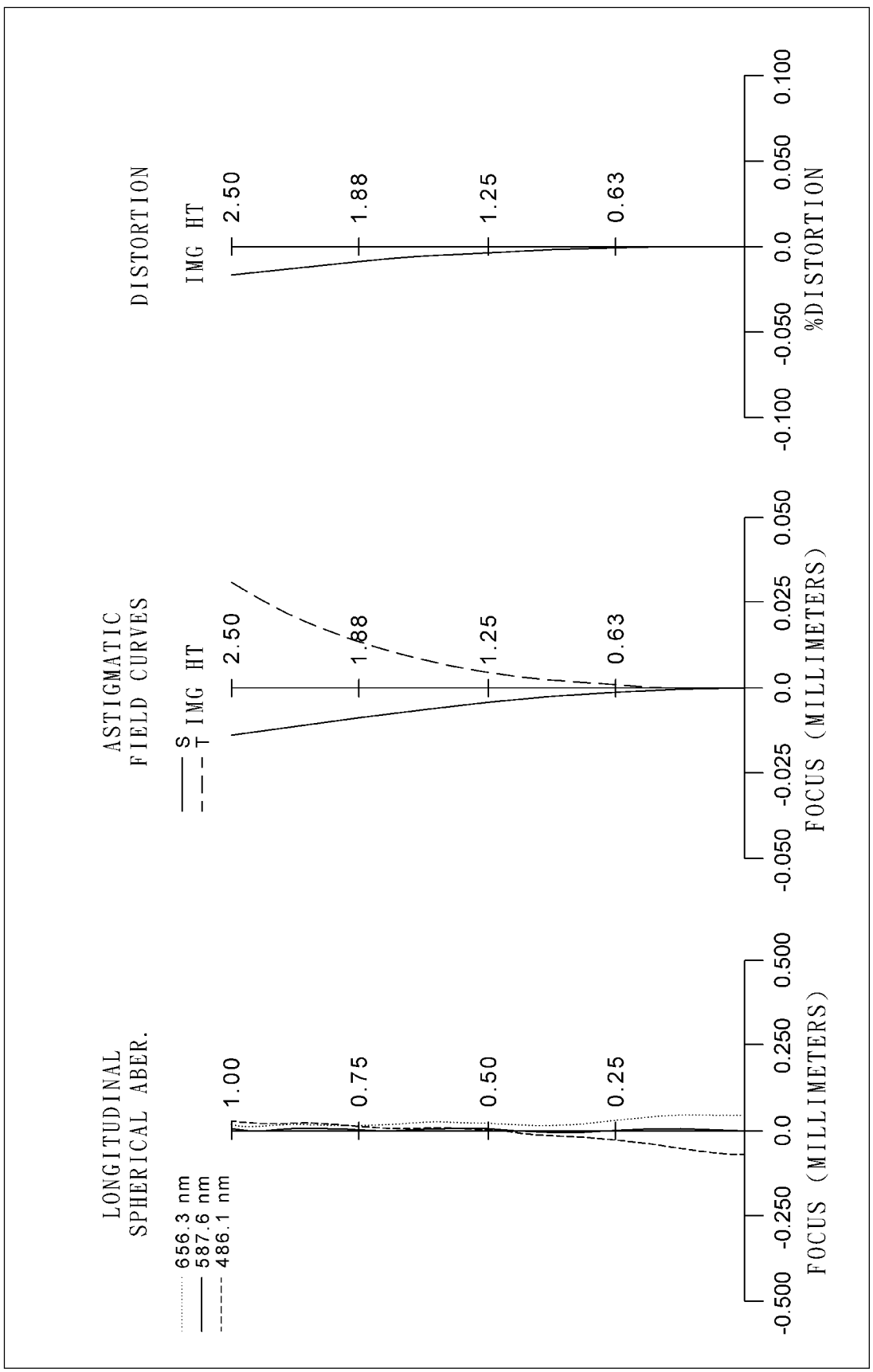
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes an imaging optical system (not otherwise herein labeled) of the present disclosure and an image sensor 865. The imaging optical system includes, in order from an object side to an image side, a first lens element 810, a second lens element 820, a third lens element 830, an aperture stop 800, a prism 840, a filter 850, and an image surface 860. There is no additional lens element inserted between the first lens element 810 and the third lens element 830 and there are air gaps between paraxial regions of the first lens element 810, the second lens element 820 and the third lens element 830.

The first lens element 810 with positive refractive power has an object-side surface 811 being convex in the paraxial region thereof, and an image-side surface 812 being concave in the paraxial region thereof. Both the object-side surface 811 and the image-side surface 812 are aspheric. There are one inflection point on the object-side surface 811 and one inflection point on the image-side surface 812. The first lens element 810 is made of plastic material.

The second lens element 820 with negative refractive power has an object-side surface 821 being convex in the paraxial region thereof, and an image-side surface 822 being concave in the paraxial region thereof. Both the object-side surface 821 and the image-side surface 822 are aspheric. The second lens element 820 is made of plastic material.

The third lens element 830 with positive refractive power has an object-side surface 831 being convex in the paraxial region thereof, and an image-side surface 832 being convex in the paraxial region thereof. Both the object-side surface 831 and the image-side surface 832 are spherical. The third lens element 830 is made of glass material.

The prism 840 is disposed between the third lens element 830 and the filter 850. The prism 840 is made of glass material. The filter 850 is disposed between the prism 840 and the image surface 860. The filter 850 is made of glass material and will not affect the focal length of the imaging optical system. The image sensor 865 is disposed on the image surface 860 of the imaging optical system.

The detailed optical data of the 8th embodiment are shown in TABLE 15, and the aspheric surface data are shown in TABLE 16.

TABLE 15

(8th Embodiment)
f = 28.21 mm, Fno = 3.53, HFOV = 5.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.790 | ASP | 1.487 | Plastic | 1.566 | 37.4 | 15.80 |
| 2 | | 25.949 | ASP | 0.077 | | | | |
| 3 | Lens 2 | 9.835 | ASP | 1.214 | Plastic | 1.614 | 26.0 | −11.72 |
| 4 | | 3.960 | ASP | 1.192 | | | | |
| 5 | Lens 3 | 25.413 | SPH | 1.100 | Glass | 1.804 | 46.6 | 19.47 |
| 6 | | −40.000 | SPH | −0.030 | | | | |
| 7 | Ape. Stop | Plano | | 5.000 | | | | |
| 8 | Prism | Plano | | 13.007 | Glass | 1.772 | 49.6 | — |
| 9 | | Plano | | 1.000 | | | | |
| 10 | Filter | Plano | | 0.210 | Glass | 1.517 | 64.2 | — |
| 11 | | Plano | | 9.775 | | | | |
| 12 | Image Surface | Plano | | — | | | | |

Remark: Reference wavelength is d-line 587.6 nm.
* The effective radius of Surface 1 is 4.010 mm.

TABLE 16

Aspheric Coefficient

| Surface # | 1 | 2 | 3 | 4 |
|---|---|---|---|---|
| k= | −8.9064E−01 | 0.0000E+00 | 0.0000E+00 | 0.0000E+00 |
| A4= | 1.0567E−04 | −4.0621E−03 | −6.3178E−03 | −4.7849E−03 |
| A6= | −1.6828E−04 | 1.1054E−03 | 1.6137E−03 | 4.8503E−04 |
| A8= | 2.9840E−05 | −1.6501E−04 | −2.6694E−04 | −1.2656E−04 |
| A10= | −2.3569E−06 | 1.5075E−05 | 2.6357E−05 | 1.7133E−05 |
| A12= | 7.2014E−08 | −8.5628E−07 | −1.5405E−06 | −1.4293E−06 |
| A14= | 3.4569E−10 | 2.7889E−08 | 4.9646E−08 | 6.6785E−08 |
| A16= | −4.7557E−11 | −4.0131E−10 | −6.8319E−10 | −1.4529E−09 |

In the 8th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in table below.

| 8th Embodiment | | | |
|---|---|---|---|
| f [mm] | 28.21 | TD/ImgH | 2.03 |
| Fno | 3.53 | (R1 − R2)/(R1 + R2) | −0.59 |
| HFOV [deg.] | 5.1 | (R3 − R4)/(R3 + R4) | 0.43 |
| (V/N)min | 16.09 | \|f/f1\| + \|f/f2\| + \|f/f3\| | 5.64 |
| V2 | 26.0 | f/f1 | 1.79 |
| V1 + V2 + V3 | 110.0 | f/f2 | −2.41 |
| Vmin | 26.0 | f/f3 | 1.45 |
| (CT1 + CT2 + CT3)/(T12 + T23) | 3.00 | f/ImgH | 11.27 |
| ΣCTP/TD | 2.57 | f/TD | 5.56 |
| BL/TD | 5.71 | f12/f3 | −6.86 |
| (CT2 + CT3)/T23 | 1.94 | Y11/TD | 0.79 |
| (T12 + T23)/CT2 | 1.05 | Y11/Y32 | 1.20 |
| T23/T12 | 15.48 | Y32/TD | 0.66 |
| TD/EPD | 0.63 | | |

9th Embodiment

Figure 9A:
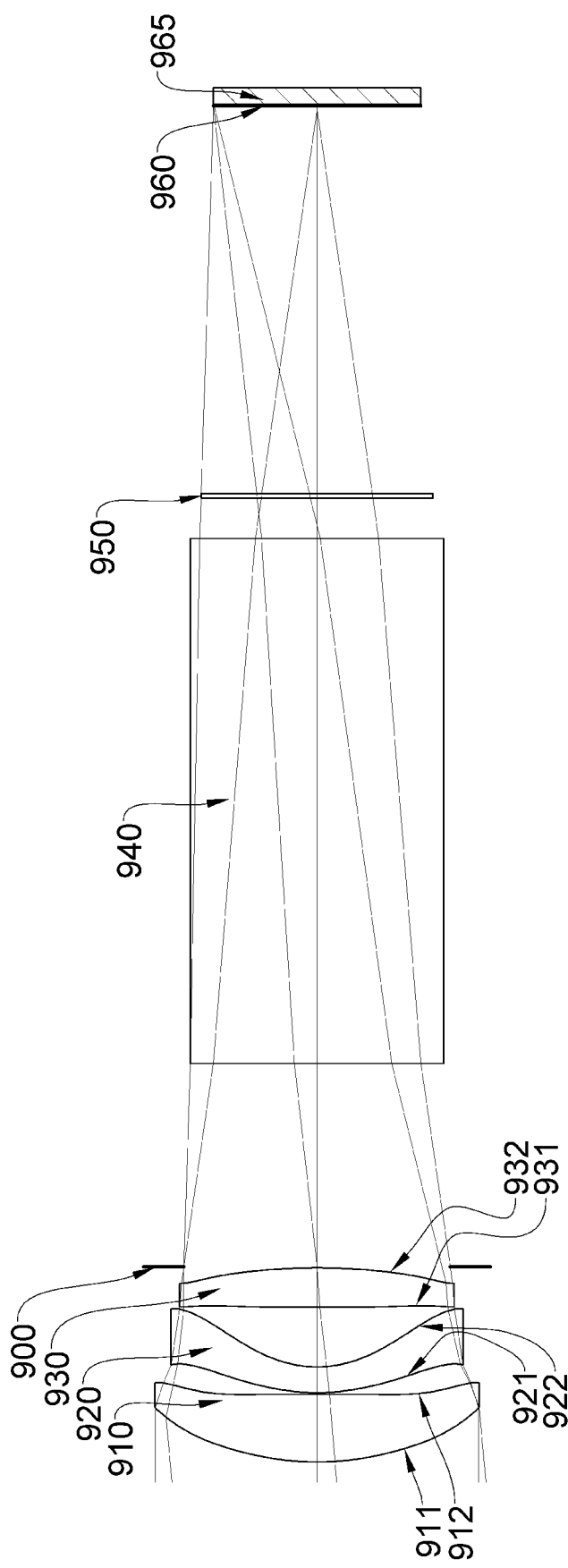
FIG. 9A is a schematic view of an imaging apparatus according to the 9th embodiment of the present disclosure.
Figure 9B:
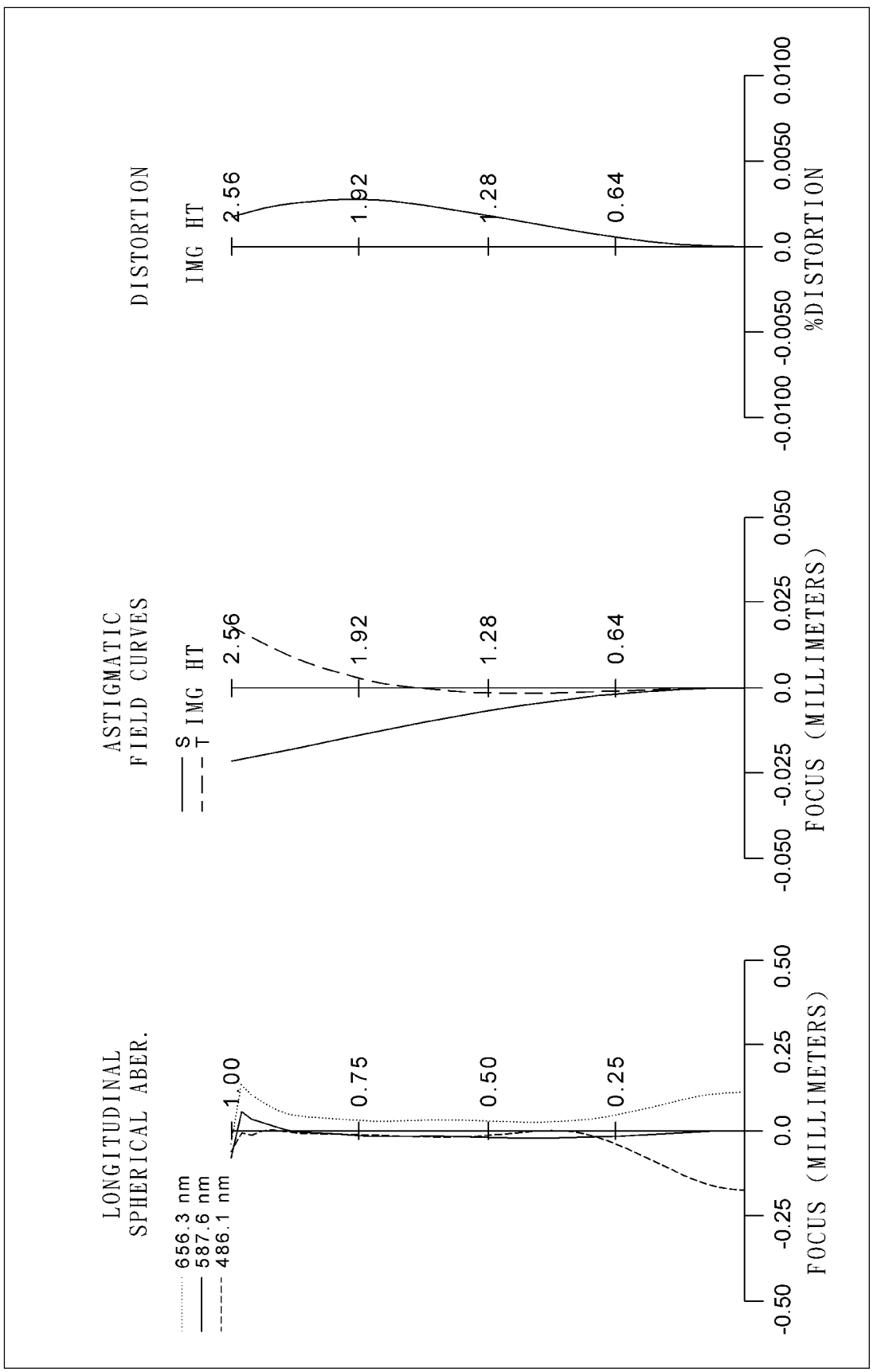
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes an imaging optical system (not otherwise herein labeled) of the present disclosure and an image sensor 965. The imaging optical system includes, in order from an object side to an image side, a first lens element 910, a second lens element 920, a third lens element 930, an aperture stop 900, a prism 940, a filter 950, and an image surface 960. There is no additional lens element inserted between the first lens element 910 and the third lens element 930 and there are air gaps between paraxial regions of the first lens element 910, the second lens element 920 and the third lens element 930.

The first lens element 910 with positive refractive power has an object-side surface 911 being convex in the paraxial region thereof, and an image-side surface 912 being concave in the paraxial region thereof. Both the object-side surface 911 and the image-side surface 912 are aspheric. There are three inflection points on the image-side surface 912. The first lens element 910 is made of plastic material.

The second lens element 920 with negative refractive power has an object-side surface 921 being convex in the paraxial region thereof, and an image-side surface 922 being concave in the paraxial region thereof. Both the object-side surface 921 and the image-side surface 922 are aspheric. There are one inflection point on the object-side surface 921 and one inflection point on the image-side surface 922. The second lens element 920 is made of plastic material.

The third lens element 930 with positive refractive power has an object-side surface 931 being concave in the paraxial region thereof, and an image-side surface 932 being convex in the paraxial region thereof. Both the object-side surface 931 and the image-side surface 932 are aspheric. There are three inflection points on the object-side surface 931 and one inflection point on the image-side surface 932. The third lens element 930 is made of plastic material.

The prism 940 is disposed between the third lens element 930 and the filter 950. The prism 940 is made of glass material. The filter 950 is disposed between the prism 940 and the image surface 960. The filter 950 is made of glass material and will not affect the focal length of the imaging optical system. The image sensor 965 is disposed on the image surface 960 of the imaging optical system.

The detailed optical data of the 9th embodiment are shown in TABLE 17, and the aspheric surface data are shown in TABLE 18.

In the 9th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 9th embodiment, so an explanation in this regard will not be provided again.

Moreover, these parameters can be calculated from TABLE 17 and TABLE 18 and satisfy the conditions stated in table below.

| 9th Embodiment | | | |
|---|---|---|---|
| f [mm] | 28.24 | TD/ImgH | 1.88 |
| Fno | 3.53 | (R1 − R2)/(R1 + R2) | −0.78 |
| HFOV [deg.] | 5.2 | (R3 − R4)/(R3 + R4) | 0.25 |
| (V/N)min | 10.98 | $|f/f1| + |f/f2| + |f/f3|$ | 5.66 |
| V2 | 18.4 | f/f1 | 2.15 |
| V1 + V2 + V3 | 74.7 | f/f2 | −2.45 |
| Vmin | 18.4 | f/f3 | 1.06 |
| (CT1 + CT2 + CT3)/(T12 + T23) | 2.16 | f/ImgH | 11.03 |
| ΣCTP/TD | 2.71 | f/TD | 5.87 |
| BL/TD | 5.99 | f12/f3 | 7.87 |
| (CT2 + CT3)/T23 | 1.09 | Y11/TD | 0.83 |
| (T12 + T23)/CT2 | 2.38 | Y11/Y32 | 1.20 |
| T23/T12 | 37.03 | Y32/TD | 0.70 |
| TD/EPD | 0.60 | | |

10th Embodiment

Figure 10A:
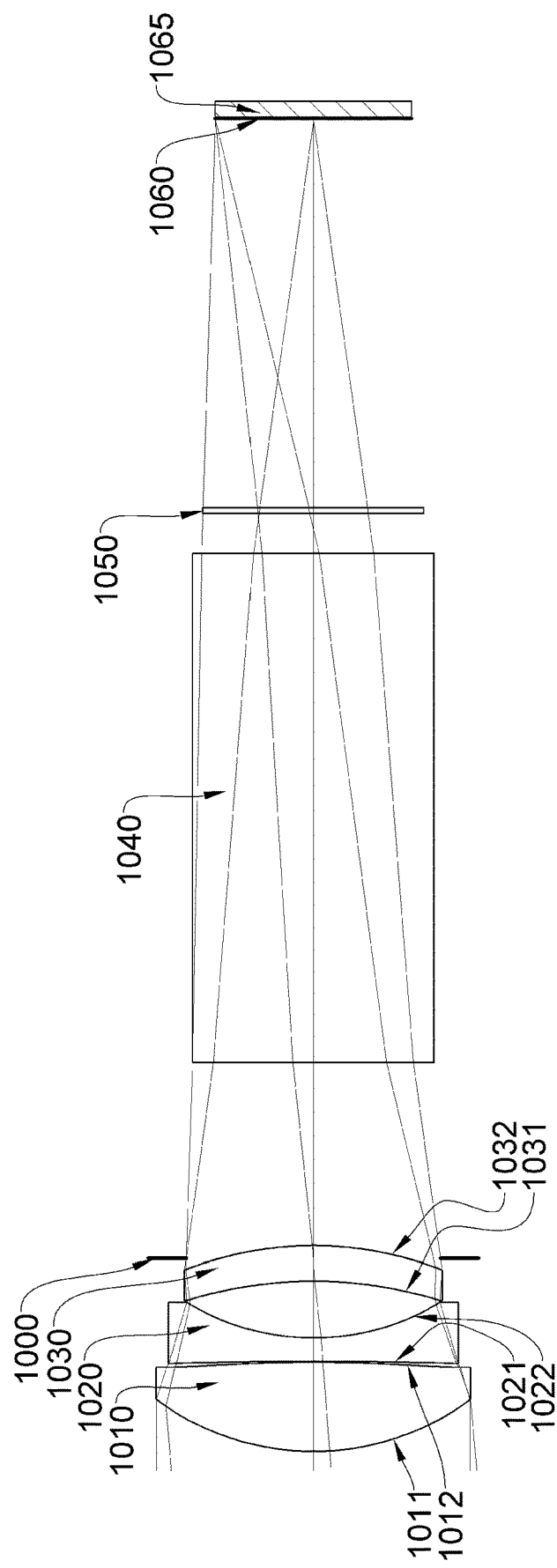
FIG. 10A is a schematic view of an imaging apparatus according to the 10th embodiment of the present disclosure.

FIG. 10A is a schematic view of an imaging apparatus according to the 10th embodiment of the present disclosure.

TABLE 17

(9th Embodiment)
f = 28.24 mm, Fno = 3.53, HFOV = 5.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 6.790 ASP | 1.674 | Plastic | 1.582 | 30.2 | 13.13 |
| 2 | | 55.164 ASP | 0.040 | | | | |
| 3 | Lens 2 | 4.574 ASP | 0.640 | Plastic | 1.679 | 18.4 | −11.52 |
| 4 | | 2.723 ASP | 1.481 | | | | |
| 5 | Lens 3 | −202.840 ASP | 0.972 | Plastic | 1.614 | 26.0 | 26.63 |
| 6 | | −15.151 ASP | 0.030 | | | | |
| 7 | Ape. Stop | Plano | 5.030 | | | | |
| 8 | Prism | Plano | 13.007 | Glass | 1.772 | 49.6 | — |
| 9 | | Plano | 1.000 | | | | |
| 10 | Filter | Plano | 0.110 | Glass | 1.517 | 64.2 | — |
| 11 | | Plano | 9.611 | | | | |
| 12 | Image Surface | Plano | — | | | | |

Remark: Reference wavelength is d-line 587.6 nm.
* The effective radius of Surface 1 is 4.010 mm.

TABLE 18

| Aspheric Coefficient | | | | | | |
|---|---|---|---|---|---|---|
| Surface # | 1 | 2 | 3 | 4 | 5 | 6 |
| k = | −3.8628E−01 | 9.9000E+01 | −1.5599E+00 | −7.6745E−01 | −9.9000E+01 | 1.7440E+01 |
| A4 = | 2.6679E−06 | −9.3170E−03 | −1.4542E−02 | −8.2576E−03 | 2.2779E−03 | 1.4425E−03 |
| A6 = | −5.5050E−04 | 2.7396E−03 | 4.3163E−03 | 2.8643E−03 | 2.3789E−04 | −1.4489E−04 |
| A8 = | 1.2170E−04 | −3.6409E−04 | −6.7762E−04 | −7.8998E−04 | −2.1469E−04 | −4.5368E−05 |
| A10 = | −1.1692E−05 | 2.9968E−05 | 5.2077E−05 | 9.6340E−05 | 4.8942E−05 | 1.7958E−05 |
| A12 = | 6.4390E−07 | −1.4241E−06 | −1.5622E−06 | −5.7642E−06 | −5.9143E−06 | −2.4134E−06 |
| A14 = | −1.9819E−08 | 3.0609E−08 | −2.5489E−08 | 1.2917E−07 | 3.5384E−07 | 1.4296E−07 |
| A16 = | 2.6713E−10 | −1.3574E−10 | 1.8544E−09 | 5.0613E−10 | −7.9962E−09 | −2.6043E−09 |

Figure 10B:
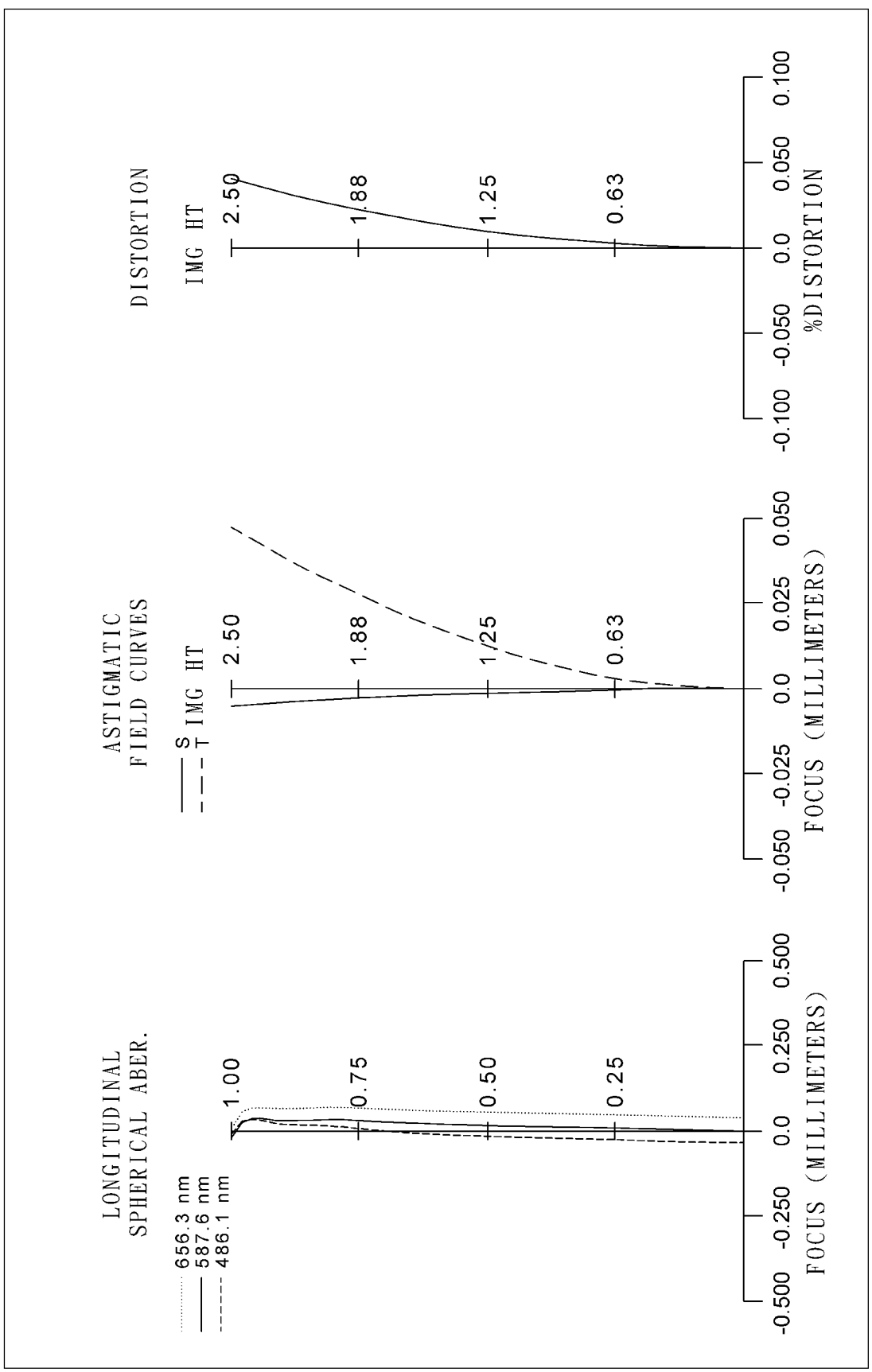
FIG. 10B shows longitudinal spherical aberration curves, astigmatic field curves and a distortion curve of the imaging apparatus according to the 10th embodiment.

FIG. 10B shows, in order from left to right, longitudinal spherical aberration curves, astigmatic field curves and a distortion curve of the imaging apparatus according to the 10th embodiment.

In FIG. 10A, the imaging apparatus includes an imaging optical system (not otherwise herein labeled) of the present disclosure and an image sensor 1065. The imaging optical system includes, in order from an object side to an image side, a first lens element 1010, a second lens element 1020, a third lens element 1030, an aperture stop 1000, a prism 1040, a filter 1050, and an image surface 1060. There is no additional lens element inserted between the first lens element 1010 and the third lens element 1030 and there are air gaps between paraxial regions of the first lens element 1010, the second lens element 1020 and the third lens element 1030.

The first lens element 1010 with positive refractive power has an object-side surface 1011 being convex in the paraxial region thereof, and an image-side surface 1012 being convex in the paraxial region thereof. Both the object-side surface 1011 and the image-side surface 1012 are aspheric. There is one inflection point on the image-side surface 1012. The first lens element 1010 is made of glass material.

The second lens element 1020 with negative refractive power has an object-side surface 1021 being concave in the paraxial region thereof, and an image-side surface 1022 being concave in the paraxial region thereof. Both the object-side surface 1021 and the image-side surface 1022 are spherical. The second lens element 1020 is made of glass material.

The third lens element 1030 with positive refractive power has an object-side surface 1031 being concave in the paraxial region thereof, and an image-side surface 1032 being convex in the paraxial region thereof. Both the object-side surface 1031 and the image-side surface 1032 are spherical. The third lens element 1030 is made of glass material.

The prism 1040 is disposed between the third lens element 1030 and the filter 1050. The prism 1040 is made of glass material. The filter 1050 is disposed between the prism 1040 and the image surface 1060. The filter 1050 is made of glass material and will not affect the focal length of the imaging optical system. The image sensor 1065 is disposed on the image surface 1060 of the imaging optical system.

The detailed optical data of the 10th embodiment are shown in TABLE 19, and the aspheric surface data are shown in TABLE 20.

TABLE 19

(10th Embodiment)
f = 29.02 mm, Fno = 3.63, HFOV = 4.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.703 | ASP | 2.278 | Glass | 1.714 | 38.9 | 8.04 |
| 2 | | −34.481 | ASP | 0.020 | | | | |
| 3 | Lens 2 | −128.847 | SPH | 0.602 | Glass | 1.728 | 28.3 | −8.08 |
| 4 | | 6.178 | SPH | 1.450 | | | | |
| 5 | Lens 3 | −10.879 | SPH | 0.900 | Glass | 1.691 | 54.9 | 65.62 |
| 6 | | −9.071 | SPH | −0.316 | | | | |
| 7 | Ape. Stop | Plano | | 5.000 | | | | |
| 8 | Prism | Plano | | 13.007 | Glass | 1.772 | 49.6 | — |
| 9 | | Plano | | 1.000 | | | | |
| 10 | Filter | Plano | | 0.145 | Glass | 1.517 | 64.2 | — |
| 11 | | Plano | | 9.953 | | | | |
| 12 | Image Surface | Plano | | — | | | | |

Remark: Reference wavelength is d-line 587.6 nm.
* The effective radius of Surface 1 is 4.010 mm.

TABLE 20

Aspheric Coefficient

| Surface # | 1 | 2 |
|---|---|---|
| k= | 1.9859E−01 | 0.0000E+00 |
| A4= | −1.5354E−04 | 3.2337E−04 |
| A6= | 3.8293E−06 | 5.8236E−06 |
| A8= | −1.7710E−06 | −3.6193E−06 |
| A10= | 2.4117E−07 | 7.4901E−07 |
| A12= | −1.5391E−08 | −7.3748E−08 |
| A14= | 4.0608E−10 | 3.5986E−09 |
| A16= | | −6.6155E−11 |

In the 10th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 10th embodiment, so an explanation in this regard will not be provided again.

Moreover, these parameters can be calculated from TABLE 19 and TABLE 20 and satisfy the conditions stated in table below.

| 10th Embodiment | | | |
|---|---|---|---|
| f [mm] | 29.02 | TD/ImgH | 2.10 |
| Fno | 3.63 | (R1 − R2)/(R1 + R2) | −1.48 |
| HFOV [deg.] | 4.9 | (R3 − R4)/(R3 + R4) | 1.10 |
| (V/N)min | 16.38 | \|f/f1\| + \|f/f2\| + \|f/f3\| | 7.64 |
| V2 | 28.3 | f/f1 | 3.61 |
| V1 + V2 + V3 | 122.0 | f/f2 | −3.59 |

-continued

| 10th Embodiment | | | |
|---|---|---|---|
| Vmin | 28.3 | f/f3 | 0.44 |
| (CT1 + CT2 + CT3)/(T12 + T23) | 2.57 | f/ImgH | 11.60 |
| ΣCTP/TD | 2.48 | f/TD | 5.53 |
| BL/TD | 5.48 | f12/f3 | 0.65 |
| (CT2 + CT3)/T23 | 1.04 | Y11/TD | 0.76 |
| (T12 + T23)/CT2 | 2.44 | Y11/Y32 | 1.22 |
| T23/T12 | 72.50 | Y32/TD | 0.63 |
| TD/EPD | 0.66 | | |

11th Embodiment

Figure 11A:
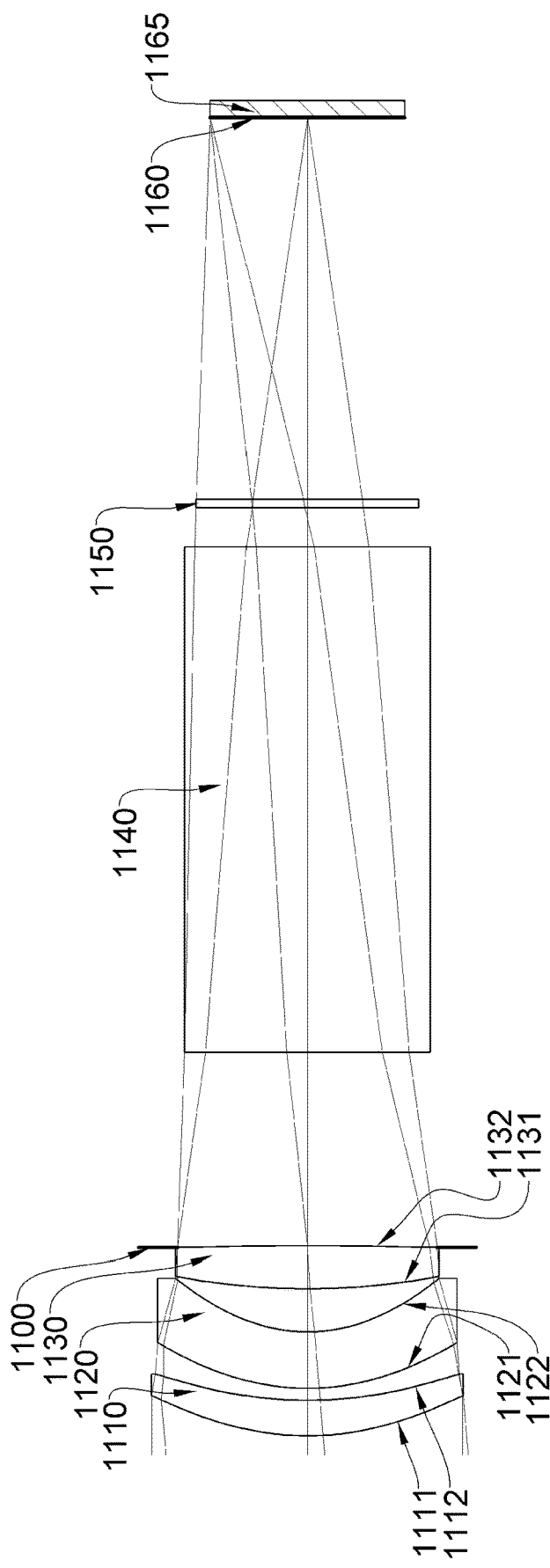
FIG. 11A is a schematic view of an imaging apparatus according to the 11th embodiment of the present disclosure.
Figure 11B:
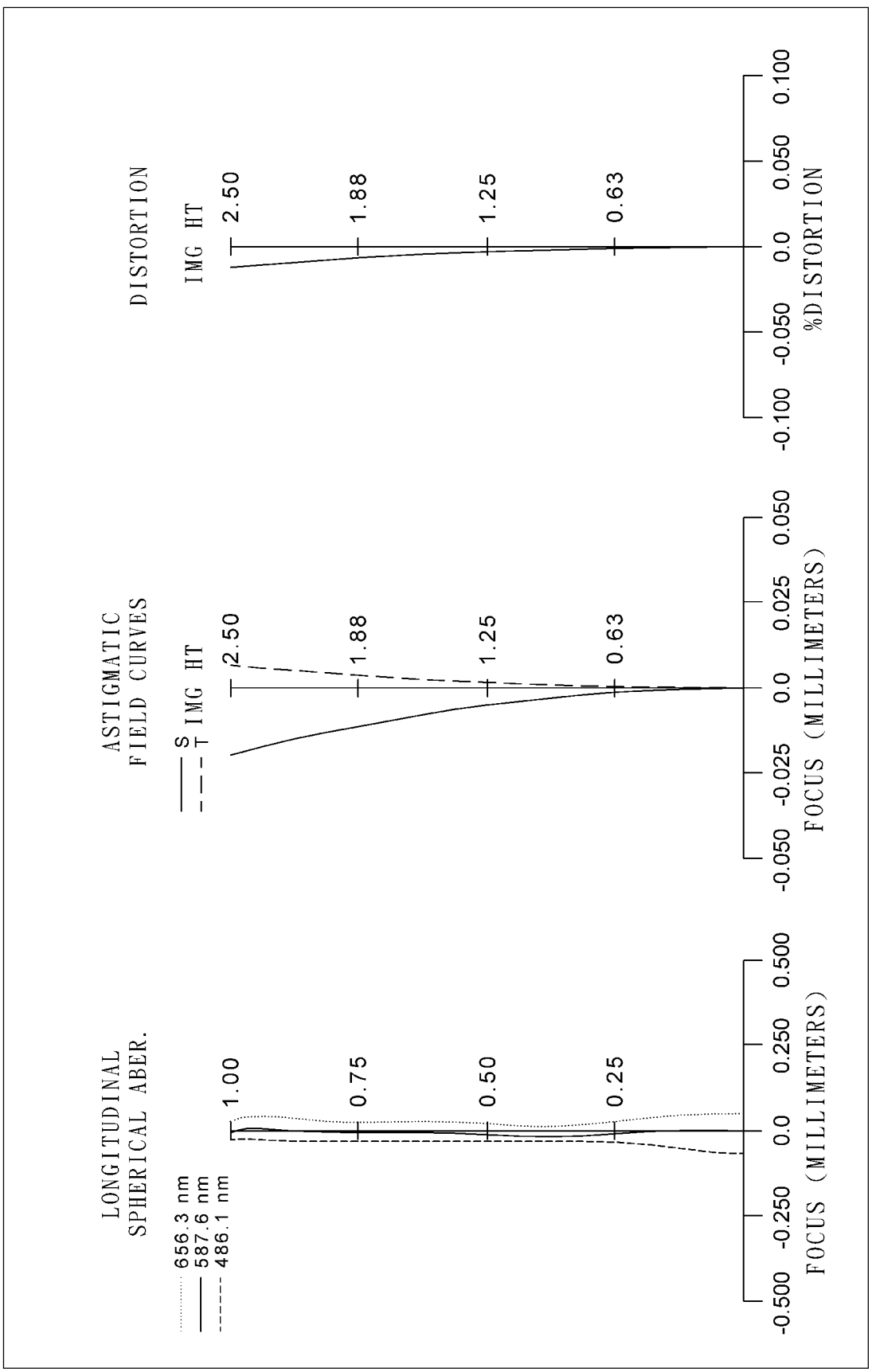
FIG. 11B shows longitudinal spherical aberration curves, astigmatic field curves and a distortion curve of the imaging apparatus according to the 11th embodiment.

FIG. 11A is a schematic view of an imaging apparatus according to the 11th embodiment of the present disclosure. FIG. 11B shows, in order from left to right, longitudinal spherical aberration curves, astigmatic field curves and a distortion curve of the imaging apparatus according to the 11th embodiment.

In FIG. 11A, the imaging apparatus includes an imaging optical system (not otherwise herein labeled) of the present disclosure and an image sensor 1165. The imaging optical system includes, in order from an object side to an image side, a first lens element 1110, a second lens element 1120, a third lens element 1130, an aperture stop 1100, a prism 1140, a filter 1150, and an image surface 1160. There is no additional lens element inserted between the first lens element 1110 and the third lens element 1130 and there are air gaps between paraxial regions of the first lens element 1110, the second lens element 1120 and the third lens element 1130.

The first lens element 1110 with positive refractive power has an object-side surface 1111 being convex in the paraxial region thereof, and an image-side surface 1112 being concave in the paraxial region thereof. Both the object-side surface 1111 and the image-side surface 1112 are aspheric.

There are one inflection point on the object-side surface 1111 and one inflection point on the image-side surface 1112. The first lens element 1110 is made of plastic material.

The second lens element 1120 with negative refractive power has an object-side surface 1121 being convex in the paraxial region thereof, and an image-side surface 1122 being concave in the paraxial region thereof. Both the object-side surface 1121 and the image-side surface 1122 are aspheric. The second lens element 1120 is made of plastic material.

The third lens element 1130 with positive refractive power has an object-side surface 1131 being convex in the paraxial region thereof, and an image-side surface 1132 being convex in the paraxial region thereof. Both the object-side surface 1131 and the image-side surface 1132 are spherical. The third lens element 1130 is made of glass material.

The prism 1140 is disposed between the third lens element 1130 and the filter 1150. The prism 1140 is made of glass material. The filter 1150 is disposed between the prism 1140 and the image surface 1160. The filter 1150 is made of glass material and will not affect the focal length of the imaging optical system. The image sensor 1165 is disposed on the image surface 1160 of the imaging optical system.

The detailed optical data of the 11th embodiment are shown in TABLE 21, and the aspheric surface data are shown in TABLE 22.

TABLE 21

(11th Embodiment)
f = 28.21 mm, Fno = 3.53, HFOV = 5.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.264 | ASP | 0.914 | Plastic | 1.544 | 56.0 | 42.84 |
| 2 | | 10.084 | ASP | 0.309 | | | | |
| 3 | Lens 2 | 5.979 | ASP | 1.454 | Plastic | 1.660 | 20.4 | -27.19 |
| 4 | | 4.051 | ASP | 1.110 | | | | |
| 5 | Lens 3 | 17.610 | SPH | 1.100 | Glass | 1.804 | 46.6 | 19.38 |
| 6 | | -131.344 | SPH | -0.042 | | | | |
| 7 | Ape. Stop | Plano | | 5.042 | | | | |
| 8 | Prism | Plano | | 13.007 | Glass | 1.772 | 49.6 | — |
| 9 | | Plano | | 1.000 | | | | |
| 10 | Filter | Plano | | 0.210 | Glass | 1.517 | 64.2 | — |
| 11 | | Plano | | 9.838 | | | | |
| 12 | Image Surface | Plano | | — | | | | |

Remark: Reference wavelength is d-line 587.6 nm.
* The effective radius of Surface 1 is 4.010 mm.

TABLE 22

| Aspheric Coefficient | | | | |
|---|---|---|---|---|
| Surface # | 1 | 2 | 3 | 4 |
| k= | -9.7051E-01 | 0.0000E+00 | 0.0000E+00 | 0.0000E+00 |
| A4= | -1.9165E-04 | -1.9884E-03 | -2.5760E-03 | -2.7321E-03 |
| A6= | -1.7569E-05 | 5.1766E-04 | 5.8983E-04 | 2.2602E-04 |
| A8= | 3.3337E-06 | -8.2833E-05 | -1.0164E-04 | -6.9616E-05 |
| A10= | -1.3219E-08 | 8.1467E-06 | 1.0095E-05 | 9.3202E-06 |
| A12= | -4.2735E-08 | -5.0992E-07 | -5.9833E-07 | -8.0583E-07 |
| A14= | 3.2954E-09 | 1.8528E-08 | 1.9829E-08 | 3.9540E-08 |
| A16= | -7.5405E-11 | -2.9476E-10 | -2.8554E-10 | -9.1013E-10 |

In the 11th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 11th embodiment, so an explanation in this regard will not be provided again.

Moreover, these parameters can be calculated from TABLE 21 and TABLE 22 and satisfy the conditions stated in table below.

| 11th Embodiment | | | |
|---|---|---|---|
| f [mm] | 28.21 | TD/ImgH | 1.95 |
| Fno | 3.53 | (R1 - R2)/(R1 + R2) | -0.16 |
| HFOV [deg.] | 5.1 | (R3 - R4)/(R3 + R4) | 0.19 |
| (V/N)min | 12.29 | \|f/f1\| + \|f/f2\| + \|f/f3\| | 3.15 |
| V2 | 20.4 | f/f1 | 0.66 |
| V1 + V2 + V3 | 122.9 | f/f2 | -1.04 |
| Vmin | 20.4 | f/f3 | 1.46 |
| (CT1 + CT2 + CT3)/(T12 + T23) | 2.44 | f/ImgH | 11.27 |
| ΣCTP/TD | 2.66 | f/TD | 5.77 |
| BL/TD | 5.95 | f12/f3 | -6.29 |
| (CT2 + CT3)/T23 | 2.30 | Y11/TD | 0.82 |
| (T12 + T23)/CT2 | 0.98 | Y11/Y32 | 1.20 |
| T23/T12 | 3.59 | Y32/TD | 0.68 |
| TD/EPD | 0.61 | | |

12th Embodiment

Figure 12A:
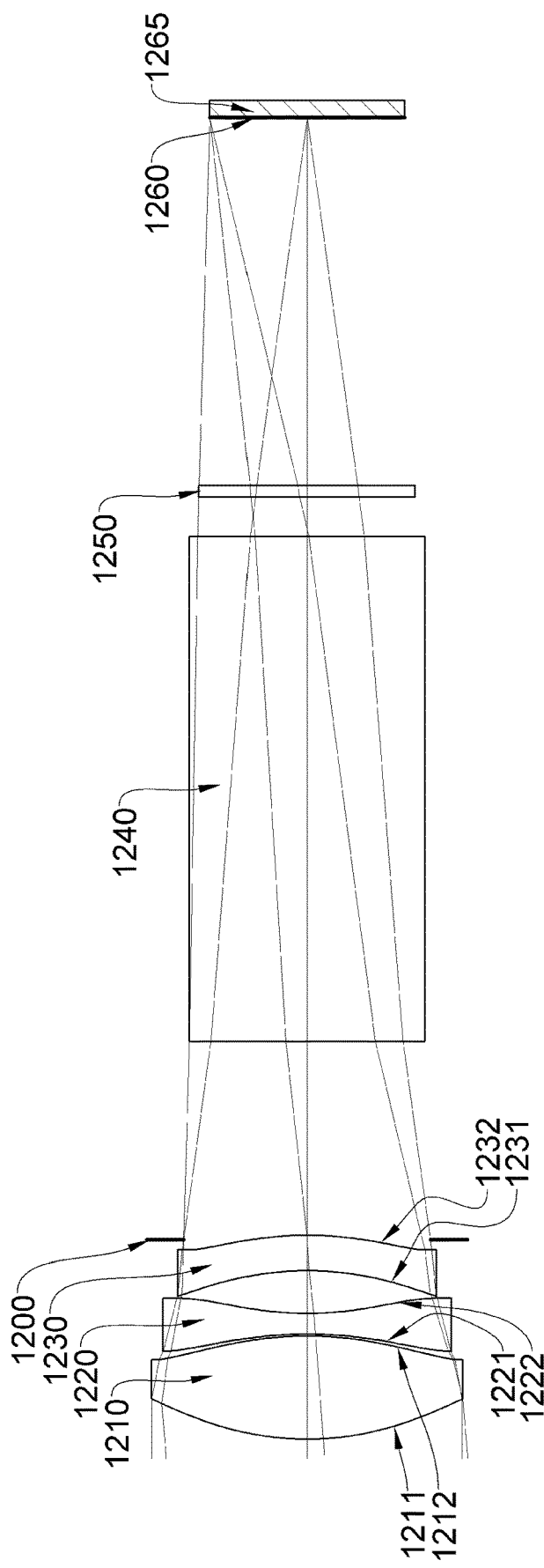
FIG. 12A is a schematic view of an imaging apparatus according to the 12th embodiment of the present disclosure.
Figure 12B:
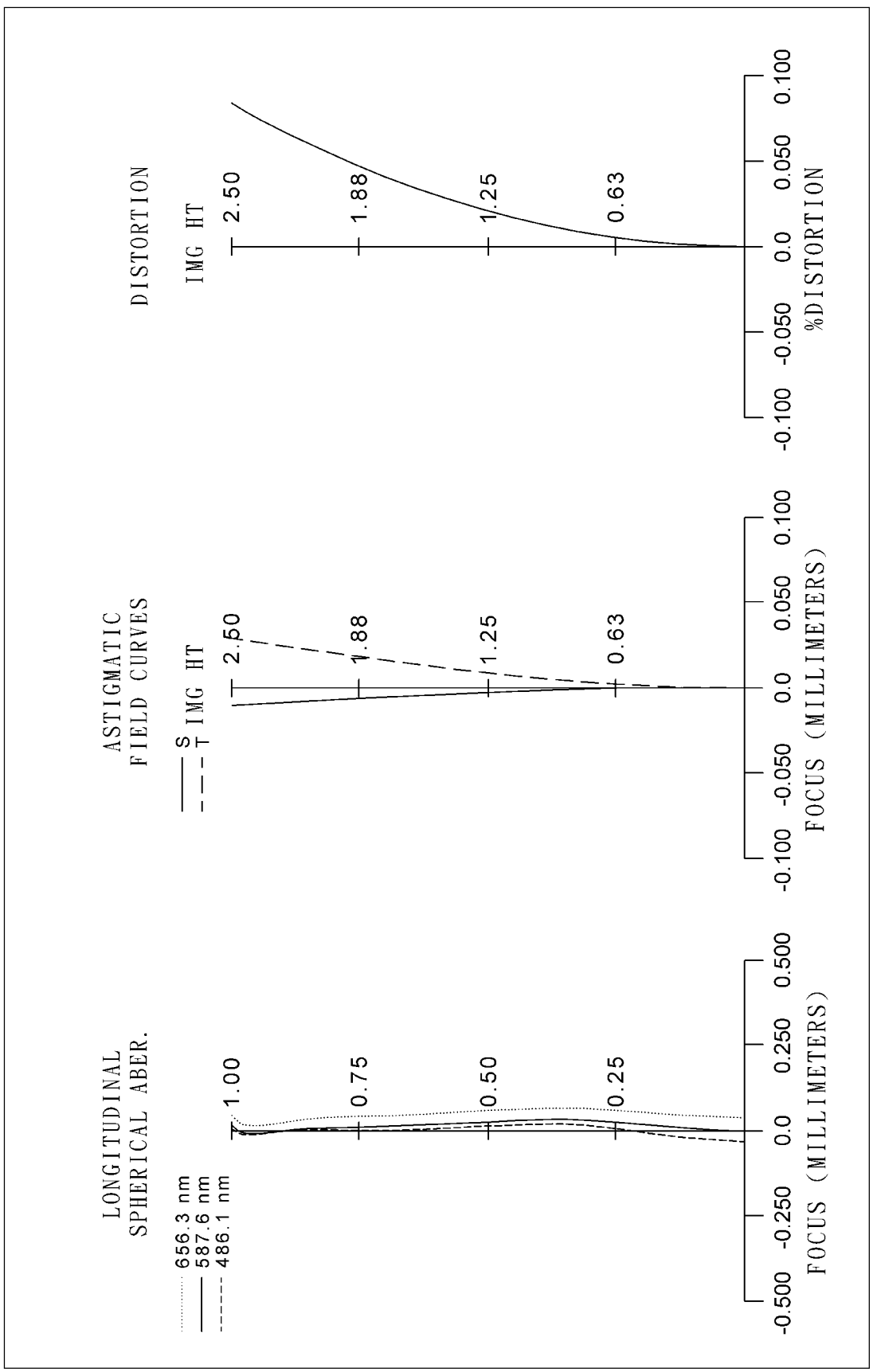
FIG. 12B shows longitudinal spherical aberration curves, astigmatic field curves and a distortion curve of the imaging apparatus according to the 12th embodiment.

FIG. 12A is a schematic view of an imaging apparatus according to the 12th embodiment of the present disclosure. FIG. 12B shows, in order from left to right, longitudinal spherical aberration curves, astigmatic field curves and a distortion curve of the imaging apparatus according to the 12th embodiment.

In FIG. 12A, the imaging apparatus includes an imaging optical system (not otherwise herein labeled) of the present disclosure and an image sensor 1265. The imaging optical system includes, in order from an object side to an image side, a first lens element 1210, a second lens element 1220, a third lens element 1230, an aperture stop 1200, a prism 1240, a filter 1250, and an image surface 1260. There is no additional lens element inserted between the first lens element 1210 and the third lens element 1230 and there are air gaps between paraxial regions of the first lens element 1210, the second lens element 1220 and the third lens element 1230.

The first lens element 1210 with positive refractive power has an object-side surface 1211 being convex in the paraxial region thereof, and an image-side surface 1212 being convex in the paraxial region thereof. Both the object-side surface 1211 and the image-side surface 1212 are aspheric. There is one inflection point on the image-side surface 1212. The first lens element 1210 is made of glass material.

The second lens element 1220 with negative refractive power has an object-side surface 1221 being concave in the paraxial region thereof, and an image-side surface 1222 being concave in the paraxial region thereof. Both the object-side surface 1221 and the image-side surface 1222 are aspheric. There are one inflection point on the object-side surface 1221 and one inflection point on the image-side surface 1222. The second lens element 1220 is made of glass material.

The third lens element 1230 with negative refractive power has an object-side surface 1231 being concave in the paraxial region thereof, and an image-side surface 1232 being convex in the paraxial region thereof. Both the object-side surface 1231 and the image-side surface 1232 are aspheric. There are one inflection point on the object-side surface 1231 and one inflection point on the image-side surface 1232. The third lens element 1230 is made of glass material.

The prism 1240 is disposed between the third lens element 1230 and the filter 1250. The prism 1240 is made of glass material. The filter 1250 is disposed between the prism 1240 and the image surface 1260. The filter 1250 is made of glass material and will not affect the focal length of the imaging optical system. The image sensor 1265 is disposed on the image surface 1260 of the imaging optical system.

The detailed optical data of the 12th embodiment are shown in TABLE 23, and the aspheric surface data are shown in TABLE 24.

TABLE 23

(12th Embodiment)
f = 29.33 mm, Fno = 3.67, HFOV = 4.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.513 | ASP | 2.665 | Glass | 1.714 | 38.9 | 6.27 |
| 2 | | −9.468 | ASP | 0.047 | | | | |
| 3 | Lens 2 | −11.219 | ASP | 0.534 | Glass | 1.722 | 29.2 | −6.83 |
| 4 | | 8.993 | ASP | 1.103 | | | | |
| 5 | Lens 3 | −7.917 | ASP | 0.900 | Glass | 1.722 | 29.2 | −196.12 |
| 6 | | −8.786 | ASP | −0.116 | | | | |
| 7 | Ape. Stop | Plano | | 5.116 | | | | |
| 8 | Prism | Plano | | 13.007 | Glass | 1.772 | 49.6 | — |
| 9 | | Plano | | 1.000 | | | | |
| 10 | Filter | Plano | | 0.300 | Glass | 1.517 | 64.2 | — |
| 11 | | Plano | | 9.611 | | | | |
| 12 | Image Surface | Plano | | — | | | | |

Remark: Reference wavelength is d-line 587.6 nm.
* The effective radius of Surface 1 is 4.010 mm.

TABLE 24

Aspheric Coefficient

| Surface # | 1 | 2 | 3 | 4 | 5 | 6 |
|---|---|---|---|---|---|---|
| k = | −8.5433E−02 | 0.0000E+00 | 0.0000E+00 | 0.0000E+00 | 0.0000E+00 | 0.0000E+00 |
| A4 = | −1.9255E−04 | −1.2750E−03 | −7.2310E−04 | 4.0399E−04 | 5.6815E−04 | 9.3304E−04 |
| A6 = | 3.4202E−07 | 3.9392E−04 | 1.5695E−04 | −3.0345E−04 | −1.4298E−04 | −7.5760E−05 |
| A8 = | −1.7115E−06 | −3.6855E−05 | −2.8508E−06 | 8.2083E−06 | 2.0960E−05 | 2.7999E−05 |
| A10 = | 1.5690E−07 | 2.5307E−06 | 3.0223E−08 | −3.4190E−08 | −7.0051E−07 | −8.6447E−07 |
| A12 = | −1.1743E−08 | −1.2345E−07 | | | | |
| A14 = | 3.1872E−10 | 3.7605E−09 | | | | |
| A16 = | | −4.9570E−11 | | | | |

In the 12th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 12th embodiment, so an explanation in this regard will not be provided again.

Moreover, these parameters can be calculated from TABLE 23 and TABLE 24 and satisfy the conditions stated in table below.

| 12th Embodiment | | | |
|---|---|---|---|
| f [mm] | 29.33 | TD/ImgH | 2.10 |
| Fno | 3.67 | (R1 − R2)/(R1 + R2) | −8.68 |
| HFOV [deg.] | 4.9 | (R3 − R4)/(R3 + R4) | 9.08 |
| (V/N)min | 16.97 | |f/f1| + |f/f2| + |f/f3| | 9.12 |
| V2 | 29.2 | f/f1 | 4.67 |
| V1 + V2 + V3 | 97.3 | f/f2 | −4.29 |
| Vmin | 29.2 | f/f3 | −0.15 |
| (CT1 + CT2 + CT3)/(T12 + T23) | 3.56 | f/ImgH | 11.72 |
| ΣCTP/TD | 2.48 | f/TD | 5.59 |
| BL/TD | 5.48 | f12/f3 | −0.13 |
| (CT2 + CT3)/T23 | 1.30 | Y11/TD | 0.76 |
| (T12 + T23)/CT2 | 2.15 | Y11/Y32 | 1.25 |
| T23/T12 | 23.47 | Y32/TD | 0.61 |
| TD/EPD | 0.66 | | |

13th Embodiment

Figure 13:
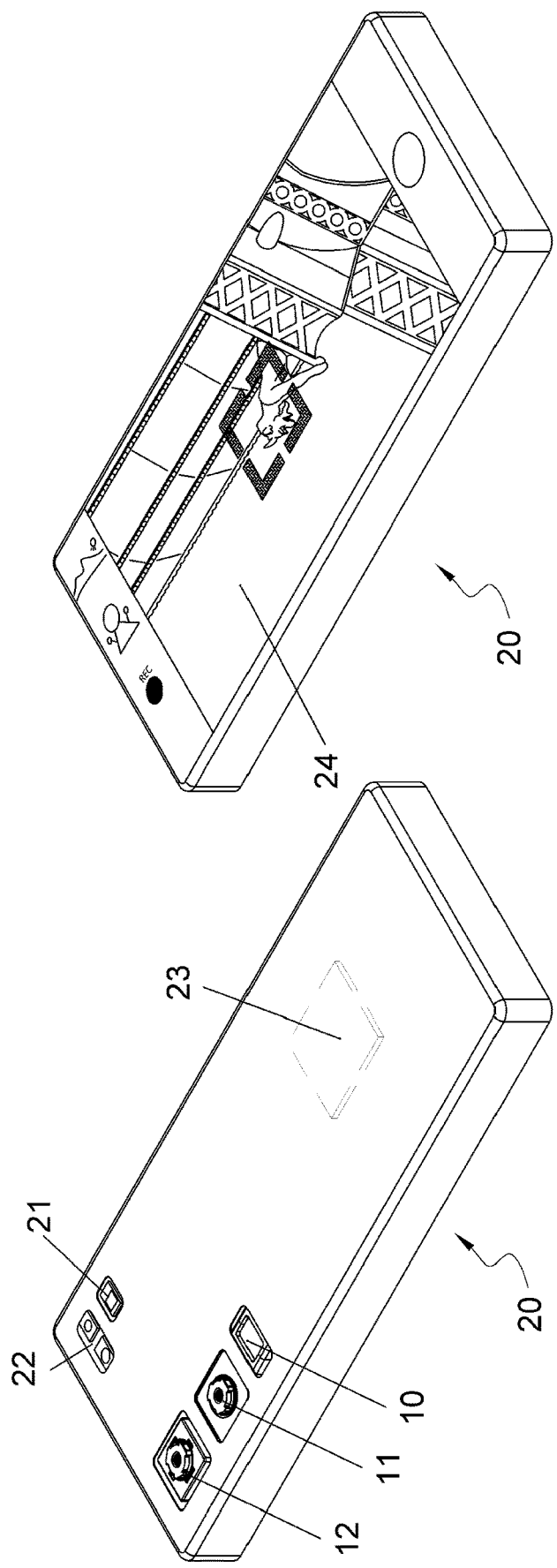
FIG. 13 is a schematic view of the electronic device according to the 13th embodiment of the present disclosure.

Please refer to FIG. 13. FIG. 13 is a 3-dimensional schematic view of an electronic device 20 according to the 13th embodiment of the present disclosure. In the present embodiment, the electronic device 20 is a smart phone. The electronic device 20 includes the imaging apparatus 10, an imaging apparatus 11, an imaging apparatus 12, a flash module 21, a focus assist module 22, an image signal processor 23, and a user interface 24. In the present embodiment, the imaging apparatus 10 is a telephoto imaging apparatus including the imaging optical system and the image sensor of the present disclosure. The imaging apparatus 11 is an imaging apparatus with wide field of view and the imaging apparatus 12 is an imaging apparatus with ultra-wide field of view but not limited. For example, three imaging apparatuses 10, 11, 12 may all be telephoto imaging apparatuses. Besides, the electronic device 20 in the present embodiment includes three imaging apparatuses 10, 11, 12 as an exemplary but not limited. For example, the electronic device 20 may include only one imaging apparatus 10 or may include four or more imaging apparatuses.

When a user utilizes the user interface 24 to capture images of an object, the electronic device 20 retrieves the light and captures an image via at least one of the imaging apparatus 10, imaging apparatus 11, and imaging apparatus 12, triggering the flash module 21 to compensate insufficient light level, and focuses instantly according to the distance information of the object provided by the focus assist module 22. The images are further optimized by the image signal processor 23 to further enhance the image quality generated by the imaging optical system. The focus assist module 22 may adopt an infrared ray or laser focus assist system to achieve quick focusing. The user interface 24 may use a touch screen or a physical shooting button cooperated with various functions of the image software processor to perform image capturing and image processing. The images after the processing of the image software processor can be shown on the user interface 24.

The imaging apparatus 10 of the present disclosure is not limited to be applied to the smart phone. The imaging apparatus 10 may be used in a system of moving focus and features in both excellent aberration correction and satisfactory image quality. For example, the imaging apparatus 10 may be applied to a variety of applications such as car electronics, drones, smart electronic products, tablet computers, wearable devices, medical devices, precision instruments, surveillance cameras, portable video recorders, identification systems, multi-lens devices, somatosensory detections, virtual realities, motion devices, home intelligent auxiliary systems and other electronic devices.

The aforementioned electronic apparatus is merely exemplary of practical use of the present disclosure and does not limit the scope of application of the imaging apparatus of the present disclosure. Preferably, the electronic device can further include a control unit, a display unit, a storage unit, a random access memory unit (RAM) or a combination thereof.

The foregoing description, for purpose of explanation, has been described with reference to specific embodiments. It is to be noted that TABLES 1-24 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical system, comprising three lens elements, the three lens elements, in order from an object side to an image side, being:
    a first lens element having an object-side surface being convex in a paraxial region thereof toward the object side and an image-side surface toward the image side;
    a second lens element having an object-side surface toward the object side and an image-side surface toward the image side; and
    a third lens element having an object-side surface toward the object side and an image-side surface toward the image side;
    wherein the third lens element has positive refractive power, the imaging optical system has a total of three lens elements, there are air gaps between paraxial regions of the first lens element, the second lens element and the third lens element, a central thickness of the first lens element is CT1, a central thickness of the second lens element is CT2, a central thickness of the third lens element is CT3, an axial distance between the first lens element and the second lens element is T12, an axial distance between the second lens element and the third lens element is T23, an axial distance between the object-side surface of the first lens element and the image-side surface of the third lens element is TD, a maximum image height of the imaging optical system is ImgH, a focal length of the imaging optical system is f, and the following conditions are satisfied:

$1.5 < (CT1+CT2+CT3)/(T12+T23) < 8.0$;

$1.0 < TD/\text{ImgH}$;

$3.6 < f/TD < 10$; and $8.0 < f/\text{ImgH} < 15$.

2. The imaging optical system of claim 1, wherein the central thickness of the first lens element is CT1, the central thickness of the second lens element is CT2, the central thickness of the third lens element is CT3, the axial distance between the first lens element and the second lens element is T12, the axial distance between the second lens element and the third lens element is T23, and the following condition is satisfied:

$1.5 < (CT1+CT2+CT3)/(T12+T23) < 4.0$.

3. The imaging optical system of claim 1, wherein the axial distance between the first lens element and the second lens element is T12, the axial distance between the second lens element and the third lens element is T23, and the following condition is satisfied:

$2.00 < T23/T12 < 200$.

4. The imaging optical system of claim 1, wherein the focal length of the imaging optical system is f, the maximum image height of the imaging optical system is ImgH, and the following condition is satisfied:

$9.5 < f/\text{ImgH} < 13$.

5. The imaging optical system of claim 1, wherein a composite focal length of the first lens element and the second lens element is f12, a focal length of the third lens element is f3, an Abbe number of the second lens element is V2, and the following conditions are satisfied:

$-25 < f12/f3 < -2.0$; and $10.0 < V2 < 30.0$.

6. The imaging optical system of claim 1, wherein the axial distance between the object-side surface of the first lens element and the image-side surface of the third lens element is TD, an entrance pupil diameter of the imaging optical system is EPD, and the following condition is satisfied:

$0.40 < TD/EPD < 0.80$.

7. The imaging optical system of claim 1, wherein the first lens element has positive refractive power, at least one lens element of the first lens element, the second lens element and the third lens element has both the object-side surface and the image-side surface thereof being aspheric, at least one lens element of the first lens element, the second lens element and the third lens element has at least one inflection point on at least one of the object-side surface and the image-side surface thereof, a minimum among ratios of an abbe number to a refractive index of each the first lens element, second lens element and the third lens element is (V/N)min, and the following condition is satisfied:

$8.0 < (V/N)\text{min} < 18.0$.

8. The imaging optical system of claim 1, wherein the second lens element has negative refractive power, the second lens element has the object-side surface being convex in the paraxial region thereof and the image-side surface being concave in the paraxial region thereof.

9. The imaging optical system of claim 1, wherein the imaging optical system comprises at least one object-side reflective component at the object side of the first lens element, and at least one image-side reflective component at the image side of the third lens element, the at least one image-side reflective component comprises at least two reflective surfaces, the at least one image-side reflective component comprises at least one prism, a total of axial thicknesses of all prisms of the image-side reflective component is ΣCTP, the axial distance between the object-side surface of the first lens element and the image-side surface of the third lens element is TD, and the following condition is satisfied:

1.5<ΣCTP/TD<4.0.

10. An imaging optical system, comprising three lens elements, the three lens elements, in order from an object side to an image side, being:
- a first lens element having an object-side surface toward the object side and an image-side surface toward the image side;
- a second lens element having an object-side surface toward the object side and an image-side surface toward the image side; and
- a third lens element having an object-side surface toward the object side and an image-side surface toward the image side;
- wherein the third lens element has positive refractive power, the imaging optical system has a total of three lens elements, a central thickness of the first lens element is CT1, a central thickness of the second lens element is CT2, a central thickness of the third lens element is CT3, an axial distance between the first lens element and the second lens element is T12, an axial distance between the second lens element and the third lens element is T23, an axial distance between the object-side surface of the first lens element and the image-side surface of the third lens element is TD, a maximum image height of the imaging optical system is ImgH, a focal length of the imaging optical system is f, an Abbe number of the first lens element is V1, an Abbe number of the second lens element is V2, an Abbe number of the third lens element is V3, a half of the maximal field of view is HFOV, and the following conditions are satisfied:

1.2<(CT1+CT2+CT3)/(T12+T23);

1.6<TD/ImgH<4.5;

3.6<f/TD<25;

40.0<V1+V2+V3<140.0;

3.59≤T23/T12<200; and 3.2 degrees<HFOV<7.0 degrees.

11. The imaging optical system of claim 10, wherein the central thickness of the second lens element is CT2, the central thickness of the third lens element is CT3, the axial distance between the second lens element and the third lens element is T23, the focal length of the imaging optical system is f, a focal length of the first lens element is f1, a focal length of the second lens element is f2, a focal length of the third lens element is f3, and the following conditions are satisfied:

0.50<(CT2+CT3)/T23<10; and 3.0<|f/f1|+|f/f2|+|f/f3|<8.0.

12. The imaging optical system of claim 10, wherein a maximum vertical distance between any point in an effective optical region of the object-side surface of the first lens element and an optical axis is Y11, a maximum vertical distance between any point on an effective optical region of the image-side surface of the third lens element and the optical axis is Y32, the axial distance between the object-side surface of the first lens element and the image-side surface of the third lens element is TD, and the following conditions are satisfied:

0.65<Y11/TD<1.0;

0.60<Y32/TD<1.0; and 0.70<Y11/Y32<1.4.

13. The imaging optical system of claim 10, wherein the imaging optical system comprises at least one object-side reflective component at the object side of the first lens element, and at least one image-side reflective component at the image side of the third lens element, the at least one image-side reflective component comprises at least two reflective surfaces, the second lens element is made of plastic material, and the third lens element is made of glass material.

14. An imaging optical system, comprising three lens elements, the three lens elements, in order from an object side to an image side, being:
- a first lens element having an object-side surface toward the object side and an image-side surface toward the image side;
- a second lens element having an object-side surface toward the object side and an image-side surface toward the image side; and
- a third lens element having an object-side surface toward the object side and an image-side surface toward the image side;
- wherein the second lens element has negative refractive power, the imaging optical system has a total of three lens elements, a central thickness of the first lens element is CT1, a central thickness of the second lens element is CT2, a central thickness of the third lens element is CT3, an axial distance between the first lens element and the second lens element is T12, an axial distance between the second lens element and the third lens element is T23, an axial distance between the object-side surface of the first lens element and the image-side surface of the third lens element is TD, a maximum image height of the imaging optical system is ImgH, a focal length of the imaging optical system is f, an Abbe number of the first lens element is V1, an Abbe number of the second lens element is V2, an Abbe number of the third lens element is V3, a minimum among Abbe numbers of the first lens element, the second lens element and the third lens element is V min, and the following conditions are satisfied:

1.2<(CT1+CT2+CT3)/(T12+T23)<4.0;

1.0<TD/ImgH<4.5;

3.6<f/TD<45;

50.0<V1+V2+V3<130.0; and 10.0<V min<30.0.

15. The imaging optical system of claim 14, wherein the minimum among Abbe numbers of the first lens element, the second lens element and the third lens element is V min, and the following condition is satisfied:

14.0<V min≤28.3.

16. The imaging optical system of claim 14, an axial distance between the image-side surface of the third lens element and an image surface is BL, the axial distance between the object-side surface of the first lens element and the image-side surface of the third lens element is TD, an f-number of the imaging optical system is Fno, and the following conditions are satisfied:

$4.0 < BL/TD < 7.5$; and $2.5 < Fno < 4.5$.

17. The imaging optical system of claim 14, wherein the axial distance between the first lens element and the second lens element is T12, the axial distance between the second lens element and the third lens element is T23, the central thickness of the second lens element is CT2, and the following condition is satisfied:

$0.70 < (T12 + T23)/CT2 < 3.0$.

18. The imaging optical system of claim 14, wherein a half of the maximal field of view is HFOV, and the following condition is satisfied:

$3.2$ degrees $< HFOV < 7.0$ degrees.

19. The imaging optical system of claim 14, wherein the first lens element has positive refractive power, the third lens element has positive refractive power, the focal length of the imaging optical system is f, a focal length of the first lens element is f1, a focal length of the second lens element is f2, a focal length of the third lens element is f3, and the following conditions are satisfied:

$0.50 < f/f1 < 2.5$;

$-4.5 < f/f2 < -0.80$; and $1.0 < f/f3 \leq 2.0$.

20. The imaging optical system of claim 14, wherein the first lens element has the object-side surface being convex in a paraxial region thereof, the second lens element has the image-side surface being concave in a paraxial region thereof, a curvature radius of the object-side surface of the first lens element is R1, a curvature radius of the image-side surface of the first lens element is R2, a curvature radius of the object-side surface of the second lens element is R3, a curvature radius of the image-side surface of the second lens element is R4, and the following conditions are satisfied:

$(R1-R2)/(R1+R2) < 0$; and $0 < (R3-R4)/(R3+R4)$.

21. The imaging optical system of claim 14, wherein at least two adjacent lens elements have fitting structures outside effective optical regions thereof, an angle between an extension line at a fitting position of the fitting structures and an optical axis is θ, and the following condition is satisfied:

$10.0$ degrees $< |\theta| < 60.0$ degrees.

22. The imaging optical system of claim 21, wherein an intersection of the extension line at the fitting position of the fitting structures and the optical axis locates in the image side of the fitting position.

23. The imaging optical system of claim 14, wherein the imaging optical system comprises at least one object-side reflective component at the object side of the first lens element, and at least one image-side reflective component at the image side of the third lens element, the at least one image-side reflective component comprises at least two reflective surfaces, and at least one lens element has an effective optical region thereof being a non-circular shape.

24. The imaging optical system of claim 23, wherein the non-circular shape comprises at least two arc portions and at least two straight portions, a distance between the straight portions and an optical axis is D, a radius of the arc portions is Y, and the following condition is satisfied:

$1.1 < Y/D < 2.0$.

25. An imaging apparatus, comprising the imaging optical system of claim 14 and an image sensor disposed on an image surface of the imaging optical system.

26. The imaging apparatus of claim 25, wherein the imaging apparatus has a focusing function and comprises at least one object-side reflective component at the object side of the first lens element, and at least one image-side reflective component at the image side of the third lens element, the at least one image-side reflective component comprises at least two reflective surfaces, and the at least one image-side reflective component moves with respect to the image sensor during focusing.

27. An electronic device, comprising the imaging apparatus of claim 25.

* * * * *